(12) United States Patent
Carrigan et al.

(10) Patent No.: US 12,003,659 B2
(45) Date of Patent: Jun. 4, 2024

(54) INTERFACES AND DEVICES FOR DYNAMICALLY-AVAILABLE MEDIA PLAYBACK

(71) Applicant: Apple Inc., Cupertino, CA (US)

(72) Inventors: Taylor G. Carrigan, San Francisco, CA (US); Corey Peterson, Saratoga, CA (US)

(73) Assignee: Apple Inc., Cupertino, CA (US)

( * ) Notice: Subject to any disclaimer, the term of this patent is extended or adjusted under 35 U.S.C. 154(b) by 301 days.

(21) Appl. No.: 17/579,253

(22) Filed: Jan. 19, 2022

(65) Prior Publication Data

US 2022/0345565 A1  Oct. 27, 2022

Related U.S. Application Data

(60) Provisional application No. 63/197,423, filed on Jun. 6, 2021, provisional application No. 63/175,312, filed on Apr. 15, 2021.

(51) Int. Cl.
| | |
|---|---|
| *H04M 1/72415* | (2021.01) |
| *G06F 3/0482* | (2013.01) |
| *H04M 1/72412* | (2021.01) |
| *H04M 1/72454* | (2021.01) |
| *H04M 1/72463* | (2021.01) |

(52) U.S. Cl.
CPC ...... *H04M 1/72415* (2021.01); *G06F 3/0482* (2013.01); *H04M 1/72412* (2021.01); *H04M 1/72454* (2021.01); *H04M 1/72463* (2021.01)

(58) Field of Classification Search
CPC ......... H04M 1/72415; H04M 1/72412; H04M 1/72463; H04M 1/72454; G06F 3/0482
See application file for complete search history.

(56) References Cited

U.S. PATENT DOCUMENTS

| 10,216,351 B2 | 2/2019 | Yang |
| 10,254,911 B2 | 4/2019 | Yang |
| 11,079,894 B2 | 8/2021 | Yang |

(Continued)

FOREIGN PATENT DOCUMENTS

| CN | 117178252 A | * | 12/2023 | ........... G06F 3/0482 |
| WO | WO-2014110898 A1 | * | 7/2014 | ......... H04L 67/1095 |
| WO | 2018/067528 A1 | | 4/2018 | |

OTHER PUBLICATIONS

International Preliminary Report on Patentability received for PCT Patent Application No. PCT/US2022/012817, dated Jul. 27, 2023, 19 pages.

(Continued)

*Primary Examiner* — Adam D Houston
(74) *Attorney, Agent, or Firm* — DLA Piper LLP (US)

(57) ABSTRACT

The present disclosure generally relates to managing dynamically-available media playback and adapting visual outputs based on device capabilities and a state of the device. In some embodiments, a computer system manages whether an external electronic device is configurable to be available for a first media playback function. In some embodiments, a computer system selective causes an external electronic device to respond to a request to perform a media playback operation. In some embodiments, an electronic device adapts visual outputs based on device capabilities and a state of the device.

30 Claims, 45 Drawing Sheets

(56) References Cited

U.S. PATENT DOCUMENTS

| | | | |
|---|---|---|---|
| 11,281,711 B2* | 3/2022 | Sanders | G06F 16/4387 |
| 11,386,887 B1* | 7/2022 | Teng | G10L 15/183 |
| 11,393,473 B1* | 7/2022 | Fenster | G06F 3/167 |
| 11,467,802 B2* | 10/2022 | Newendorp | G06F 40/20 |
| 11,477,609 B2* | 10/2022 | Behzadi | G06F 3/0482 |
| 11,481,186 B2* | 10/2022 | Pratt | H04L 67/535 |
| 11,482,224 B2* | 10/2022 | Smith | G06F 3/167 |
| 11,838,582 B1* | 12/2023 | Sharifi | H04N 21/25891 |
| 2007/0061495 A1 | 3/2007 | Cummins et al. | |
| 2014/0159879 A1 | 6/2014 | Rezvani et al. | |
| 2014/0173510 A1 | 6/2014 | Kanno | |
| 2015/0032812 A1* | 1/2015 | Dudley | H04N 21/4431 |
| | | | 709/204 |
| 2015/0355878 A1* | 12/2015 | Corbin | G06F 16/64 |
| | | | 700/94 |
| 2015/0381706 A1* | 12/2015 | Wohlert | H04L 65/764 |
| | | | 709/201 |
| 2016/0260414 A1 | 9/2016 | Yang | |
| 2016/0278143 A1 | 9/2016 | Akhtar Masoom Akhtar | |
| 2017/0010857 A1* | 1/2017 | Bates | G06F 3/162 |
| 2018/0088896 A1* | 3/2018 | Olson | G06F 3/165 |
| 2018/0147913 A1 | 5/2018 | Bergin | |
| 2018/0260453 A1 | 9/2018 | Lim | |
| 2018/0335903 A1* | 11/2018 | Coffman | G06F 3/04847 |
| 2019/0119978 A1 | 4/2019 | Hall et al. | |
| 2019/0342446 A1 | 11/2019 | Coverstone | |
| 2019/0372862 A1 | 12/2019 | Carrigan et al. | |
| 2020/0127988 A1 | 4/2020 | Bradley et al. | |
| 2020/0382332 A1 | 12/2020 | Carrigan et al. | |
| 2020/0387339 A1* | 12/2020 | House | H04R 27/00 |
| 2022/0129144 A1* | 4/2022 | Carrigan | G06F 21/6236 |
| 2022/0229671 A1 | 7/2022 | Nadathur et al. | |
| 2022/0345565 A1* | 10/2022 | Carrigan | G06F 3/0482 |
| 2022/0368740 A1* | 11/2022 | Ketterman | H04L 65/612 |
| 2023/0076970 A1* | 3/2023 | Coburn, IV | G06F 3/162 |
| 2023/0098814 A1* | 3/2023 | Carrigan | G06F 3/165 |
| | | | 715/716 |
| 2023/0275781 A1* | 8/2023 | Roe | H04N 21/44218 |
| | | | 725/12 |
| 2023/0308707 A1* | 9/2023 | Alvarez | H04N 21/4126 |
| 2023/0308721 A1* | 9/2023 | Peterson | H04N 21/436 |
| 2023/0409191 A1* | 12/2023 | Carrigan | G06F 1/1626 |
| 2023/0421687 A1 | 12/2023 | Nadathur et al. | |
| 2024/0045577 A1* | 2/2024 | Kumar | H04N 21/43615 |

OTHER PUBLICATIONS

Advisory Action received for U.S. Appl. No. 17/477,098, dated Aug. 11, 2022, 3 pages.
Applicant-Initiated Interview Summary received for U.S. Appl. No. 17/477,098, dated Apr. 15, 2022, 5 pages.
Applicant-Initiated Interview Summary received for U.S. Appl. No. 17/477,098, dated Jan. 27, 2023, 5 pages.
Applicant-Initiated Interview Summary received for U.S. Appl. No. 17/477,098, dated Jul. 25, 2022, 5 pages.
Final Office Action received for U.S. Appl. No. 17/477,098, dated May 27, 2022, 31 pages.
International Search Report and Written Opinion received for PCT Patent Application No. PCT/US2022/012817, dated Apr. 8, 2022, 22 pages.
International Search Report and Written Opinion received for PCT Patent Application No. PCT/US2022/022570, dated Sep. 13, 2022, 22 pages.
Invitation to Pay Additional Fees and Partial International Search Report received for PCT Patent Application No. PCT/US2022/022570, dated Jun. 29, 2022, 13 pages.
Non-Final Office Action received for U.S. Appl. No. 17/477,098, dated Jan. 24, 2022, 17 pages.
Non-Final Office Action received for U.S. Appl. No. 17/477,098, dated Nov. 9, 2022, 39 pages.
Sengled, "Pairing your Pulse system to a Google Home assistant", Retrieved from the Internet: https://web.archive.org/web/20201123161527/https://support.sengled.com/hc/en-us/articles/360003716593-Pairing-your-Pulse-system-to-a-Google-Home-Assistant, Nov. 23, 2020, 10 pages.
International Preliminary Report on Patentability received for PCT Patent Application No. PCT/US2022/022570, dated Oct. 26, 2023, 16 pages.
Final Office Action received for U.S. Appl. No. 17/477,098, dated Mar. 8, 2023, 58 pages.
Applicant-Initiated Interview Summary received for U.S. Appl. No. 17/477,098, dated May 19, 2023, 8 pages.
Notice of Allowance received for U.S. Appl. No. 17/477,098, dated Jun. 16, 2023, 8 pages.

\* cited by examiner

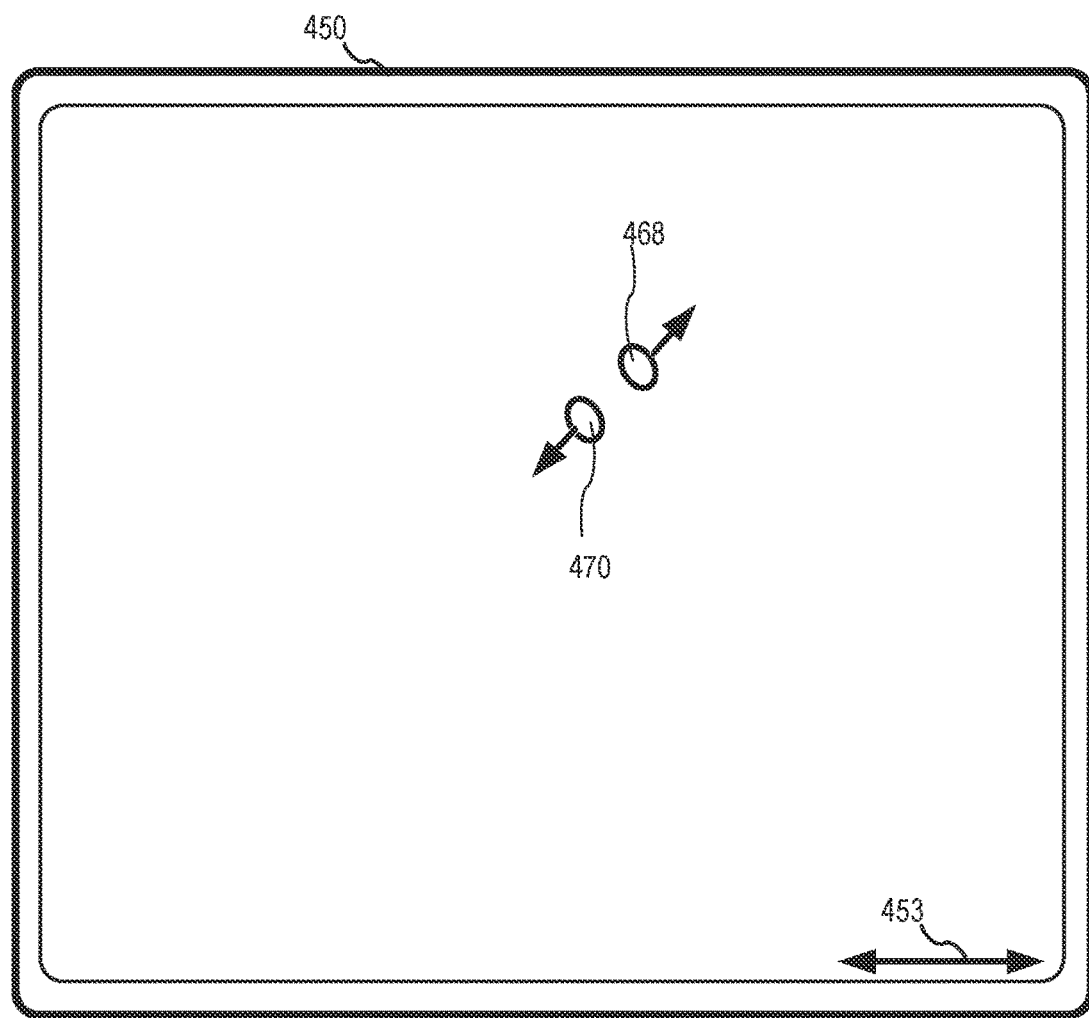
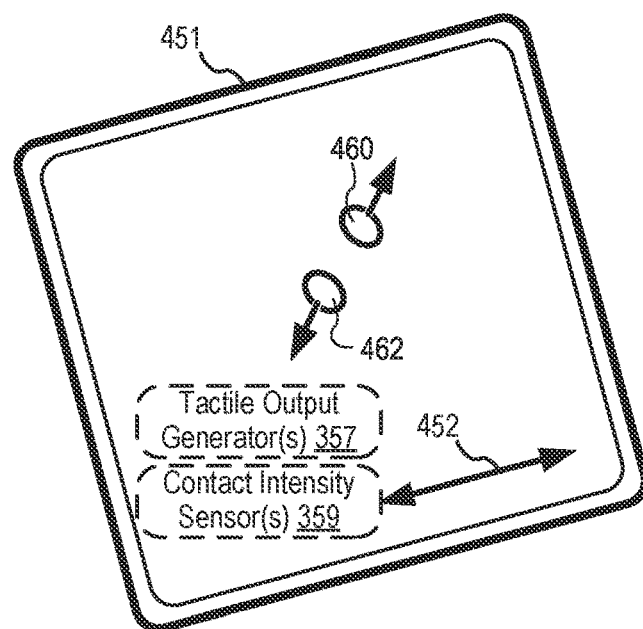
FIG. 4B

800

802
while configuring the first external electronic device for use with a device management application:

804
in accordance with a determination that the first external electronic device satisfies a set of selection criteria, display, via the display generation component, a user-interactive graphical user interface object that, when selected, configures the first external electronic device to be available for a first media playback function

806
in accordance with a determination that the external electronic device does not satisfy the set of selection criteria, forgo displaying, during the configuring of the first external electronic device for use with the device management application, the user-interactive graphical user interface object

808
after configuring the first external electronic device for use with a device management application and while the first external electronic device is not configured to be available for the first media playback function, receive a first set of one or more inputs

810
in response to the first set of one or more inputs, configure the first external electronic device to be available for the first media playback function

1002
receive a first request to perform a first media playback operation using one or more of the plurality of external electronic devices

1004
in response to the first request:

1006
in accordance with a determination that the first request is a request to perform the first media playback operation at two or more of the plurality of devices and a determination that the first request does not designate a specific device to perform the first media playback operation:

1008
in accordance with a determination that the first external electronic device satisfies a first set of criteria, cause the first external electronic device to perform the first media playback operation

1010
in accordance with a determination that the first external electronic device does not satisfy the first set of criteria, forgo causing the first external electronic device to perform the first media playback operation

1014
causing the third external electronic device to perform the first media playback operation

1012
in accordance with a determination that the first request designates at least the first external electronic device to perform the first media playback operation, causing the first external electronic device to perform the first media playback operation

INDICATORS LEDS

| REQUIREMENTS | SINGLE LED | | | MULTIPLE LEDS | | | | |
|---|---|---|---|---|---|---|---|---|
| | 1130a MINIMUM Multi-Color LED | 1130b GOOD Multi-Color LED Refresh Rate | 1130c GOOD+ Multi-Color LED Refresh Rate Mic Input | 1130d MINIMUM Multi-Color LEDs | 1130e GOOD Multi-Color LED Refresh Rate | 1130f GOOD+ Multi-Color LED Refresh Rate Mic Input | 1130g BETTER Multi-Color LEDs Refresh Rate Diffusion | 1130h BEST Multi-Color LEDs Refresh Rate Diffusion Mic Input |
| ASSISTANT | | | | | | | | |
| IDLE | ● OFF | ● | ● | ●●● | ●●● | ●●● | ●●●● | ●●●● |
| LISTENING 1132a | ○ ON | ○ | ○ | ○○○ | ○○○ | ○○○ | ○○○ DYNAMIC | ○○○ DYNAMIC |
| PROCESSING | ○ | ○ ANIMATE | ○ ANIMATE | ○○○ | ○○○ ANIMATE | ○○○ ANIMATE | ○○○ ANIMATE | ○○○ ANIMATE |
| RESPONDING 1132b | ○ | ○ | ○ | ○○○ | ○○○ | ○○○ | ○○○ ANIMATE | ○○○ DYNAMIC |
| SMART SPEAKER | | | | | | | | |
| ALARM | ○ | ○ ANIMATE | ○ DYNAMIC | ○○○ | ○○○ ANIMATE | ○○○ DYNAMIC | ○○○ DYNAMIC | ○○○ DYNAMIC |
| TIMER 1132c | ○ | ○ ANIMATE | ○ DYNAMIC | ○○○ | ○○○ ANIMATE | ○○○ DYNAMIC | ○○○ DYNAMIC | ○○○ DYNAMIC |
| PHONE CALL | ◐ | ◐ ANIMATE | ◐ ANIMATE | ◐◐◐ | ◐◐◐ ANIMATE | ◐◐◐ ANIMATE | ◐◐◐ ANIMATE | ◐◐◐ ANIMATE |
| BROADCAST | ◐ | ◐ | ◐ | ◐◐◐ | ◐◐◐ | ◐◐◐ | ◐◐◐ | ◐◐◐ |
| MEDIA PLAYBACK | ● | ● | ● | ●●● | ●●● | ●●● | ●●● | ●●● |

*FIG. 11I*

INTERFACES AND DEVICES FOR DYNAMICALLY-AVAILABLE MEDIA PLAYBACK

CROSS-REFERENCE TO RELATED APPLICATIONS

This application claims priority to U.S. Provisional Application No. 63/197,423, entitled "INTERFACES AND DEVICES FOR DYNAMICALLY-AVAILABLE MEDIA PLAYBACK," filed Jun. 6, 2021, and U.S. Provisional Application No. 63/175,312, entitled "INTERFACES AND DEVICES FOR DYNAMICALLY-AVAILABLE MEDIA PLAYBACK," filed Apr. 15, 2021, the entire contents of which are hereby incorporated by reference.

FIELD

The present disclosure relates generally to electronic devices and computer user interfaces, and more specifically to techniques for managing dynamically-available media playback and for adapting visual outputs based on device capabilities.

BACKGROUND

The number of electronic devices, and particularly smart devices with differing media playback capabilities, continues to increase. These devices are increasingly being interconnected with each other, are increasingly more capable, and are performing more complex tasks, including media- and digital assistant-related tasks. As such, these devices are increasingly expected to have thoughtfully-designed user interfaces.

BRIEF SUMMARY

Some techniques for managing dynamically-available media playback and for adapting visual outputs based on device capabilities using electronic devices, however, are generally cumbersome and inefficient. For example, some existing techniques use a complex and time-consuming user interface, which may include multiple key presses or keystrokes; some existing techniques do not account for differences in media playback capabilities of different devices. Existing techniques require more time than necessary or do not adapt to device differences with respect to media playback, wasting user time and device energy. This latter consideration is particularly important in battery-operated devices.

Accordingly, the present technique provides electronic devices with faster, more efficient methods and interfaces for managing dynamically-available media playback and for adapting visual outputs based on device capabilities. Such methods and interfaces optionally complement or replace other methods for managing dynamically-available media playback. Such methods and interfaces reduce the cognitive burden on a user and produce a more efficient human-machine interface. For battery-operated computing devices, such methods and interfaces conserve power, increase the time between battery charges, and are better-suited to different media playback and visual output capabilities of different devices.

Example methods are disclosed herein. An example method is performed at a computer system that is in communication with a display generation component and a first external electronic device that satisfies a set of media playback hardware criteria. The example method includes, while configuring the first external electronic device for use with a device management application: in accordance with a determination that the first external electronic device satisfies a set of selection criteria, displaying, via the display generation component, a user-interactive graphical user interface object that, when selected, configures the first external electronic device to be available for a first media playback function; and in accordance with a determination that the external electronic device does not satisfy the set of selection criteria, forgo displaying, during the configuring of the first external electronic device for use with the device management application, the user-interactive graphical user interface object.

Example non-transitory computer-readable storage medium are disclosed herein. An example non-transitory computer-readable storage medium stores one or more programs configured to be executed by one or more processors of a computer system that is in communication with a display generation component and a first external electronic device that satisfies a set of media playback hardware criteria. The one or more programs including instructions for: while configuring the first external electronic device for use with a device management application: in accordance with a determination that the first external electronic device satisfies a set of selection criteria, displaying, via the display generation component, a user-interactive graphical user interface object that, when selected, configures the first external electronic device to be available for a first media playback function; and in accordance with a determination that the external electronic device does not satisfy the set of selection criteria, forgo displaying, during the configuring of the first external electronic device for use with the device management application, the user-interactive graphical user interface object.

Example transitory computer-readable storage medium are disclosed herein. An example transitory computer-readable storage medium stores one or more programs configured to be executed by one or more processors of a computer system that is in communication with a display generation component and a first external electronic device that satisfies a set of media playback hardware criteria. The one or more programs including instructions for: while configuring the first external electronic device for use with a device management application: in accordance with a determination that the first external electronic device satisfies a set of selection criteria, displaying, via the display generation component, a user-interactive graphical user interface object that, when selected, configures the first external electronic device to be available for a first media playback function; and in accordance with a determination that the external electronic device does not satisfy the set of selection criteria, forgo displaying, during the configuring of the first external electronic device for use with the device management application, the user-interactive graphical user interface object.

Example computer systems are disclosed herein. An example computer system is in communication with a first external electronic device that satisfies a set of media playback hardware criteria and includes a display generation component; one or more processors; and memory storing one or more programs configured to be executed by the one or more processors. The one or more programs including instructions for: while configuring the first external electronic device for use with a device management application: in accordance with a determination that the first external electronic device satisfies a set of selection criteria, displaying, via the display generation component, a user-interactive graphical user interface object that, when selected, configures the first external electronic device to be available for a first media playback function; and in accordance with a determination that the external electronic device does not satisfy the set of selection criteria, forgo displaying, during the configuring of the first external electronic device for use with the device management application, the user-interactive graphical user interface object.

An example computer system is in communication with a first external electronic device that satisfies a set of media playback hardware criteria and includes a display generation component; and means for, while configuring the first external electronic device for use with a device management application: in accordance with a determination that the first external electronic device satisfies a set of selection criteria, displaying, via the display generation component, a user-interactive graphical user interface object that, when selected, configures the first external electronic device to be available for a first media playback function; and in accordance with a determination that the external electronic device does not satisfy the set of selection criteria, forgoing displaying, during the configuring of the first external electronic device for use with the device management application, the user-interactive graphical user interface object.

An example method is performed at a computer system that is in communication with a plurality of external electronic devices, including a first external electronic device. The method includes receiving a first request to perform a first media playback operation using one or more of the plurality of external electronic devices; and in response to the first request: in accordance with a determination that the first request is a request to perform the first media playback operation at two or more of the plurality of devices and a determination that the first request does not designate a specific device to perform the first media playback operation: in accordance with a determination that the first external electronic device satisfies a first set of criteria, causing the first external electronic device to perform the first media playback operation; and in accordance with a determination that the first external electronic device does not satisfy the first set of criteria, forgo causing the first external electronic device to perform the first media playback operation; and in accordance with a determination that the first request designates at least the first external electronic device to perform the first media playback operation, causing the first external electronic device to perform the first media playback operation.

An example non-transitory computer-readable storage medium stores one or more programs configured to be executed by one or more processors of a computer system that is in communication with a plurality of external electronic devices, including a first external electronic device. The one or more programs including instructions for receiving a first request to perform a first media playback operation using one or more of the plurality of external electronic devices; and in response to the first request: in accordance with a determination that the first request is a request to perform the first media playback operation at two or more of the plurality of devices and a determination that the first request does not designate a specific device to perform the first media playback operation: in accordance with a determination that the first external electronic device satisfies a first set of criteria, causing the first external electronic device to perform the first media playback operation; and in accordance with a determination that the first external electronic device does not satisfy the first set of criteria, forgo causing the first external electronic device to perform the first media playback operation; and in accordance with a determination that the first request designates at least the first external electronic device to perform the first media playback operation, causing the first external electronic device to perform the first media playback operation.

An example transitory computer-readable storage medium stores one or more programs configured to be executed by one or more processors of a computer system that is in communication with a plurality of external electronic devices, including a first external electronic device. The one or more programs including instructions for receiving a first request to perform a first media playback operation using one or more of the plurality of external electronic devices; and in response to the first request: in accordance with a determination that the first request is a request to perform the first media playback operation at two or more of the plurality of devices and a determination that the first request does not designate a specific device to perform the first media playback operation: in accordance with a determination that the first external electronic device satisfies a first set of criteria, causing the first external electronic device to perform the first media playback operation; and in accordance with a determination that the first external electronic device does not satisfy the first set of criteria, forgo causing the first external electronic device to perform the first media playback operation; and in accordance with a determination that the first request designates at least the first external electronic device to perform the first media playback operation, causing the first external electronic device to perform the first media playback operation.

An example computer system is in communication with a plurality of external electronic devices, including a first external electronic device. The computer system includes: one or more processors; and memory storing one or more programs configured to be executed by the one or more processors, the one or more programs including instructions for: receiving a first request to perform a first media playback operation using one or more of the plurality of external electronic devices; and in response to the first request: in accordance with a determination that the first request is a request to perform the first media playback operation at two or more of the plurality of devices and a determination that the first request does not designate a specific device to perform the first media playback operation: in accordance with a determination that the first external electronic device satisfies a first set of criteria, causing the first external electronic device to perform the first media playback operation; and in accordance with a determination that the first external electronic device does not satisfy the first set of criteria, forgo causing the first external electronic device to perform the first media playback operation; and in accordance with a determination that the first request designates at least the first external electronic device to perform the first media playback operation, causing the first external electronic device to perform the first media playback operation.

An example computer system is in communication with a plurality of external electronic devices, including a first external electronic device. The computer system includes: means for receiving a first request to perform a first media playback operation using one or more of the plurality of external electronic devices; and means for, in response to the first request: in accordance with a determination that the first request is a request to perform the first media playback operation at two or more of the plurality of devices and a determination that the first request does not designate a specific device to perform the first media playback operation: in accordance with a determination that the first external electronic device satisfies a first set of criteria, causing the first external electronic device to perform the first media playback operation; and in accordance with a determination that the first external electronic device does not satisfy the first set of criteria, forgo causing the first external electronic device to perform the first media playback operation; and in accordance with a determination that the first request designates at least the first external electronic device to perform the first media playback operation, causing the first external electronic device to perform the first media playback operation.

In accordance with some embodiments, a method performed at an electronic device that includes a set of one or more visual output devices is described. The method comprises: while the electronic device is operating in a first state, detecting a change from the first state to an updated state; and in response to detecting the change from the first state to the updated state: in accordance with a determination that the updated state is a second state, different from the first state: in accordance with the set of one or more visual output devices having a first set of visual output capabilities, providing, via the set of one or more visual output devices, a first type of visual output; and in accordance with the set of one or more visual output devices having a second set of visual output capabilities, different from the first set of visual output capabilities, providing, via the set of one or more visual output devices, a second type of visual output, different from the first type of visual output; and in accordance with a determination that the updated state is a third state, different from the first state and the second state: in accordance with the set of one or more visual output devices having a third set of visual output capabilities, providing, via the set of one or more visual output devices, a third type of visual output; and in accordance with the set of one or more visual output devices having a fourth set of visual output capabilities, different from the third set of visual output capabilities, providing, via the set of one or more visual output devices, a fourth type of visual output, different from the third type of visual output.

In accordance with some embodiments, a non-transitory computer-readable storage medium is described. The non-transitory computer-readable storage medium stores one or more programs configured to be executed by one or more processors of an electronic device that includes a set of one or more visual output devices, the one or more programs including instructions for: while the electronic device is operating in a first state, detecting a change from the first state to an updated state; and in response to detecting the change from the first state to the updated state: in accordance with a determination that the updated state is a second state, different from the first state: in accordance with the set of one or more visual output devices having a first set of visual output capabilities, providing, via the set of one or more visual output devices, a first type of visual output; and in accordance with the set of one or more visual output devices having a second set of visual output capabilities, different from the first set of visual output capabilities, providing, via the set of one or more visual output devices, a second type of visual output, different from the first type of visual output; and in accordance with a determination that the updated state is a third state, different from the first state and the second state: in accordance with the set of one or more visual output devices having a third set of visual output capabilities, providing, via the set of one or more visual output devices, a third type of visual output; and in accordance with the set of one or more visual output devices having a fourth set of visual output capabilities, different from the third set of visual output capabilities, providing, via the set of one or more visual output devices, a fourth type of visual output, different from the third type of visual output.

In accordance with some embodiments, a transitory computer-readable storage medium is described. The transitory computer-readable storage medium stores one or more programs configured to be executed by one or more processors of an electronic device that includes a set of one or more visual components, the one or more programs including instructions for: while the electronic device is operating in a first state, detecting a change from the first state to an updated state; and in response to detecting the change from the first state to the updated state: in accordance with a determination that the updated state is a second state, different from the first state: in accordance with the set of one or more visual output devices having a first set of visual output capabilities, providing, via the set of one or more visual output devices, a first type of visual output; and in accordance with the set of one or more visual output devices having a second set of visual output capabilities, different from the first set of visual output capabilities, providing, via the set of one or more visual output devices, a second type of visual output, different from the first type of visual output; and in accordance with a determination that the updated state is a third state, different from the first state and the second state: in accordance with the set of one or more visual output devices having a third set of visual output capabilities, providing, via the set of one or more visual output devices, a third type of visual output; and in accordance with the set of one or more visual output devices having a fourth set of visual output capabilities, different from the third set of visual output capabilities, providing, via the set of one or more visual output devices, a fourth type of visual output, different from the third type of visual output.

In accordance with some embodiments, an electronic device that includes a set of one or more visual components is described. The electronic device comprises: one or more processors; and memory storing one or more programs configured to be executed by the one or more processors, the one or more programs including instructions for: while the electronic device is operating in a first state, detecting a change from the first state to an updated state; and in response to detecting the change from the first state to the updated state: in accordance with a determination that the updated state is a second state, different from the first state: in accordance with the set of one or more visual output devices having a first set of visual output capabilities, providing, via the set of one or more visual output devices, a first type of visual output; and in accordance with the set of one or more visual output devices having a second set of visual output capabilities, different from the first set of visual output capabilities, providing, via the set of one or more visual output devices, a second type of visual output, different from the first type of visual output; and in accordance with a determination that the updated state is a third state, different from the first state and the second state: in accordance with the set of one or more visual output devices having a third set of visual output capabilities, providing, via the set of one or more visual output devices, a third type of visual output; and in accordance with the set of one or more visual output devices having a fourth set of visual output capabilities, different from the third set of visual output capabilities, providing, via the set of one or more visual output devices, a fourth type of visual output, different from the third type of visual output.

In accordance with some embodiments, an electronic device that includes a set of one or more visual components is described. The electronic device comprises: means, while the electronic device is operating in a first state, for detecting a change from the first state to an updated state; and means, responsive to detecting the change from the first state to the updated state, for: in accordance with a determination that the updated state is a second state, different from the first state: in accordance with the set of one or more visual output devices having a first set of visual output capabilities, providing, via the set of one or more visual output devices, a first type of visual output; and in accordance with the set of one or more visual output devices having a second set of visual output capabilities, different from the first set of visual output capabilities, providing, via the set of one or more visual output devices, a second type of visual output, different from the first type of visual output; and in accordance with a determination that the updated state is a third state, different from the first state and the second state: in accordance with the set of one or more visual output devices having a third set of visual output capabilities, providing, via the set of one or more visual output devices, a third type of visual output; and in accordance with the set of one or more visual output devices having a fourth set of visual output capabilities, different from the third set of visual output capabilities, providing, via the set of one or more visual output devices, a fourth type of visual output, different from the third type of visual output.

In accordance with some embodiments, a computer program product is described. The computer program product comprises one or more programs configured to be executed by one or more processors of an electronic device that includes a set of one or more visual output devices. The one or more programs including instructions for: while the electronic device is operating in a first state, detecting a change from the first state to an updated state; and in response to detecting the change from the first state to the updated state: in accordance with a determination that the updated state is a second state, different from the first state: in accordance with the set of one or more visual output devices having a first set of visual output capabilities, providing, via the set of one or more visual output devices, a first type of visual output; and in accordance with the set of one or more visual output devices having a second set of visual output capabilities, different from the first set of visual output capabilities, providing, via the set of one or more visual output devices, a second type of visual output, different from the first type of visual output; and in accordance with a determination that the updated state is a third state, different from the first state and the second state: in accordance with the set of one or more visual output devices having a third set of visual output capabilities, providing, via the set of one or more visual output devices, a third type of visual output; and in accordance with the set of one or more visual output devices having a fourth set of visual output capabilities, different from the third set of visual output capabilities, providing, via the set of one or more visual output devices, a fourth type of visual output, different from the third type of visual output.

Executable instructions for performing these functions are, optionally, included in a non-transitory computer-readable storage medium or other computer program product configured for execution by one or more processors. Executable instructions for performing these functions are, optionally, included in a transitory computer-readable storage medium or other computer program product configured for execution by one or more processors.

Thus, devices are provided with faster, more efficient methods and interfaces for managing dynamically-available media playback and for adapting visual outputs based on device capabilities, thereby increasing the effectiveness, efficiency, and user satisfaction with such devices. Such methods and interfaces may complement or replace other methods for managing dynamically-available media playback.

DESCRIPTION OF THE FIGURES

For a better understanding of the various described embodiments, reference should be made to the Description of Embodiments below, in conjunction with the following drawings in which like reference numerals refer to corresponding parts throughout the figures.

FIG. 4B illustrates an exemplary user interface for a multifunction device with a touch-sensitive surface that is separate from the display in accordance with some embodiments.

FIG. 8 is a flowchart illustrating an exemplary method for managing dynamically-available media playback, in accordance with some embodiments.

FIG. 10 is a flowchart illustrating an exemplary method for managing dynamically-available media playback, in accordance with some embodiments.

FIGS. 11A-11I illustrate scenarios and user interfaces for adapting visual outputs based on device capabilities and a state of the device, in accordance with some embodiments.

DESCRIPTION OF EMBODIMENTS

The following description sets forth exemplary methods, parameters, and the like. It should be recognized, however, that such description is not intended as a limitation on the scope of the present disclosure but is instead provided as a description of exemplary embodiments.

There is a need for electronic devices that provide efficient methods and interfaces for managing dynamically-available media playback and for adapting visual outputs based on device capabilities. Such techniques can reduce the cognitive burden on a user who requests media playback operations, thereby enhancing productivity. Further, such techniques can reduce processor and battery power otherwise wasted on redundant user inputs.

Figure 7A:
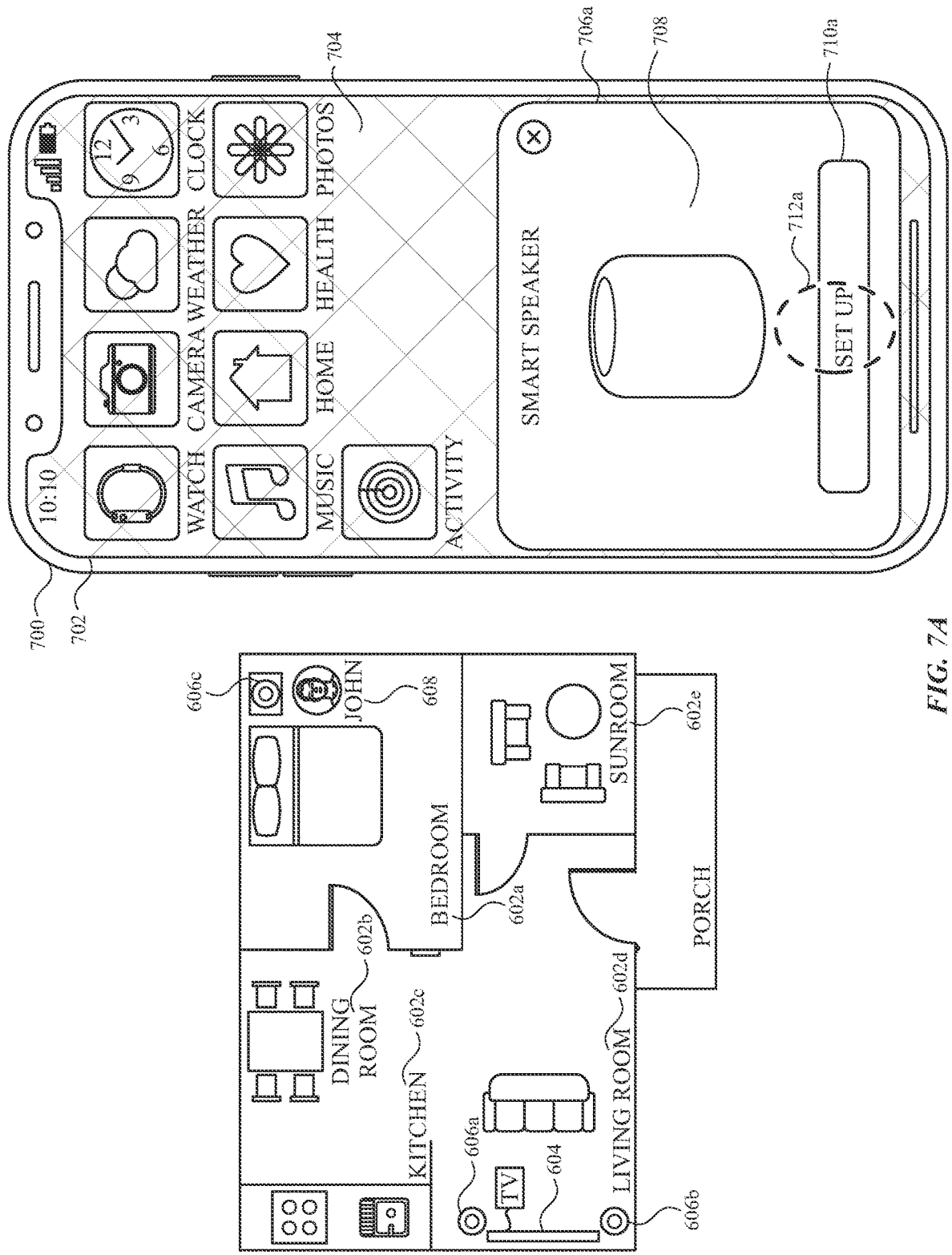
FIGS. 7A-7R illustrate exemplary diagrams and user interfaces for managing dynamically-available media playback in accordance with some embodiments.

Below, FIGS. 1A-1B, 2, 3, 4A-4B, and 5A-5D provide a description of exemplary devices for performing the techniques for managing dynamically-available media playback. FIGS. 7A-7R illustrate exemplary diagrams and user interfaces for managing dynamically-available media playback. FIG. 8 is a flow diagram illustrating methods of managing dynamically-available media playback in accordance with some embodiments. The user interfaces in FIGS. 7A-7R are used to illustrate the processes described below, including the processes in FIG. 8. FIGS. 9A-9H illustrate exemplary diagrams and user interfaces for managing dynamically-available media playback. FIG. 10 is a flow diagram illustrating methods of managing dynamically-available media playback in accordance with some embodiments. The user interfaces in FIGS. 9A-9H are used to illustrate the processes described below, including the processes in FIG. 10. FIGS. 11A-11I illustrate scenarios and user interfaces for adapting visual outputs based on device capabilities and a state of the device, in accordance with some embodiments. FIG. 12 is a flowchart illustrating an exemplary method for adapting visual outputs based on device capabilities, in accordance with some embodiments. The scenarios and user interfaces in FIGS. 11A-11I are used to illustrate the processes described below, including the processes in FIG. 10.

The processes described below enhance the operability of the devices and make the user-device interfaces more efficient (e.g., by helping the user to provide proper inputs and reducing user mistakes when operating/interacting with the device) through various techniques, including by providing improved visual feedback to the user, reducing the number of inputs needed to perform an operation, providing additional control options without cluttering the user interface with additional displayed controls, performing an operation when a set of conditions has been met without requiring further user input, and/or additional techniques. These techniques also reduce power usage and improve battery life of the device by enabling the user to use the device more quickly and efficiently.

In addition, in methods described herein where one or more steps are contingent upon one or more conditions having been met, it should be understood that the described method can be repeated in multiple repetitions so that over the course of the repetitions all of the conditions upon which steps in the method are contingent have been met in different repetitions of the method. For example, if a method requires performing a first step if a condition is satisfied, and a second step if the condition is not satisfied, then a person of ordinary skill would appreciate that the claimed steps are repeated until the condition has been both satisfied and not satisfied, in no particular order. Thus, a method described with one or more steps that are contingent upon one or more conditions having been met could be rewritten as a method that is repeated until each of the conditions described in the method has been met. This, however, is not required of system or computer readable medium claims where the system or computer readable medium contains instructions for performing the contingent operations based on the satisfaction of the corresponding one or more conditions and thus is capable of determining whether the contingency has or has not been satisfied without explicitly repeating steps of a method until all of the conditions upon which steps in the method are contingent have been met. A person having ordinary skill in the art would also understand that, similar to a method with contingent steps, a system or computer readable storage medium can repeat the steps of a method as many times as are needed to ensure that all of the contingent steps have been performed.

Although the following description uses terms "first," "second," etc. to describe various elements, these elements should not be limited by the terms. These terms are only used to distinguish one element from another. For example, a first touch could be termed a second touch, and, similarly, a second touch could be termed a first touch, without departing from the scope of the various described embodiments. The first touch and the second touch are both touches, but they are not the same touch.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

The term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Embodiments of electronic devices, user interfaces for such devices, and associated processes for using such devices are described. In some embodiments, the device is a portable communications device, such as a mobile telephone, that also contains other functions, such as PDA and/or music player functions. Exemplary embodiments of portable multifunction devices include, without limitation, the iPhone®, iPod Touch®, and iPad® devices from Apple Inc. of Cupertino, California Other portable electronic devices, such as laptops or tablet computers with touch-sensitive surfaces (e.g., touch screen displays and/or touchpads), are, optionally, used. It should also be understood that, in some embodiments, the device is not a portable communications device, but is a desktop computer with a touch-sensitive surface (e.g., a touch screen display and/or a touchpad). In some embodiments, the electronic device is a computer system that is in communication (e.g., via wireless communication, via wired communication) with a display generation component. The display generation component is configured to provide visual output, such as display via a CRT display, display via an LED display, or display via image projection. In some embodiments, the display generation component is integrated with the computer system.

In some embodiments, the display generation component is separate from the computer system. As used herein, "displaying" content includes causing to display the content (e.g., video data rendered or decoded by display controller 156) by transmitting, via a wired or wireless connection, data (e.g., image data or video data) to an integrated or external display generation component to visually produce the content.

In the discussion that follows, an electronic device that includes a display and a touch-sensitive surface is described. It should be understood, however, that the electronic device optionally includes one or more other physical user-interface devices, such as a physical keyboard, a mouse, and/or a joystick.

The device typically supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that are executed on the device optionally use at least one common physical user-interface device, such as the touch-sensitive surface. One or more functions of the touch-sensitive surface as well as corresponding information displayed on the device are, optionally, adjusted and/or varied from one application to the next and/or within a respective application. In this way, a common physical architecture (such as the touch-sensitive surface) of the device optionally supports the variety of applications with user interfaces that are intuitive and transparent to the user.

Figure 1A:
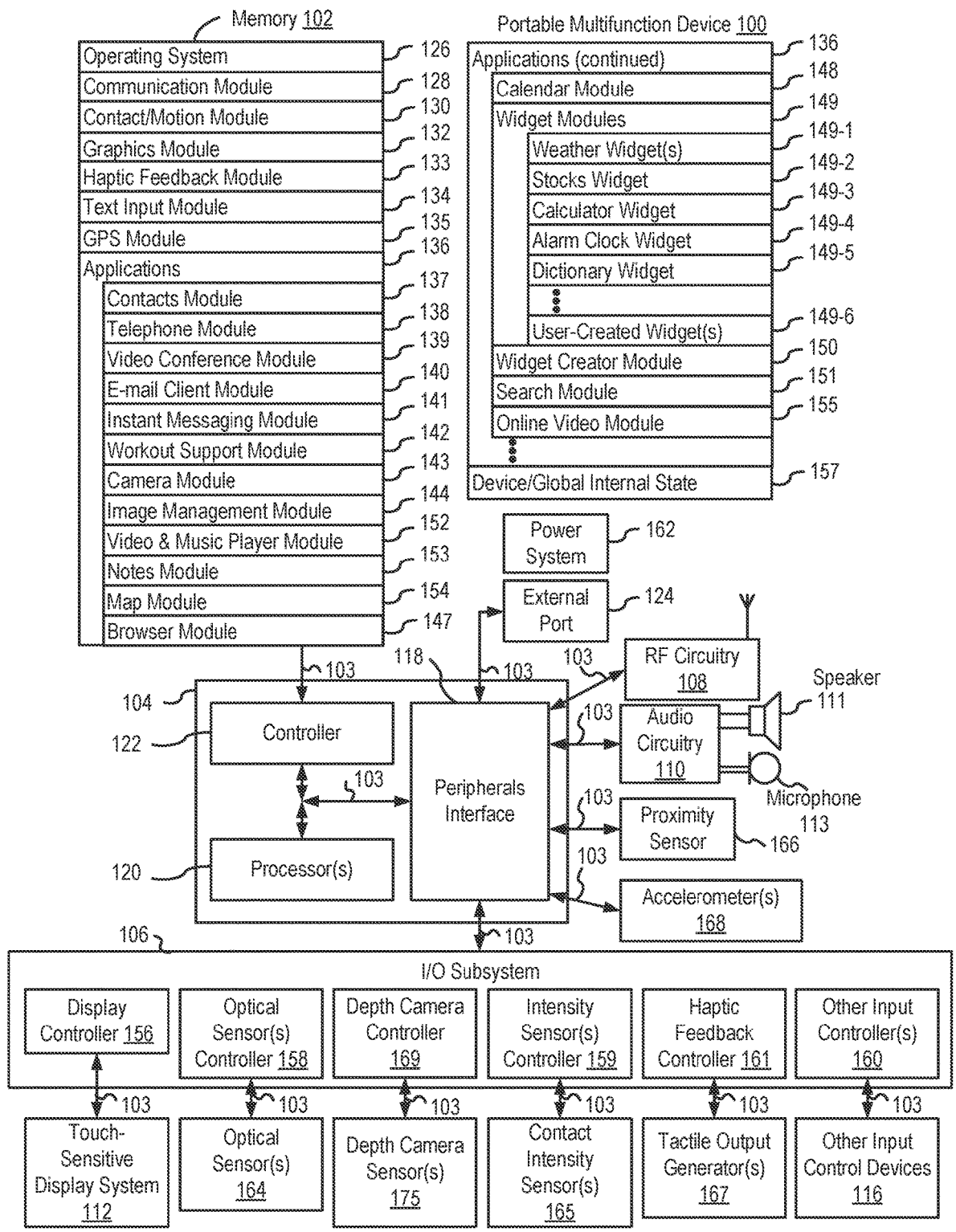
FIG. 1A is a block diagram illustrating a portable multifunction device with a touch-sensitive display in accordance with some embodiments.

Attention is now directed toward embodiments of portable devices with touch-sensitive displays. FIG. 1A is a block diagram illustrating portable multifunction device 100 with touch-sensitive display system 112 in accordance with some embodiments. Touch-sensitive display 112 is sometimes called a "touch screen" for convenience and is sometimes known as or called a "touch-sensitive display system." Device 100 includes memory 102 (which optionally includes one or more computer-readable storage mediums), memory controller 122, one or more processing units (CPUs) 120, peripherals interface 118, RF circuitry 108, audio circuitry 110, speaker 111, microphone 113, input/output (I/O) subsystem 106, other input control devices 116, and external port 124. Device 100 optionally includes one or more optical sensors 164. Device 100 optionally includes one or more contact intensity sensors 165 for detecting intensity of contacts on device 100 (e.g., a touch-sensitive surface such as touch-sensitive display system 112 of device 100). Device 100 optionally includes one or more tactile output generators 167 for generating tactile outputs on device 100 (e.g., generating tactile outputs on a touch-sensitive surface such as touch-sensitive display system 112 of device 100 or touchpad 355 of device 300). These components optionally communicate over one or more communication buses or signal lines 103.

As used in the specification and claims, the term "intensity" of a contact on a touch-sensitive surface refers to the force or pressure (force per unit area) of a contact (e.g., a finger contact) on the touch-sensitive surface, or to a substitute (proxy) for the force or pressure of a contact on the touch-sensitive surface. The intensity of a contact has a range of values that includes at least four distinct values and more typically includes hundreds of distinct values (e.g., at least 256). Intensity of a contact is, optionally, determined (or measured) using various approaches and various sensors or combinations of sensors. For example, one or more force sensors underneath or adjacent to the touch-sensitive surface are, optionally, used to measure force at various points on the touch-sensitive surface. In some implementations, force measurements from multiple force sensors are combined (e.g., a weighted average) to determine an estimated force of a contact. Similarly, a pressure-sensitive tip of a stylus is, optionally, used to determine a pressure of the stylus on the touch-sensitive surface. Alternatively, the size of the contact area detected on the touch-sensitive surface and/or changes thereto, the capacitance of the touch-sensitive surface proximate to the contact and/or changes thereto, and/or the resistance of the touch-sensitive surface proximate to the contact and/or changes thereto are, optionally, used as a substitute for the force or pressure of the contact on the touch-sensitive surface. In some implementations, the substitute measurements for contact force or pressure are used directly to determine whether an intensity threshold has been exceeded (e.g., the intensity threshold is described in units corresponding to the substitute measurements). In some implementations, the substitute measurements for contact force or pressure are converted to an estimated force or pressure, and the estimated force or pressure is used to determine whether an intensity threshold has been exceeded (e.g., the intensity threshold is a pressure threshold measured in units of pressure). Using the intensity of a contact as an attribute of a user input allows for user access to additional device functionality that may otherwise not be accessible by the user on a reduced-size device with limited real estate for displaying affordances (e.g., on a touch-sensitive display) and/or receiving user input (e.g., via a touch-sensitive display, a touch-sensitive surface, or a physical/mechanical control such as a knob or a button).

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a "down click" or "up click" of a physical actuator button. In some cases, a user will feel a tactile sensation such as an "down click" or "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user.

It should be appreciated that device 100 is only one example of a portable multifunction device, and that device 100 optionally has more or fewer components than shown, optionally combines two or more components, or optionally has a different configuration or arrangement of the components. The various components shown in FIG. 1A are implemented in hardware, software, or a combination of both hardware and software, including one or more signal processing and/or application-specific integrated circuits.

Memory 102 optionally includes high-speed random access memory and optionally also includes non-volatile memory, such as one or more magnetic disk storage devices, flash memory devices, or other non-volatile solid-state memory devices. Memory controller 122 optionally controls access to memory 102 by other components of device 100.

Peripherals interface 118 can be used to couple input and output peripherals of the device to CPU 120 and memory 102. The one or more processors 120 run or execute various software programs (such as computer programs (e.g., including instructions)) and/or sets of instructions stored in memory 102 to perform various functions for device 100 and to process data. In some embodiments, peripherals interface 118, CPU 120, and memory controller 122 are, optionally, implemented on a single chip, such as chip 104. In some other embodiments, they are, optionally, implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The RF circuitry 108 optionally includes well-known circuitry for detecting near field communication (NFC) fields, such as by a short-range communication radio. The wireless communication optionally uses any of a plurality of communications standards, protocols, and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Bluetooth Low Energy (BTLE), Wireless Fidelity (Wi-Fi) (e.g., IEEE 802.11a, IEEE 802.11b, IEEE 802.11g, IEEE 802.11n, and/or IEEE 802.11ac), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data is, optionally, retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch screen 112 and other input control devices 116, to peripherals interface 118. I/O subsystem 106 optionally includes display controller 156, optical sensor controller 158, depth camera controller 169, intensity sensor controller 159, haptic feedback controller 161, and one or more input controllers 160 for other input or control devices. The one or more input controllers 160 receive/send electrical signals from/to other input control devices 116. The other input control devices 116 optionally include physical buttons (e.g., push buttons, rocker buttons, etc.), dials, slider switches, joysticks, click wheels, and so forth. In some embodiments, input controller(s) 160 are, optionally, coupled to any (or none) of the following: a keyboard, an infrared port, a USB port, and a pointer device such as a mouse. The one or more buttons (e.g., 208, FIG. 2) optionally include an up/down button for volume control of speaker 111 and/or microphone 113. The one or more buttons optionally include a push button (e.g., 206, FIG. 2). In some embodiments, the electronic device is a computer system that is in communication (e.g., via wireless communication, via wired communication) with one or more input devices. In some embodiments, the one or more input devices include a touch-sensitive surface (e.g., a trackpad, as part of a touch-sensitive display). In some embodiments, the one or more input devices include one or more camera sensors (e.g., one or more optical sensors 164 and/or one or more depth camera sensors 175), such as for tracking a user's gestures (e.g., hand gestures) as input. In some embodiments, the one or more input devices are integrated with the computer system. In some embodiments, the one or more input devices are separate from the computer system.

A quick press of the push button optionally disengages a lock of touch screen 112 or optionally begins a process that uses gestures on the touch screen to unlock the device, as described in U.S. patent application Ser. No. 11/322,549, "Unlocking a Device by Performing Gestures on an Unlock Image," filed Dec. 23, 2005, U.S. Pat. No. 7,657,849, which is hereby incorporated by reference in its entirety. A longer press of the push button (e.g., 206) optionally turns power to device 100 on or off. The functionality of one or more of the buttons are, optionally, user-customizable. Touch screen 112 is used to implement virtual or soft buttons and one or more soft keyboards.

Touch-sensitive display 112 provides an input interface and an output interface between the device and a user. Display controller 156 receives and/or sends electrical signals from/to touch screen 112. Touch screen 112 displays visual output to the user. The visual output optionally includes graphics, text, icons, video, and any combination thereof (collectively termed "graphics"). In some embodiments, some or all of the visual output optionally corresponds to user-interface objects.

Touch screen 112 has a touch-sensitive surface, sensor, or set of sensors that accepts input from the user based on haptic and/or tactile contact. Touch screen 112 and display controller 156 (along with any associated modules and/or sets of instructions in memory 102) detect contact (and any movement or breaking of the contact) on touch screen 112 and convert the detected contact into interaction with user-interface objects (e.g., one or more soft keys, icons, web pages, or images) that are displayed on touch screen 112. In an exemplary embodiment, a point of contact between touch screen 112 and the user corresponds to a finger of the user.

Touch screen 112 optionally uses LCD (liquid crystal display) technology, LPD (light emitting polymer display) technology, or LED (light emitting diode) technology, although other display technologies are used in other embodiments. Touch screen 112 and display controller 156 optionally detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch screen 112. In an exemplary embodiment, projected mutual capacitance sensing technology is used, such as that found in the iPhone® and iPod Touch® from Apple Inc. of Cupertino, California.

A touch-sensitive display in some embodiments of touch screen 112 is, optionally, analogous to the multi-touch sensitive touchpads described in the following U.S. Pat. No. 6,323,846 (Westerman et al.), U.S. Pat. No. 6,570,557 (Westerman et al.), and/or U.S. Pat. No. 6,677,932 (Westerman), and/or U.S. Patent Publication 2002/0015024A1, each of which is hereby incorporated by reference in its entirety. However, touch screen 112 displays visual output from device 100, whereas touch-sensitive touchpads do not provide visual output.

A touch-sensitive display in some embodiments of touch screen 112 is described in the following applications: (1) U.S. patent application Ser. No. 11/381,313, "Multipoint Touch Surface Controller," filed May 2, 2006; (2) U.S. patent application Ser. No. 10/840,862, "Multipoint Touchscreen," filed May 6, 2004; (3) U.S. patent application Ser. No. 10/903,964, "Gestures For Touch Sensitive Input Devices," filed Jul. 30, 2004; (4) U.S. patent application Ser. No. 11/048,264, "Gestures For Touch Sensitive Input Devices," filed Jan. 31, 2005; (5) U.S. patent application Ser. No. 11/038,590, "Mode-Based Graphical User Interfaces For Touch Sensitive Input Devices," filed Jan. 18, 2005; (6) U.S. patent application Ser. No. 11/228,758, "Virtual Input Device Placement On A Touch Screen User Interface," filed Sep. 16, 2005; (7) U.S. patent application Ser. No. 11/228,700, "Operation Of A Computer With A Touch Screen Interface," filed Sep. 16, 2005; (8) U.S. patent application Ser. No. 11/228,737, "Activating Virtual Keys Of A Touch-Screen Virtual Keyboard," filed Sep. 16, 2005; and (9) U.S. patent application Ser. No. 11/367,749, "Multi-Functional Hand-Held Device," filed Mar. 3, 2006. All of these applications are incorporated by reference herein in their entirety.

Touch screen 112 optionally has a video resolution in excess of 100 dpi. In some embodiments, the touch screen has a video resolution of approximately 160 dpi. The user optionally makes contact with touch screen 112 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 optionally includes a touchpad for activating or deactivating particular functions. In some embodiments, the touchpad is a touch-sensitive area of the device that, unlike the touch screen, does not display visual output. The touchpad is, optionally, a touch-sensitive surface that is separate from touch screen 112 or an extension of the touch-sensitive surface formed by the touch screen.

Device 100 also includes power system 162 for powering the various components. Power system 162 optionally includes a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 optionally also includes one or more optical sensors 164. FIG. 1A shows an optical sensor coupled to optical sensor controller 158 in I/O subsystem 106. Optical sensor 164 optionally includes charge-coupled device (CCD) or complementary metal-oxide semiconductor (CMOS) phototransistors. Optical sensor 164 receives light from the environment, projected through one or more lenses, and converts the light to data representing an image. In conjunction with imaging module 143 (also called a camera module), optical sensor 164 optionally captures still images or video. In some embodiments, an optical sensor is located on the back of device 100, opposite touch screen display 112 on the front of the device so that the touch screen display is enabled for use as a viewfinder for still and/or video image acquisition. In some embodiments, an optical sensor is located on the front of the device so that the user's image is, optionally, obtained for video conferencing while the user views the other video conference participants on the touch screen display. In some embodiments, the position of optical sensor 164 can be changed by the user (e.g., by rotating the lens and the sensor in the device housing) so that a single optical sensor 164 is used along with the touch screen display for both video conferencing and still and/or video image acquisition.

Device 100 optionally also includes one or more depth camera sensors 175. FIG. 1A shows a depth camera sensor coupled to depth camera controller 169 in I/O subsystem 106. Depth camera sensor 175 receives data from the environment to create a three dimensional model of an object (e.g., a face) within a scene from a viewpoint (e.g., a depth camera sensor). In some embodiments, in conjunction with imaging module 143 (also called a camera module), depth camera sensor 175 is optionally used to determine a depth map of different portions of an image captured by the imaging module 143. In some embodiments, a depth camera sensor is located on the front of device 100 so that the user's image with depth information is, optionally, obtained for video conferencing while the user views the other video conference participants on the touch screen display and to capture selfies with depth map data. In some embodiments, the depth camera sensor 175 is located on the back of device, or on the back and the front of the device 100. In some embodiments, the position of depth camera sensor 175 can be changed by the user (e.g., by rotating the lens and the sensor in the device housing) so that a depth camera sensor 175 is used along with the touch screen display for both video conferencing and still and/or video image acquisition.

Device 100 optionally also includes one or more contact intensity sensors 165. FIG. 1A shows a contact intensity sensor coupled to intensity sensor controller 159 in I/O subsystem 106. Contact intensity sensor 165 optionally includes one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor 165 receives contact intensity information (e.g., pressure information or a proxy for pressure information) from the environment. In some embodiments, at least one contact intensity sensor is collocated with, or proximate to, a touch-sensitive surface (e.g., touch-sensitive display system 112). In some embodiments, at least one contact intensity sensor is located on the back of device 100, opposite touch screen display 112, which is located on the front of device 100.

Device 100 optionally also includes one or more proximity sensors 166. FIG. 1A shows proximity sensor 166 coupled to peripherals interface 118. Alternately, proximity sensor 166 is, optionally, coupled to input controller 160 in I/O subsystem 106. Proximity sensor 166 optionally performs as described in U.S. patent application Ser. No. 11/241,839, "Proximity Detector In Handheld Device"; Ser. No. 11/240,788, "Proximity Detector In Handheld Device"; Ser. No. 11/620,702, "Using Ambient Light Sensor To Augment Proximity Sensor Output"; Ser. No. 11/586,862, "Automated Response To And Sensing Of User Activity In Portable Devices"; and Ser. No. 11/638,251, "Methods And Systems For Automatic Configuration Of Peripherals," which are hereby incorporated by reference in their entirety. In some embodiments, the proximity sensor turns off and disables touch screen 112 when the multifunction device is placed near the user's ear (e.g., when the user is making a phone call).

Device 100 optionally also includes one or more tactile output generators 167. FIG. 1A shows a tactile output generator coupled to haptic feedback controller 161 in I/O subsystem 106. Tactile output generator 167 optionally includes one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Contact intensity sensor 165 receives tactile feedback generation instructions from haptic feedback module 133 and generates tactile outputs on device 100 that are capable of being sensed by a user of device 100. In some embodiments, at least one tactile output generator is collocated with, or proximate to, a touch-sensitive surface (e.g., touch-sensitive display system 112) and, optionally, generates a tactile output by moving the touch-sensitive surface vertically (e.g., in/out of a surface of device 100) or laterally (e.g., back and forth in the same plane as a surface of device 100). In some embodiments, at least one tactile output generator sensor is located on the back of device 100, opposite touch screen display 112, which is located on the front of device 100.

Device 100 optionally also includes one or more accelerometers 168. FIG. 1A shows accelerometer 168 coupled to peripherals interface 118. Alternately, accelerometer 168 is, optionally, coupled to an input controller 160 in I/O subsystem 106. Accelerometer 168 optionally performs as described in U.S. Patent Publication No. 20050190059, "Acceleration-based Theft Detection System for Portable Electronic Devices," and U.S. Patent Publication No. 20060017692, "Methods And Apparatuses For Operating A Portable Device Based On An Accelerometer," both of which are incorporated by reference herein in their entirety. In some embodiments, information is displayed on the touch screen display in a portrait view or a landscape view based on an analysis of data received from the one or more accelerometers. Device 100 optionally includes, in addition to accelerometer(s) 168, a magnetometer and a GPS (or GLONASS or other global navigation system) receiver for obtaining information concerning the location and orientation (e.g., portrait or landscape) of device 100.

Figure 3:
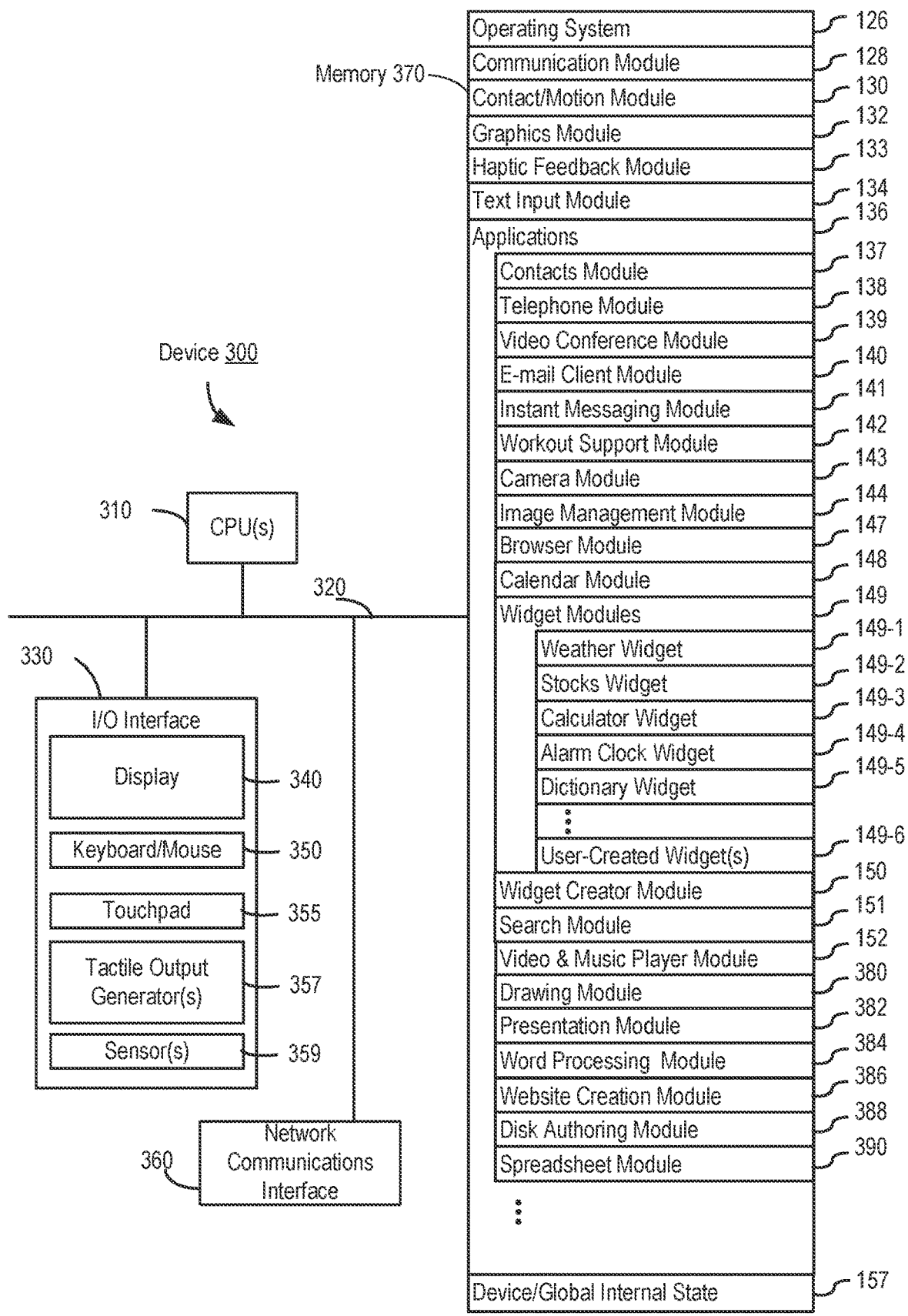
FIG. 3 is a block diagram of an exemplary multifunction device with a display and a touch-sensitive surface in accordance with some embodiments.

In some embodiments, the software components stored in memory 102 include operating system 126, communication module (or set of instructions) 128, contact/motion module (or set of instructions) 130, graphics module (or set of instructions) 132, text input module (or set of instructions) 134, Global Positioning System (GPS) module (or set of instructions) 135, and applications (or sets of instructions) 136. Furthermore, in some embodiments, memory 102 (FIG. 1A) or 370 (FIG. 3) stores device/global internal state 157, as shown in FIGS. 1A and 3. Device/global internal state 157 includes one or more of: active application state, indicating which applications, if any, are currently active; display state, indicating what applications, views or other information occupy various regions of touch screen display 112; sensor state, including information obtained from the device's various sensors and input control devices 116; and location information concerning the device's location and/or attitude.

Operating system 126 (e.g., Darwin, RTXC, LINUX, UNIX, OS X, iOS, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIRE-WIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with, the 30-pin connector used on iPod® (trademark of Apple Inc.) devices.

Contact/motion module 130 optionally detects contact with touch screen 112 (in conjunction with display controller 156) and other touch-sensitive devices (e.g., a touchpad or physical click wheel). Contact/motion module 130 includes various software components for performing various operations related to detection of contact, such as determining if contact has occurred (e.g., detecting a finger-down event), determining an intensity of the contact (e.g., the force or pressure of the contact or a substitute for the force or pressure of the contact), determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts) or to multiple simultaneous contacts (e.g., "multitouch"/multiple finger contacts). In some embodiments, contact/motion module 130 and display controller 156 detect contact on a touchpad.

In some embodiments, contact/motion module 130 uses a set of one or more intensity thresholds to determine whether an operation has been performed by a user (e.g., to determine whether a user has "clicked" on an icon). In some embodiments, at least a subset of the intensity thresholds are determined in accordance with software parameters (e.g., the intensity thresholds are not determined by the activation thresholds of particular physical actuators and can be adjusted without changing the physical hardware of device 100). For example, a mouse "click" threshold of a trackpad or touch screen display can be set to any of a large range of predefined threshold values without changing the trackpad or touch screen display hardware. Additionally, in some implementations, a user of the device is provided with software settings for adjusting one or more of the set of intensity thresholds (e.g., by adjusting individual intensity thresholds and/or by adjusting a plurality of intensity thresholds at once with a system-level click "intensity" parameter).

Contact/motion module 130 optionally detects a gesture input by a user. Different gestures on the touch-sensitive surface have different contact patterns (e.g., different motions, timings, and/or intensities of detected contacts). Thus, a gesture is, optionally, detected by detecting a particular contact pattern. For example, detecting a finger tap gesture includes detecting a finger-down event followed by detecting a finger-up (liftoff) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (liftoff) event.

Graphics module 132 includes various known software components for rendering and displaying graphics on touch screen 112 or other display, including components for changing the visual impact (e.g., brightness, transparency, saturation, contrast, or other visual property) of graphics that are displayed. As used herein, the term "graphics" includes any object that can be displayed to a user, including, without limitation, text, web pages, icons (such as user-interface objects including soft keys), digital images, videos, animations, and the like.

In some embodiments, graphics module 132 stores data representing graphics to be used. Each graphic is, optionally, assigned a corresponding code. Graphics module 132 receives, from applications etc., one or more codes specifying graphics to be displayed along with, if necessary, coordinate data and other graphic property data, and then generates screen image data to output to display controller 156.

Haptic feedback module 133 includes various software components for generating instructions used by tactile output generator(s) 167 to produce tactile outputs at one or more locations on device 100 in response to user interactions with device 100.

Text input module 134, which is, optionally, a component of graphics module 132, provides soft keyboards for entering text in various applications (e.g., contacts 137, e-mail 140, IM 141, browser 147, and any other application that needs text input).

GPS module 135 determines the location of the device and provides this information for use in various applications (e.g., to telephone 138 for use in location-based dialing; to camera 143 as picture/video metadata; and to applications that provide location-based services such as weather widgets, local yellow page widgets, and map/navigation widgets).

Applications 136 optionally include the following modules (or sets of instructions), or a subset or superset thereof:
  Contacts module 137 (sometimes called an address book or contact list);
  Telephone module 138;
  Video conference module 139;
  E-mail client module 140;
  Instant messaging (IM) module 141;
  Workout support module 142;
  Camera module 143 for still and/or video images;
  Image management module 144;
  Video player module;
  Music player module;
  Browser module 147;
  Calendar module 148;
  Widget modules 149, which optionally include one or more of: weather widget 149-1, stocks widget 149-2, calculator widget 149-3, alarm clock widget 149-4, dictionary widget 149-5, and other widgets obtained by the user, as well as user-created widgets 149-6;
  Widget creator module 150 for making user-created widgets 149-6;
  Search module 151;
  Video and music player module 152, which merges video player module and music player module;
  Notes module 153;
  Map module 154; and/or
  Online video module 155.

Examples of other applications 136 that are, optionally, stored in memory 102 include other word processing applications, other image editing applications, drawing applications, presentation applications, JAVA-enabled applications, encryption, digital rights management, voice recognition, and voice replication.

In conjunction with touch screen 112, display controller 156, contact/motion module 130, graphics module 132, and text input module 134, contacts module 137 are, optionally, used to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone 138, video conference module 139, e-mail 140, or IM 141; and so forth.

In conjunction with RF circuitry 108, audio circuitry 110, speaker 111, microphone 113, touch screen 112, display controller 156, contact/motion module 130, graphics module 132, and text input module 134, telephone module 138 are optionally, used to enter a sequence of characters corresponding to a telephone number, access one or more telephone numbers in contacts module 137, modify a telephone number that has been entered, dial a respective telephone number, conduct a conversation, and disconnect or hang up when the conversation is completed. As noted above, the wireless communication optionally uses any of a plurality of communications standards, protocols, and technologies.

In conjunction with RF circuitry 108, audio circuitry 110, speaker 111, microphone 113, touch screen 112, display controller 156, optical sensor 164, optical sensor controller 158, contact/motion module 130, graphics module 132, text input module 134, contacts module 137, and telephone module 138, video conference module 139 includes executable instructions to initiate, conduct, and terminate a video conference between a user and one or more other participants in accordance with user instructions.

In conjunction with RF circuitry 108, touch screen 112, display controller 156, contact/motion module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch screen 112, display controller 156, contact/motion module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages, and to view received instant messages. In some embodiments, transmitted and/or received instant messages optionally include graphics, photos, audio files, video files and/or other attachments as are supported in an MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 108, touch screen 112, display controller 156, contact/motion module 130, graphics module 132, text input module 134, GPS module 135, map module 154, and music player module, workout support module 142 includes executable instructions to create workouts (e.g., with time, distance, and/or calorie burning goals); communicate with workout sensors (sports devices); receive workout sensor data; calibrate sensors used to monitor a workout; select and play music for a workout; and display, store, and transmit workout data.

In conjunction with touch screen 112, display controller 156, optical sensor(s) 164, optical sensor controller 158, contact/motion module 130, graphics module 132, and image management module 144, camera module 143 includes executable instructions to capture still images or video (including a video stream) and store them into memory 102, modify characteristics of a still image or video, or delete a still image or video from memory 102.

In conjunction with touch screen 112, display controller 156, contact/motion module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch screen 112, display controller 156, contact/motion module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch screen 112, display controller 156, contact/motion module 130, graphics module 132, text input module 134, e-mail client module 140, and browser module 147, calendar module 148 includes executable instructions to create, display, modify, and store calendars and data associated with calendars (e.g., calendar entries, to-do lists, etc.) in accordance with user instructions.

In conjunction with RF circuitry 108, touch screen 112, display controller 156, contact/motion module 130, graphics module 132, text input module 134, and browser module 147, widget modules 149 are mini-applications that are, optionally, downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch screen 112, display controller 156, contact/motion module 130, graphics module 132, text input module 134, and browser module 147, the widget creator module 150 are, optionally, used by a user to create widgets (e.g., turning a user-specified portion of a web page into a widget).

In conjunction with touch screen 112, display controller 156, contact/motion module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch screen 112, display controller 156, contact/motion module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present, or otherwise play back videos (e.g., on touch screen 112 or on an external, connected display via external port 124). In some embodiments, device 100 optionally includes the functionality of an MP3 player, such as an iPod (trademark of Apple Inc.).

In conjunction with touch screen 112, display controller 156, contact/motion module 130, graphics module 132, and text input module 134, notes module 153 includes executable instructions to create and manage notes, to-do lists, and the like in accordance with user instructions.

In conjunction with RF circuitry 108, touch screen 112, display controller 156, contact/motion module 130, graphics module 132, text input module 134, GPS module 135, and browser module 147, map module 154 are, optionally, used to receive, display, modify, and store maps and data associated with maps (e.g., driving directions, data on stores and other points of interest at or near a particular location, and other location-based data) in accordance with user instructions.

In conjunction with touch screen 112, display controller 156, contact/motion module 130, graphics module 132, audio circuitry 110, speaker 111, RF circuitry 108, text input module 134, e-mail client module 140, and browser module 147, online video module 155 includes instructions that allow the user to access, browse, receive (e.g., by streaming and/or download), play back (e.g., on the touch screen or on an external, connected display via external port 124), send an e-mail with a link to a particular online video, and otherwise manage online videos in one or more file formats, such as H.264. In some embodiments, instant messaging module 141, rather than e-mail client module 140, is used to send a link to a particular online video. Additional description of the online video application can be found in U.S. Provisional Patent Application No. 60/936,562, "Portable Multifunction Device, Method, and Graphical User Interface for Playing Online Videos," filed Jun. 20, 2007, and U.S. patent application Ser. No. 11/968,067, "Portable Multifunction Device, Method, and Graphical User Interface for Playing Online Videos," filed Dec. 31, 2007, the contents of which are hereby incorporated by reference in their entirety.

Each of the above-identified modules and applications corresponds to a set of executable instructions for performing one or more functions described above and the methods described in this application (e.g., the computer-implemented methods and other information processing methods described herein). These modules (e.g., sets of instructions) need not be implemented as separate software programs (such as computer programs (e.g., including instructions)), procedures, or modules, and thus various subsets of these modules are, optionally, combined or otherwise rearranged in various embodiments. For example, video player module is, optionally, combined with music player module into a single module (e.g., video and music player module 152, FIG. 1A). In some embodiments, memory 102 optionally stores a subset of the modules and data structures identified above. Furthermore, memory 102 optionally stores additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 is, optionally, reduced.

The predefined set of functions that are performed exclusively through a touch screen and/or a touchpad optionally include navigation between user interfaces. In some embodiments, the touchpad, when touched by the user, navigates device 100 to a main, home, or root menu from any user interface that is displayed on device 100. In such embodiments, a "menu button" is implemented using a touchpad. In some other embodiments, the menu button is a physical push button or other physical input control device instead of a touchpad.

Figure 1B:
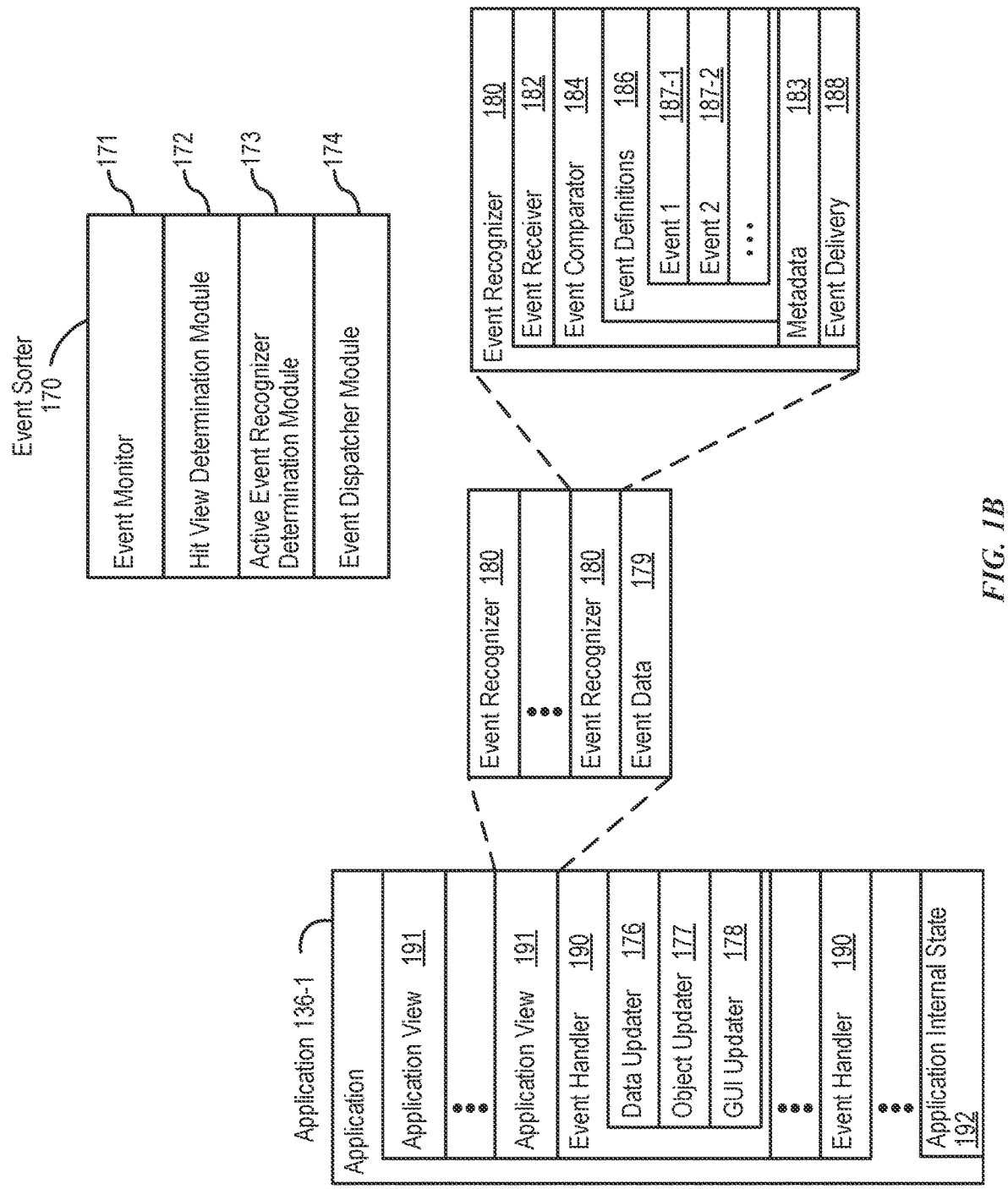
FIG. 1B is a block diagram illustrating exemplary components for event handling in accordance with some embodiments.

FIG. 1B is a block diagram illustrating exemplary components for event handling in accordance with some embodiments. In some embodiments, memory 102 (FIG. 1A) or 370 (FIG. 3) includes event sorter 170 (e.g., in operating system 126) and a respective application 136-1 (e.g., any of the aforementioned applications 137-151, 155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch-sensitive display 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display 112, as part of a multi-touch gesture). Peripherals interface 118 transmits information it receives from I/O subsystem 106 or a sensor, such as proximity sensor 166, accelerometer(s) 168, and/or microphone 113 (through audio circuitry 110). Information that peripherals interface 118 receives from I/O subsystem 106 includes information from touch-sensitive display 112 or a touch-sensitive surface.

In some embodiments, event monitor 171 sends requests to the peripherals interface 118 at predetermined intervals. In response, peripherals interface 118 transmits event information. In other embodiments, peripherals interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views when touch-sensitive display 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected optionally correspond to programmatic levels within a programmatic or view hierarchy of the application. For example, the lowest level view in which a touch is detected is, optionally, called the hit view, and the set of events that are recognized as proper inputs are, optionally, determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (e.g., the first sub-event in the sequence of sub-events that form an event or potential event). Once the hit view is identified by the hit view determination module 172, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 optionally utilizes or calls data updater 176, object updater 177, or GUI updater 178 to update the application internal state 192. Alternatively, one or more of the application views 191 include one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170 and identifies an event from the event information. Event recognizer 180 includes event receiver 182 and event comparator 184. In some embodiments, event recognizer 180 also includes at least a subset of: metadata 183, and event delivery instructions 188 (which optionally include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch, the event information optionally also includes speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event (187) include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first liftoff (touch end) for a predetermined phase, a second touch (touch begin) on the displayed object for a predetermined phase, and a second liftoff (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display 112, and liftoff of the touch (touch end). In some embodiments, the event also includes information for one or more associated event handlers 190.

In some embodiments, event definition 187 includes a definition of an event for a respective user-interface object. In some embodiments, event comparator 184 performs a hit test to determine which user-interface object is associated with a sub-event. For example, in an application view in which three user-interface objects are displayed on touch-sensitive display 112, when a touch is detected on touch-sensitive display 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event (187) also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers interact, or are enabled to interact, with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video player module. In some embodiments, object updater 177 creates and updates objects used in application 136-1. For example, object updater 177 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input devices, not all of which are initiated on touch screens. For example, mouse movement and mouse button presses, optionally coordinated with single or multiple keyboard presses or holds; contact movements such as taps, drags, scrolls, etc. on touchpads; pen stylus inputs; movement of the device; oral instructions; detected eye movements; biometric inputs; and/or any combination thereof are optionally utilized as inputs corresponding to sub-events which define an event to be recognized.

Figure 2:
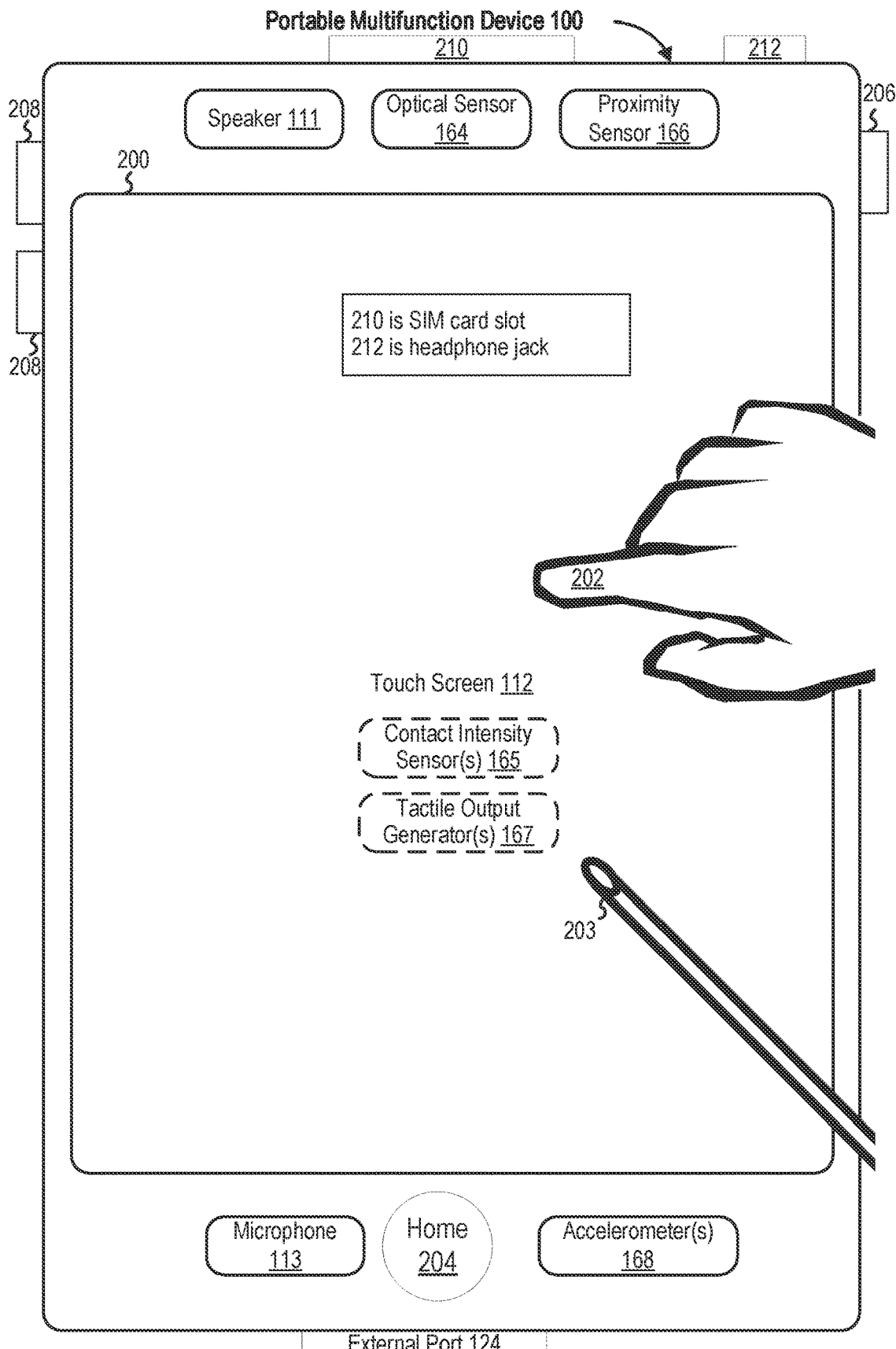
FIG. 2 illustrates a portable multifunction device having a touch screen in accordance with some embodiments.

FIG. 2 illustrates a portable multifunction device 100 having a touch screen 112 in accordance with some embodiments. The touch screen optionally displays one or more graphics within user interface (UI) 200. In this embodiment, as well as others described below, a user is enabled to select one or more of the graphics by making a gesture on the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the gesture optionally includes one or more taps, one or more swipes (from left to right, right to left, upward and/or downward), and/or a rolling of a finger (from right to left, left to right, upward and/or downward) that has made contact with device 100. In some implementations or circumstances, inadvertent contact with a graphic does not select the graphic. For example, a swipe gesture that sweeps over an application icon optionally does not select the corresponding application when the gesture corresponding to selection is a tap.

Device 100 optionally also include one or more physical buttons, such as "home" or menu button 204. As described previously, menu button 204 is, optionally, used to navigate to any application 136 in a set of applications that are, optionally, executed on device 100. Alternatively, in some embodiments, the menu button is implemented as a soft key in a GUI displayed on touch screen 112.

In some embodiments, device 100 includes touch screen 112, menu button 204, push button 206 for powering the device on/off and locking the device, volume adjustment button(s) 208, subscriber identity module (SIM) card slot 210, headset jack 212, and docking/charging external port 124. Push button 206 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also accepts verbal input for activation or deactivation of some functions through microphone 113. Device 100 also, optionally, includes one or more contact intensity sensors 165 for detecting intensity of contacts on touch screen 112 and/or one or more tactile output generators 167 for generating tactile outputs for a user of device 100.

FIG. 3 is a block diagram of an exemplary multifunction device with a display and a touch-sensitive surface in accordance with some embodiments. Device 300 need not be portable. In some embodiments, device 300 is a laptop computer, a desktop computer, a tablet computer, a multimedia player device, a navigation device, an educational device (such as a child's learning toy), a gaming system, or a control device (e.g., a home or industrial controller). Device 300 typically includes one or more processing units (CPUs) 310, one or more network or other communications interfaces 360, memory 370, and one or more communication buses 320 for interconnecting these components. Communication buses 320 optionally include circuitry (sometimes called a chipset) that interconnects and controls communications between system components. Device 300 includes input/output (I/O) interface 330 comprising display 340, which is typically a touch screen display. I/O interface 330 also optionally includes a keyboard and/or mouse (or other pointing device) 350 and touchpad 355, tactile output generator 357 for generating tactile outputs on device 300 (e.g., similar to tactile output generator(s) 167 described above with reference to FIG. 1A), sensors 359 (e.g., optical, acceleration, proximity, touch-sensitive, and/or contact intensity sensors similar to contact intensity sensor(s) 165 described above with reference to FIG. 1A). Memory 370 includes high-speed random access memory, such as DRAM, SRAM, DDR RAM, or other random access solid state memory devices; and optionally includes non-volatile memory, such as one or more magnetic disk storage devices, optical disk storage devices, flash memory devices, or other non-volatile solid state storage devices. Memory 370 optionally includes one or more storage devices remotely located from CPU(s) 310. In some embodiments, memory 370 stores programs, modules, and data structures analogous to the programs, modules, and data structures stored in memory 102 of portable multifunction device 100 (FIG. 1A), or a subset thereof. Furthermore, memory 370 optionally stores additional programs, modules, and data structures not present in memory 102 of portable multifunction device 100. For example, memory 370 of device 300 optionally stores drawing module 380, presentation module 382, word processing module 384, website creation module 386, disk authoring module 388, and/or spreadsheet module 390, while memory 102 of portable multifunction device 100 (FIG. 1A) optionally does not store these modules.

Each of the above-identified elements in FIG. 3 is, optionally, stored in one or more of the previously mentioned memory devices. Each of the above-identified modules corresponds to a set of instructions for performing a function described above. The above-identified modules or computer programs (e.g., sets of instructions or including instructions) need not be implemented as separate software programs (such as computer programs (e.g., including instructions)), procedures, or modules, and thus various subsets of these modules are, optionally, combined or otherwise rearranged in various embodiments. In some embodiments, memory 370 optionally stores a subset of the modules and data structures identified above. Furthermore, memory 370 optionally stores additional modules and data structures not described above.

Attention is now directed towards embodiments of user interfaces that are, optionally, implemented on, for example, portable multifunction device 100.

Figure 4A:
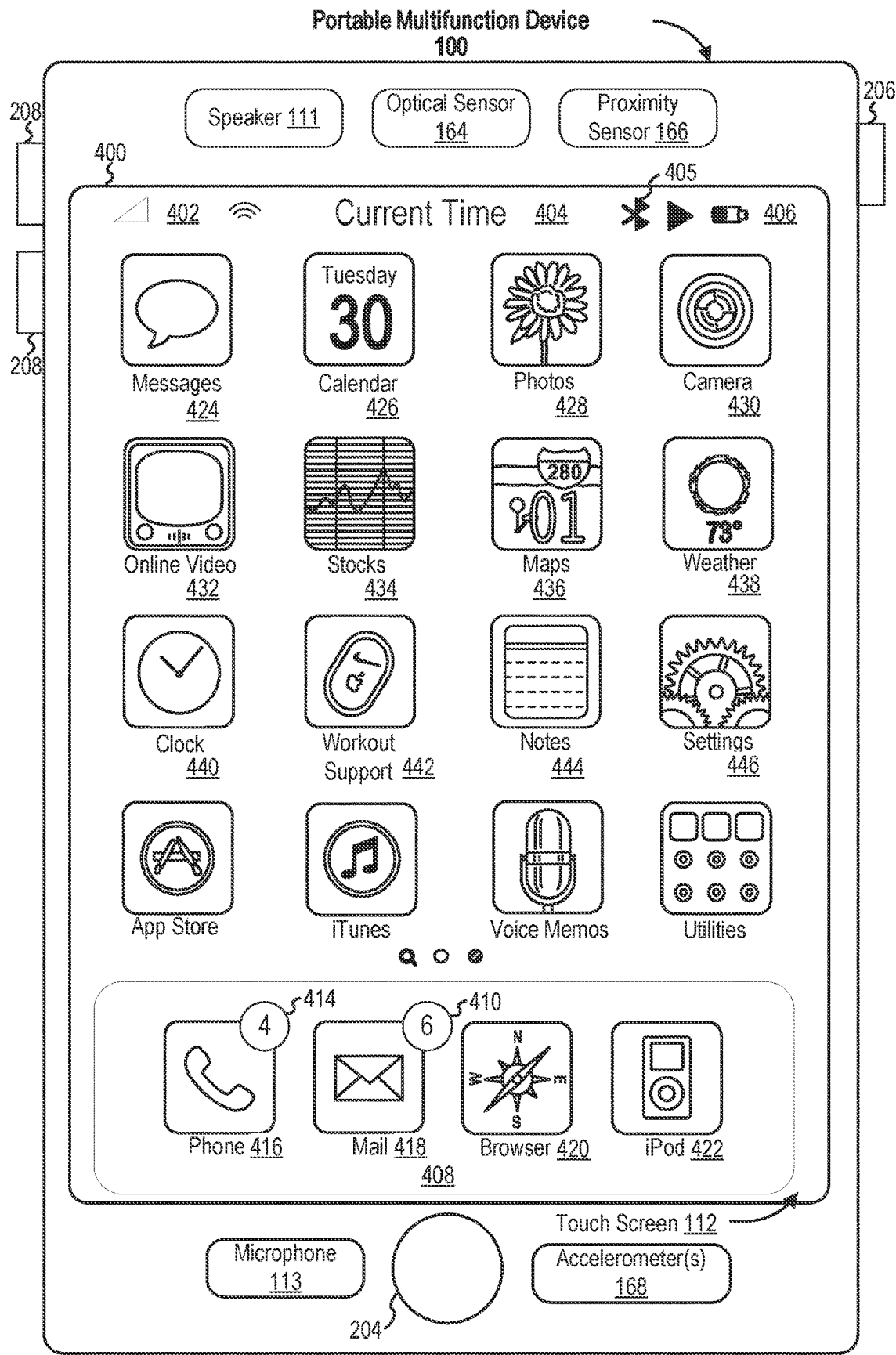
FIG. 4A illustrates an exemplary user interface for a menu of applications on a portable multifunction device in accordance with some embodiments.

FIG. 4A illustrates an exemplary user interface for a menu of applications on portable multifunction device 100 in accordance with some embodiments. Similar user interfaces are, optionally, implemented on device 300. In some embodiments, user interface 400 includes the following elements, or a subset or superset thereof:

Signal strength indicator(s) 402 for wireless communication(s), such as cellular and Wi-Fi signals;
Time 404;
Bluetooth indicator 405;
Battery status indicator 406;
Tray 408 with icons for frequently used applications, such as:
  Icon 416 for telephone module 138, labeled "Phone," which optionally includes an indicator 414 of the number of missed calls or voicemail messages;
  Icon 418 for e-mail client module 140, labeled "Mail," which optionally includes an indicator 410 of the number of unread e-mails;
  Icon 420 for browser module 147, labeled "Browser;" and
  Icon 422 for video and music player module 152, also referred to as iPod (trademark of Apple Inc.) module 152, labeled "iPod;" and
Icons for other applications, such as:
  Icon 424 for IM module 141, labeled "Messages;"
  Icon 426 for calendar module 148, labeled "Calendar;"
  Icon 428 for image management module 144, labeled "Photos;"
  Icon 430 for camera module 143, labeled "Camera;"
  Icon 432 for online video module 155, labeled "Online Video;"
  Icon 434 for stocks widget 149-2, labeled "Stocks;"
  Icon 436 for map module 154, labeled "Maps;"
  Icon 438 for weather widget 149-1, labeled "Weather;"
  Icon 440 for alarm clock widget 149-4, labeled "Clock;"
  Icon 442 for workout support module 142, labeled "Workout Support;"
  Icon 444 for notes module 153, labeled "Notes;" and
  Icon 446 for a settings application or module, labeled "Settings," which provides access to settings for device 100 and its various applications 136.

It should be noted that the icon labels illustrated in FIG. 4A are merely exemplary. For example, icon 422 for video and music player module 152 is labeled "Music" or "Music Player." Other labels are, optionally, used for various application icons. In some embodiments, a label for a respective application icon includes a name of an application corresponding to the respective application icon. In some embodiments, a label for a particular application icon is distinct from a name of an application corresponding to the particular application icon.

FIG. 4B illustrates an exemplary user interface on a device (e.g., device 300, FIG. 3) with a touch-sensitive surface 451 (e.g., a tablet or touchpad 355, FIG. 3) that is separate from the display 450 (e.g., touch screen display 112). Device 300 also, optionally, includes one or more contact intensity sensors (e.g., one or more of sensors 359) for detecting intensity of contacts on touch-sensitive surface 451 and/or one or more tactile output generators 357 for generating tactile outputs for a user of device 300.

Although some of the examples that follow will be given with reference to inputs on touch screen display 112 (where the touch-sensitive surface and the display are combined), in some embodiments, the device detects inputs on a touch-sensitive surface that is separate from the display, as shown in FIG. 4B. In some embodiments, the touch-sensitive surface (e.g., 451 in FIG. 4B) has a primary axis (e.g., 452 in FIG. 4B) that corresponds to a primary axis (e.g., 453 in FIG. 4B) on the display (e.g., 450). In accordance with these embodiments, the device detects contacts (e.g., 460 and 462 in FIG. 4B) with the touch-sensitive surface 451 at locations that correspond to respective locations on the display (e.g., in FIG. 4B, 460 corresponds to 468 and 462 corresponds to 470). In this way, user inputs (e.g., contacts 460 and 462, and movements thereof) detected by the device on the touch-sensitive surface (e.g., 451 in FIG. 4B) are used by the device to manipulate the user interface on the display (e.g., 450 in FIG. 4B) of the multifunction device when the touch-sensitive surface is separate from the display. It should be understood that similar methods are, optionally, used for other user interfaces described herein.

Additionally, while the following examples are given primarily with reference to finger inputs (e.g., finger contacts, finger tap gestures, finger swipe gestures), it should be understood that, in some embodiments, one or more of the finger inputs are replaced with input from another input device (e.g., a mouse-based input or stylus input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or a mouse and finger contacts are, optionally, used simultaneously.

Figure 5A:
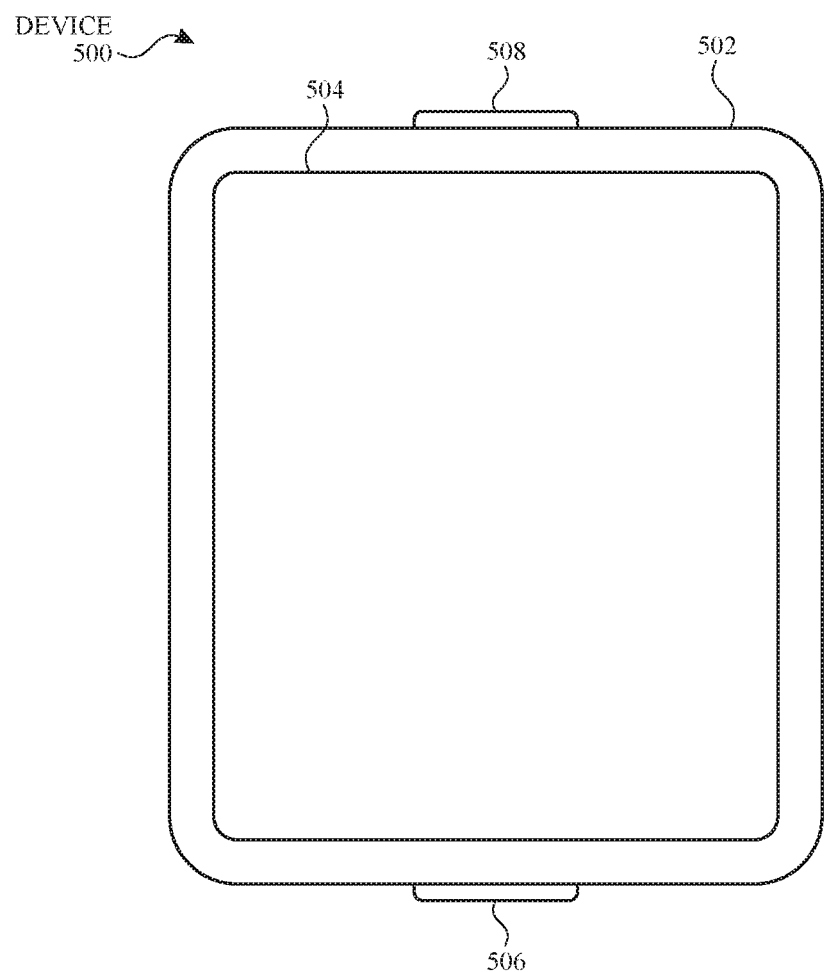
FIG. 5A illustrates a personal electronic device in accordance with some embodiments.

FIG. 5A illustrates exemplary personal electronic device 500. Device 500 includes body 502. In some embodiments, device 500 can include some or all of the features described with respect to devices 100 and 300 (e.g., FIGS. 1A-4B). In some embodiments, device 500 has touch-sensitive display screen 504, hereafter touch screen 504. Alternatively, or in addition to touch screen 504, device 500 has a display and a touch-sensitive surface. As with devices 100 and 300, in some embodiments, touch screen 504 (or the touch-sensitive surface) optionally includes one or more intensity sensors for detecting intensity of contacts (e.g., touches) being applied. The one or more intensity sensors of touch screen 504 (or the touch-sensitive surface) can provide output data that represents the intensity of touches. The user interface of device 500 can respond to touches based on their intensity, meaning that touches of different intensities can invoke different user interface operations on device 500.

Exemplary techniques for detecting and processing touch intensity are found, for example, in related applications: International Patent Application Serial No. PCT/US2013/040061, titled "Device, Method, and Graphical User Interface for Displaying User Interface Objects Corresponding to an Application," filed May 8, 2013, published as WIPO Publication No. WO/2013/169849, and International Patent Application Serial No. PCT/US2013/069483, titled "Device, Method, and Graphical User Interface for Transitioning Between Touch Input to Display Output Relationships," filed Nov. 11, 2013, published as WIPO Publication No. WO/2014/105276, each of which is hereby incorporated by reference in their entirety.

In some embodiments, device 500 has one or more input mechanisms 506 and 508. Input mechanisms 506 and 508, if included, can be physical. Examples of physical input mechanisms include push buttons and rotatable mechanisms. In some embodiments, device 500 has one or more attachment mechanisms. Such attachment mechanisms, if included, can permit attachment of device 500 with, for example, hats, eyewear, earrings, necklaces, shirts, jackets, bracelets, watch straps, chains, trousers, belts, shoes, purses, backpacks, and so forth. These attachment mechanisms permit device 500 to be worn by a user.

Figure 5B:
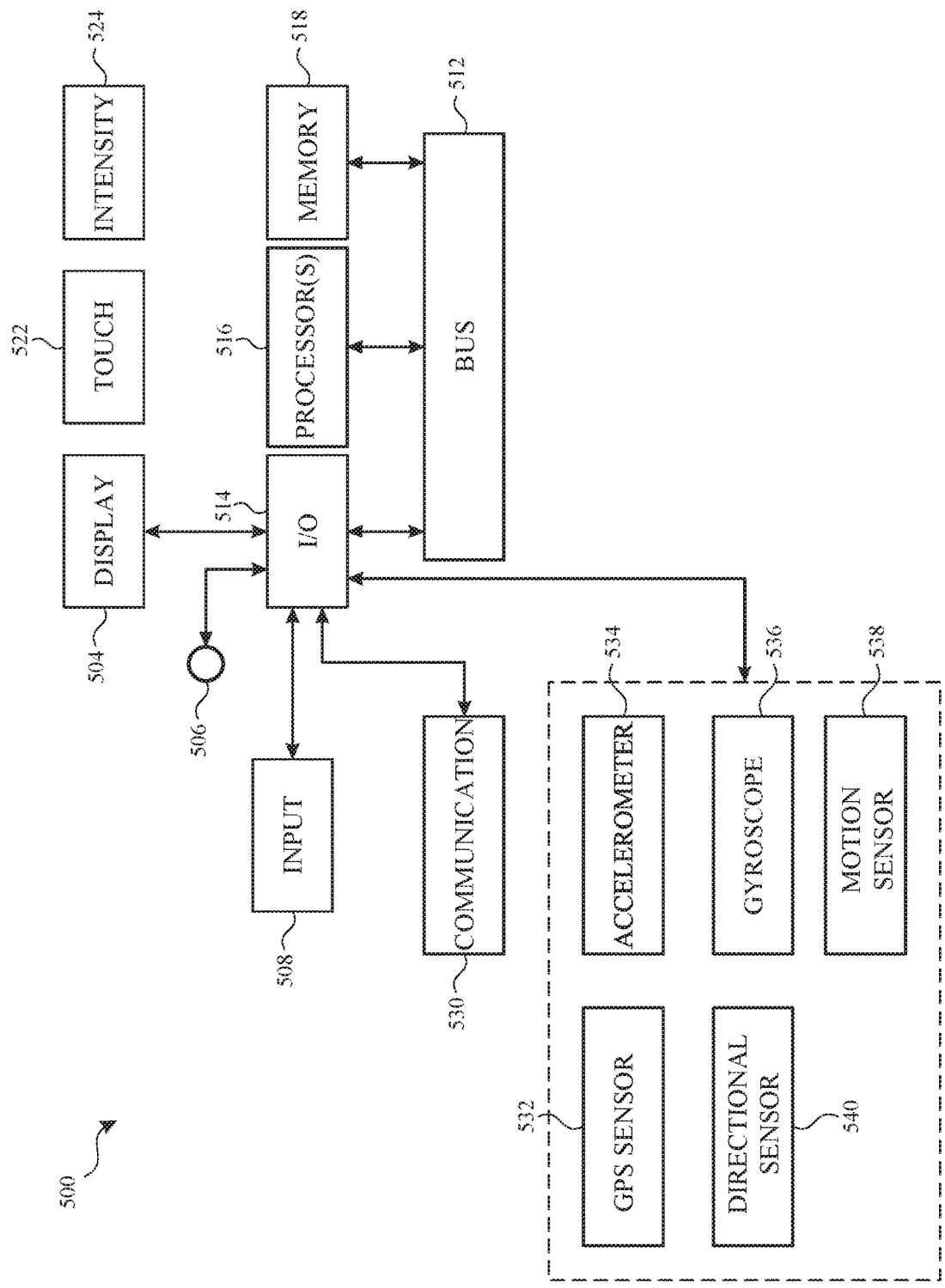
FIG. 5B is a block diagram illustrating a personal electronic device in accordance with some embodiments.
Figure 5C:
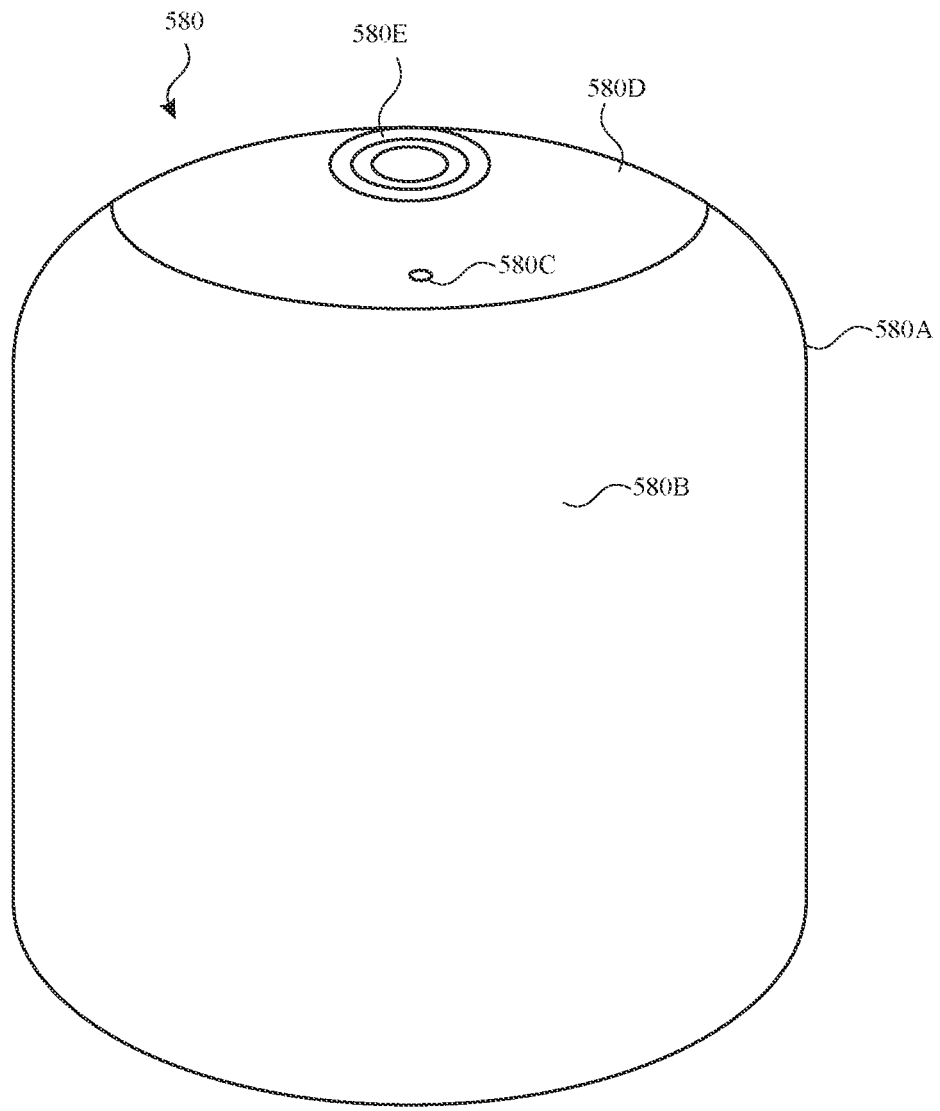
FIG. 5C illustrates an electronic device in accordance with some embodiments.
Figure 5D:
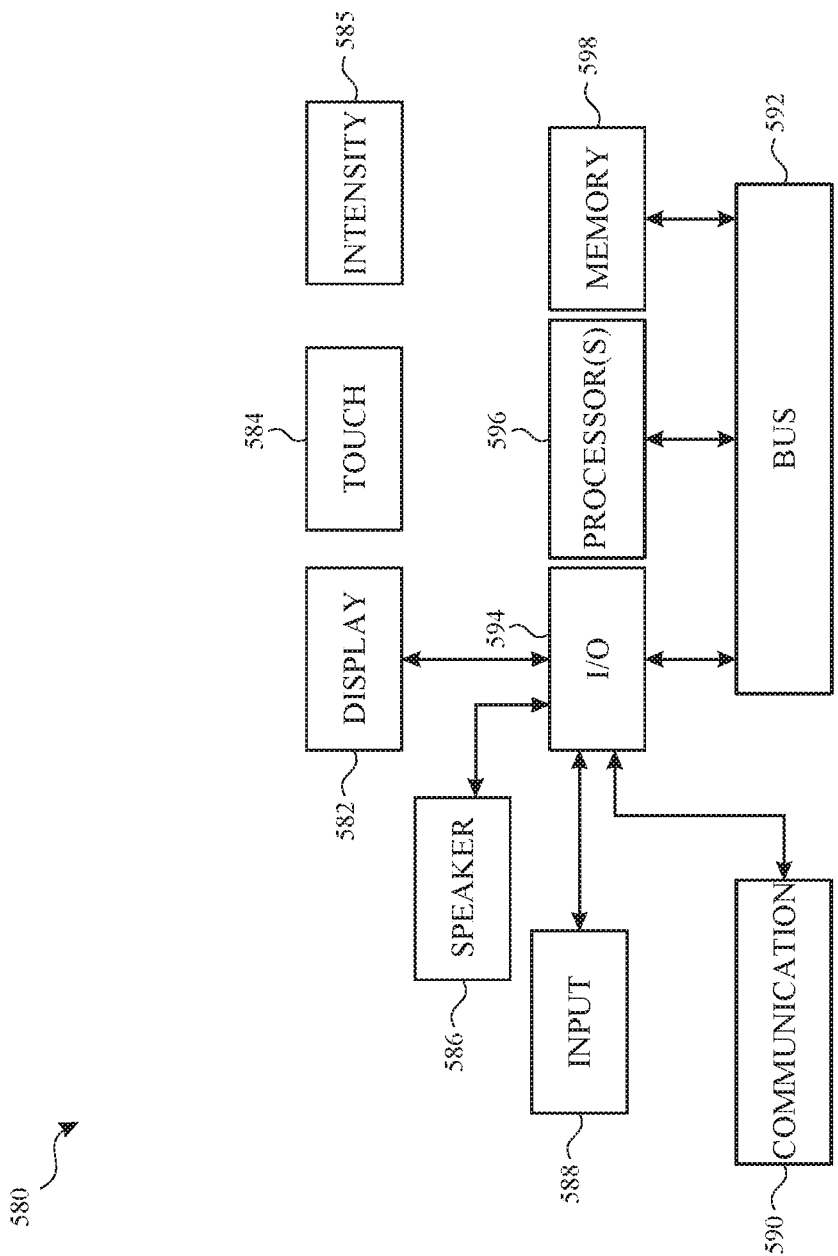
FIG. 5D is a block diagram illustrating an electronic device in accordance with some embodiments.

FIG. 5B depicts exemplary personal electronic device 500. In some embodiments, device 500 can include some or all of the components described with respect to FIGS. 1A, 1B, and 3. Device 500 has bus 512 that operatively couples I/O section 514 with one or more computer processors 516 and memory 518. I/O section 514 can be connected to display 504, which can have touch-sensitive component 522 and, optionally, intensity sensor 524 (e.g., contact intensity sensor). In addition, I/O section 514 can be connected with communication unit 530 for receiving application and operating system data, using Wi-Fi, Bluetooth, near field communication (NFC), cellular, and/or other wireless communication techniques. Device 500 can include input mechanisms 506 and/or 508. Input mechanism 506 is, optionally, a rotatable input device or a depressible and rotatable input device, for example. Input mechanism 508 is, optionally, a button, in some examples.

Input mechanism 508 is, optionally, a microphone, in some examples. Personal electronic device 500 optionally includes various sensors, such as GPS sensor 532, accelerometer 534, directional sensor 540 (e.g., compass), gyroscope 536, motion sensor 538, and/or a combination thereof, all of which can be operatively connected to I/O section 514.

Memory 518 of personal electronic device 500 can include one or more non-transitory computer-readable storage mediums, for storing computer-executable instructions, which, when executed by one or more computer processors 516, for example, can cause the computer processors to perform the techniques described below, including processes 800, 1000, and 1200 (FIGS. 8, 10, and 12). A computer-readable storage medium can be any medium that can tangibly contain or store computer-executable instructions for use by or in connection with the instruction execution system, apparatus, or device. In some examples, the storage medium is a transitory computer-readable storage medium. In some examples, the storage medium is a non-transitory computer-readable storage medium. The non-transitory computer-readable storage medium can include, but is not limited to, magnetic, optical, and/or semiconductor storages. Examples of such storage include magnetic disks, optical discs based on CD, DVD, or Blu-ray technologies, as well as persistent solid-state memory such as flash, solid-state drives, and the like. Personal electronic device 500 is not limited to the components and configuration of FIG. 5B, but can include other or additional components in multiple configurations.

As used here, the term "affordance" refers to a user-interactive graphical user interface object that is, optionally, displayed on the display screen of devices 100, 300, and/or 500 (FIGS. 1A, 3, and 5A-5D). For example, an image (e.g., icon), a button, and text (e.g., hyperlink) each optionally constitute an affordance.

As used herein, the term "focus selector" refers to an input element that indicates a current part of a user interface with which a user is interacting. In some implementations that include a cursor or other location marker, the cursor acts as a "focus selector" so that when an input (e.g., a press input) is detected on a touch-sensitive surface (e.g., touchpad 355 in FIG. 3 or touch-sensitive surface 451 in FIG. 4B) while the cursor is over a particular user interface element (e.g., a button, window, slider, or other user interface element), the particular user interface element is adjusted in accordance with the detected input. In some implementations that include a touch screen display (e.g., touch-sensitive display system 112 in FIG. 1A or touch screen 112 in FIG. 4A) that enables direct interaction with user interface elements on the touch screen display, a detected contact on the touch screen acts as a "focus selector" so that when an input (e.g., a press input by the contact) is detected on the touch screen display at a location of a particular user interface element (e.g., a button, window, slider, or other user interface element), the particular user interface element is adjusted in accordance with the detected input. In some implementations, focus is moved from one region of a user interface to another region of the user interface without corresponding movement of a cursor or movement of a contact on a touch screen display (e.g., by using a tab key or arrow keys to move focus from one button to another button); in these implementations, the focus selector moves in accordance with movement of focus between different regions of the user interface. Without regard to the specific form taken by the focus selector, the focus selector is generally the user interface element (or contact on a touch screen display) that is controlled by the user so as to communicate the user's intended interaction with the user interface (e.g., by indicating, to the device, the element of the user interface with which the user is intending to interact). For example, the location of a focus selector (e.g., a cursor, a contact, or a selection box) over a respective button while a press input is detected on the touch-sensitive surface (e.g., a touchpad or touch screen) will indicate that the user is intending to activate the respective button (as opposed to other user interface elements shown on a display of the device).

As used in the specification and claims, the term "characteristic intensity" of a contact refers to a characteristic of the contact based on one or more intensities of the contact. In some embodiments, the characteristic intensity is based on multiple intensity samples. The characteristic intensity is, optionally, based on a predefined number of intensity samples, or a set of intensity samples collected during a predetermined time period (e.g., 0.05, 0.1, 0.2, 0.5, 1, 2, 5, 10 seconds) relative to a predefined event (e.g., after detecting the contact, prior to detecting liftoff of the contact, before or after detecting a start of movement of the contact, prior to detecting an end of the contact, before or after detecting an increase in intensity of the contact, and/or before or after detecting a decrease in intensity of the contact). A characteristic intensity of a contact is, optionally, based on one or more of: a maximum value of the intensities of the contact, a mean value of the intensities of the contact, an average value of the intensities of the contact, a top 10 percentile value of the intensities of the contact, a value at the half maximum of the intensities of the contact, a value at the 90 percent maximum of the intensities of the contact, or the like. In some embodiments, the duration of the contact is used in determining the characteristic intensity (e.g., when the characteristic intensity is an average of the intensity of the contact over time). In some embodiments, the characteristic intensity is compared to a set of one or more intensity thresholds to determine whether an operation has been performed by a user. For example, the set of one or more intensity thresholds optionally includes a first intensity threshold and a second intensity threshold. In this example, a contact with a characteristic intensity that does not exceed the first threshold results in a first operation, a contact with a characteristic intensity that exceeds the first intensity threshold and does not exceed the second intensity threshold results in a second operation, and a contact with a characteristic intensity that exceeds the second threshold results in a third operation. In some embodiments, a comparison between the characteristic intensity and one or more thresholds is used to determine whether or not to perform one or more operations (e.g., whether to perform a respective operation or forgo performing the respective operation), rather than being used to determine whether to perform a first operation or a second operation.

Attention is now directed towards embodiments of user interfaces ("UI") and associated processes that are implemented on an electronic device, such as portable multifunction device 100, device 300, or device 500.

Figure 6:
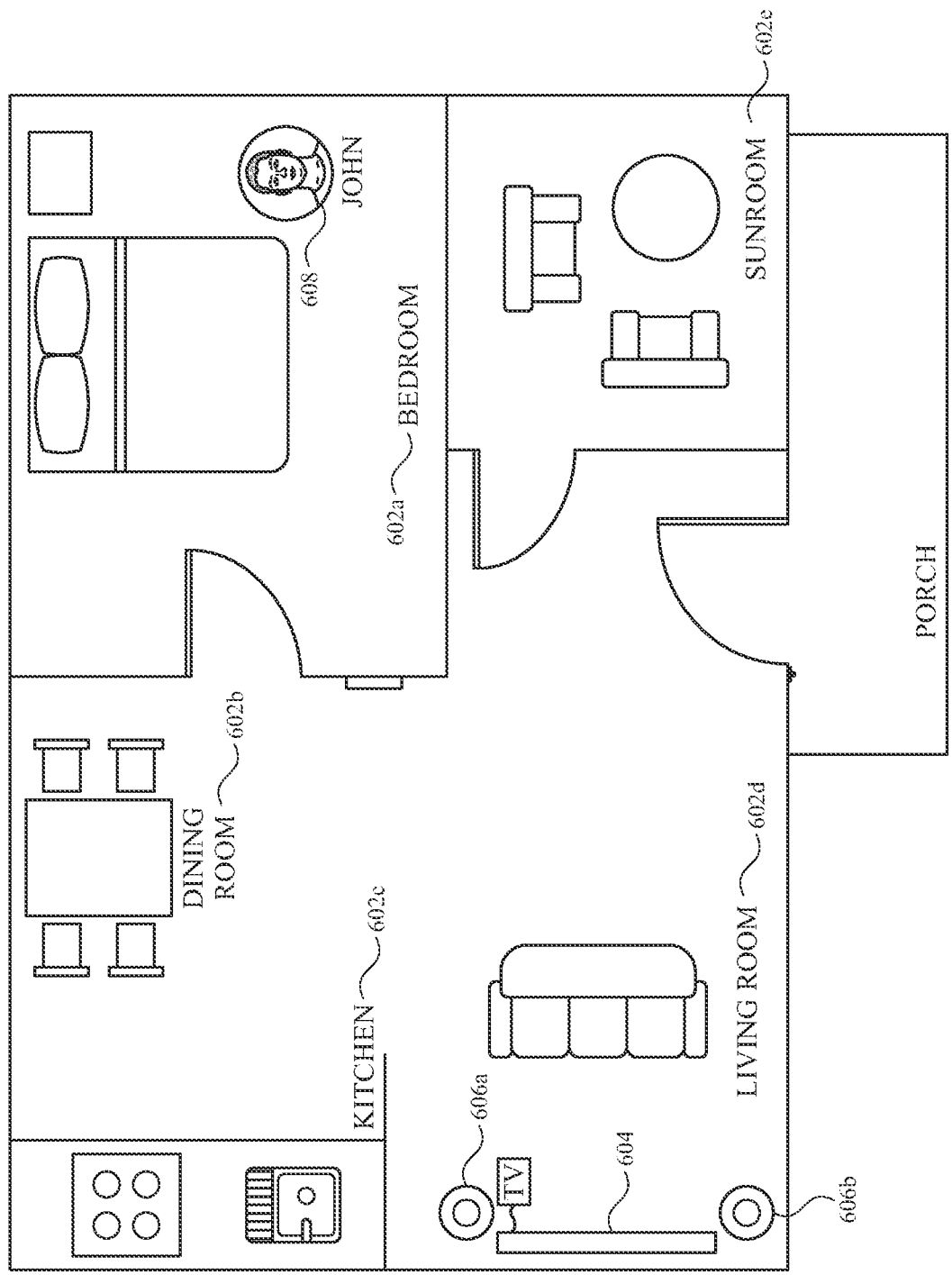
FIG. 6 is a diagram illustrating a location with an exemplary set of devices in accordance with some embodiments.

FIGS. 7A-7R illustrate exemplary diagrams and user interfaces for managing dynamically-available media playback, in accordance with some embodiments and with reference to the diagram of FIG. 6. The user interfaces in these figures are used to illustrate the processes described below, including the processes in FIG. 8.

FIG. 6 is a diagram of home 600, a physical structure that includes multiple rooms (e.g., locations within the home) and an exemplary set of electronic devices. FIG. 6 is used to illustrate the processes described below, including the processes shown in FIGS. 7A-7R and 9A-9H.

The rooms in home 600 include bedroom 602a, dining room 602b, kitchen 602c, living room 602d, and sunroom 602e. Living room 602d includes several electronic devices: a television 604, smart speaker 606a, and smart speaker 606b. In some embodiments, smart speaker 606a and smart speaker 606b have the same hardware configuration that includes one or more features of device 580. Rooms or locations within the home may be partially or completely walled from other rooms or locations. For example, bedroom 602a is completely walled off from the remainder of the home. In contrast, dining room 602b and kitchen 602c are not separated by a wall. Thus, in some embodiments, a location within the home or a location associated with a given electronic device, may be designated by a user (e.g., within a home automation or configuration application), apart from physical separation of the environment. While FIG. 6 depicts a home, it should be recognized that this is merely an example and techniques described herein can work with other types of physical structures, such as an office building, a hotel, an apartment, and so forth. In FIG. 6, user 608, John, is in bedroom 602a.

FIG. 7A depicts the state of home 600 at a point in time (10:10 AM) at which device 700, which includes display 702, is displaying a home screen 704 and device setup interface 706a. Device 700 is a smart phone having one or more features of devices 100, 300, and/or 500 and can be used to configure smart devices in home 600. In some embodiments, device 700 is in communication with one or more smart devices in the home via a wireless communication protocol (e.g., Bluetooth and/or WiFi). In some embodiments, the communication is direct as between device 700 and the one or more smart devices. In some embodiments, the communication occurs via an intermediary device such as a server or router.

In FIG. 7A, user 608 has physically put smart speaker 606c in bedroom 602a and has initiated a process to configure smart speaker 606c using device 700. In some embodiments, smart speaker 606c includes one or more features of devices 100, 300, 500, and/or 580. For example, speaker 606c includes multiple speakers for high fidelity media playback across a wide frequency range (e.g., speakers 580B). In some embodiments, the configuration process is initiated based on device 700 automatically detecting smart speaker 606c (e.g., via a wireless signal (e.g., an NFC signal, a Bluetooth signal, a WiFi signal). In some embodiments, the process is initiated by the user entering a code (e.g., via a virtual keyboard or captured via a camera (e.g., a barcode or QR code)) or other identifier of smart speaker 606c. The configuration process includes displaying, as seen in FIG. 7A, device setup interface 706a that includes a representation 708 of smart speaker 606c and a set up affordance 710a. Device 700 detects input 712a (e.g., a tap) on set up affordance 710a.

Figure 7B:
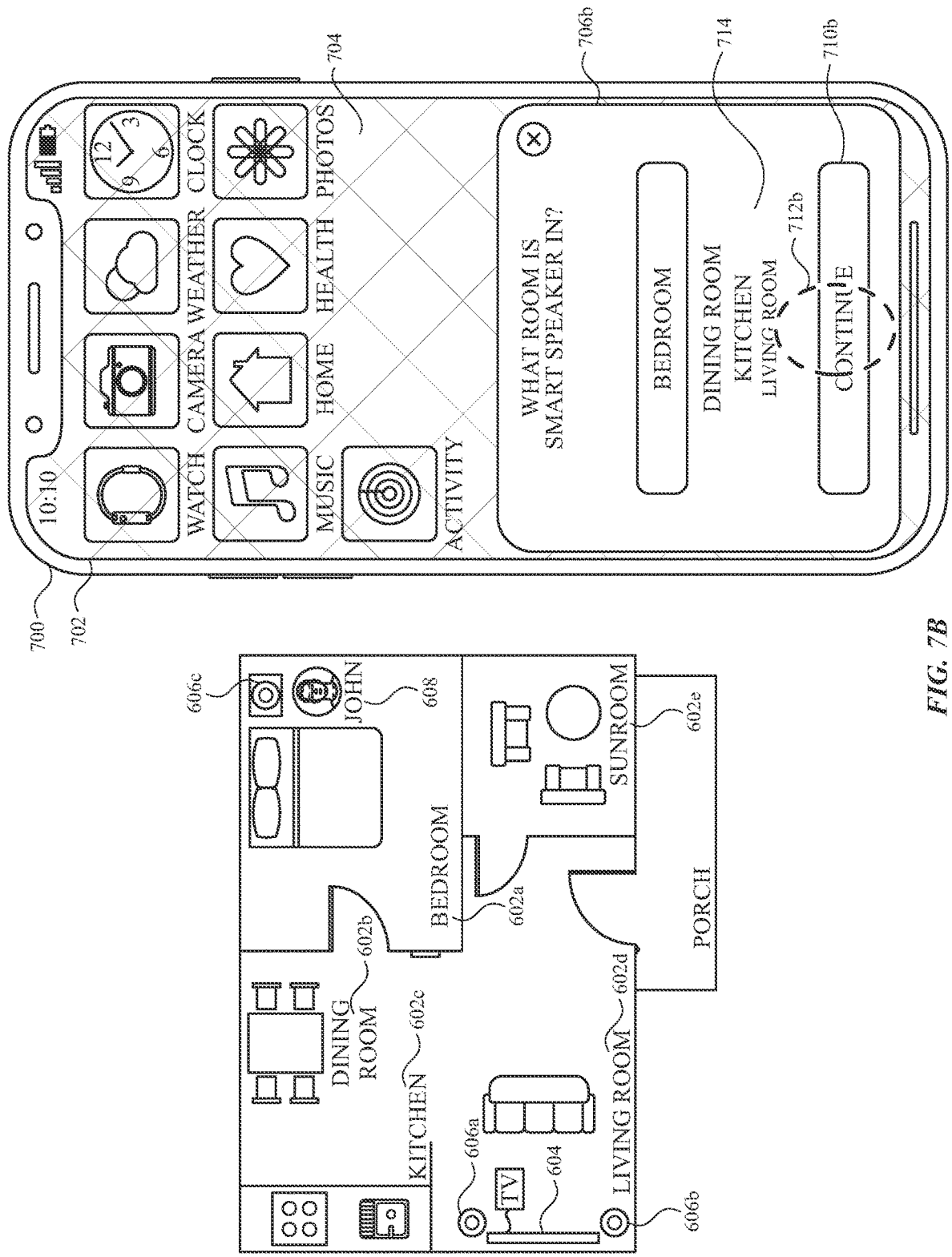

In FIG. 7B, in response to input 712a, device 700 displays device setup interface 706b for identifying a room (e.g., location) in home 600 to associate with smart speaker 606c. Device setup interface 706b includes a list of rooms 714 and a continue affordance 710b. In some implementations, the list of rooms is scrollable (e.g., via swipe gestures). In FIG. 7B, the bedroom is already selected in list of rooms 714. Device 700 detects input 712b (e.g., a tap) on continue affordance 710b.

Figure 7C:
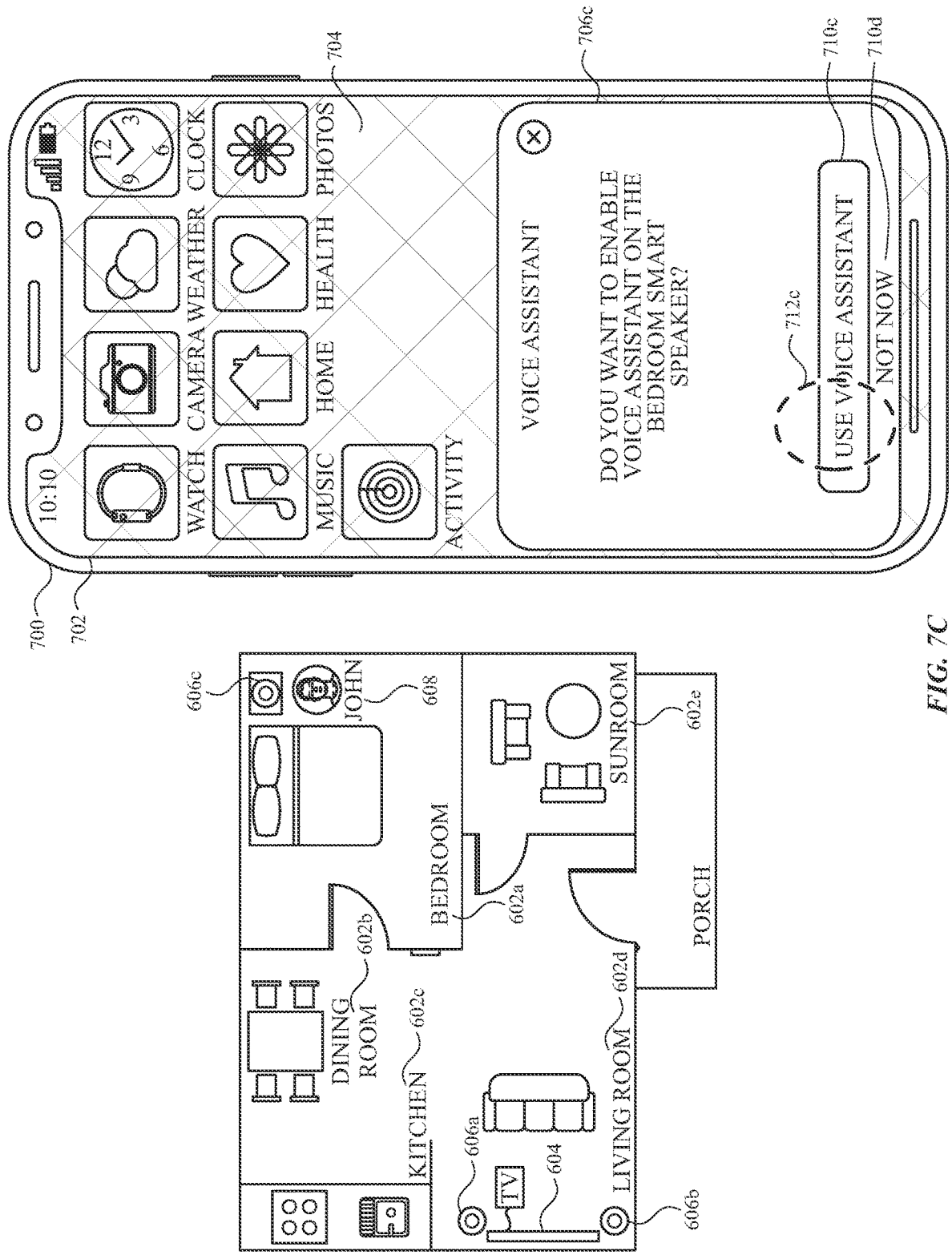

In FIG. 7C, in response to input 712b, device 700 displays device setup interface 706c for selecting whether to configure smart speaker 606c to be available for use with a voice assistant function (e.g., a media playback function based on a voice-activated voice assistant). Device 700 displays device setup interface 706c because smart speaker 606c satisfies a set of selection criteria based on smart speaker 606c's device type. Specifically, smart speaker 606c is identified as being a type of device that has a primary function of being a media playback device (e.g., based on a hardware configuration of smart speaker 606c that includes high fidelity, wide-range speakers). Device setup interface 706c includes a use voice assistant affordance 710c and not now affordance 710d that, when selected, configures smart speaker 606c to not be available for use with the voice assistant function. Device 700 detects input 712c (e.g., a tap) on use voice assistant affordance 710c.

Figure 7D:
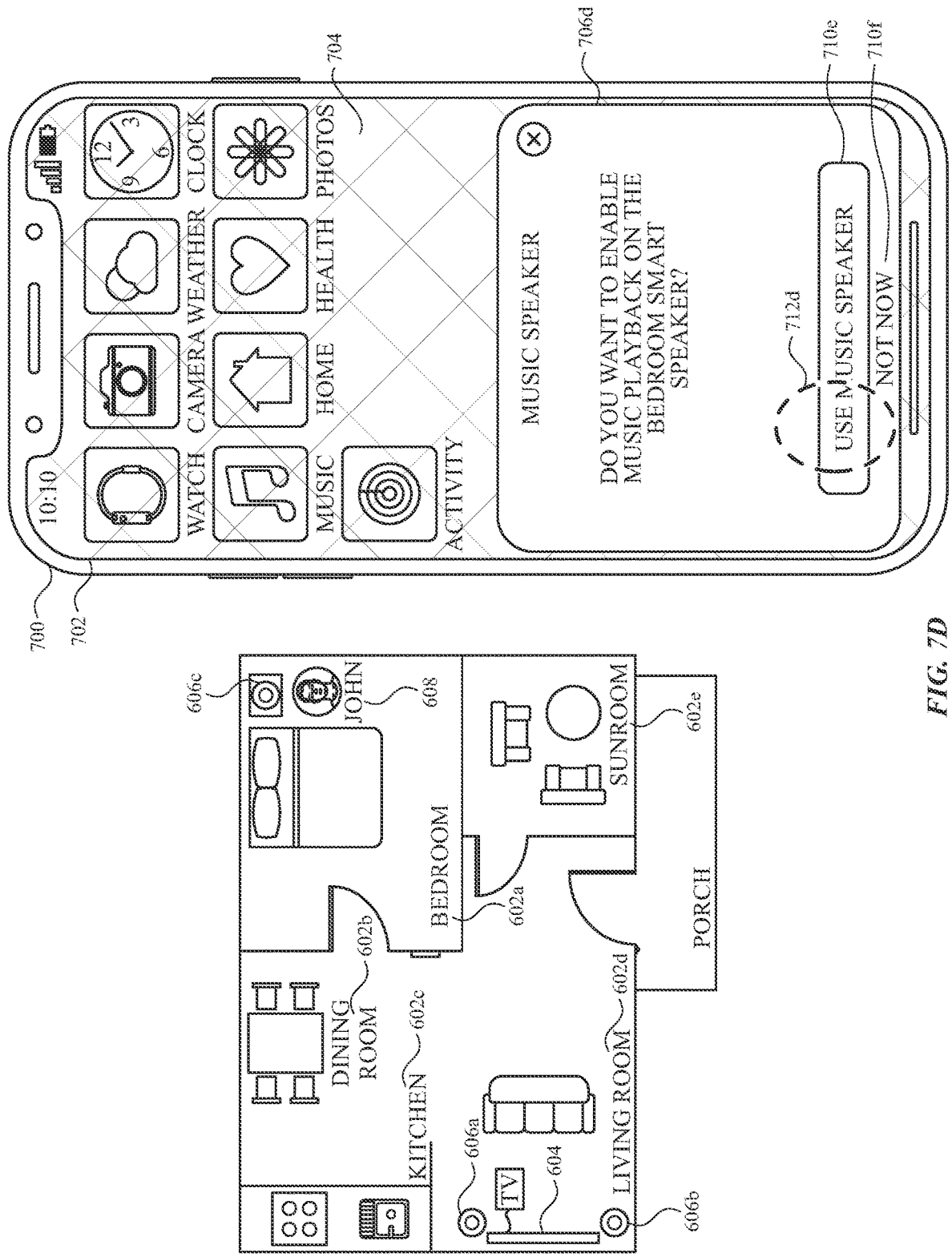

In FIG. 7D, in response to input 712c, device 700 displays device setup interface 706d for selecting whether to configure smart speaker 606c to be available for use with a music playback function (e.g., a specific music playback function for untargeted music playback). In response to input 712c, device 700 also configures smart speaker 606c to be available for use with the voice assistant function. Device 700 displays device setup interface 706d because smart speaker 606c satisfies the set of selection criteria based on smart speaker 606c's device type. Specifically, smart speaker 606c is identified as being a type of device that has a primary function of being a media playback device (e.g., based on a hardware configuration of smart speaker 606c). Device setup interface 706d includes a use music speaker affordance 710e and not now affordance 710f that, when selected, configures smart speaker 606c to not be available for use with the music playback function. Device 700 detects input 712d (e.g., a tap) on use music speaker affordance 710e.

Figure 7E:
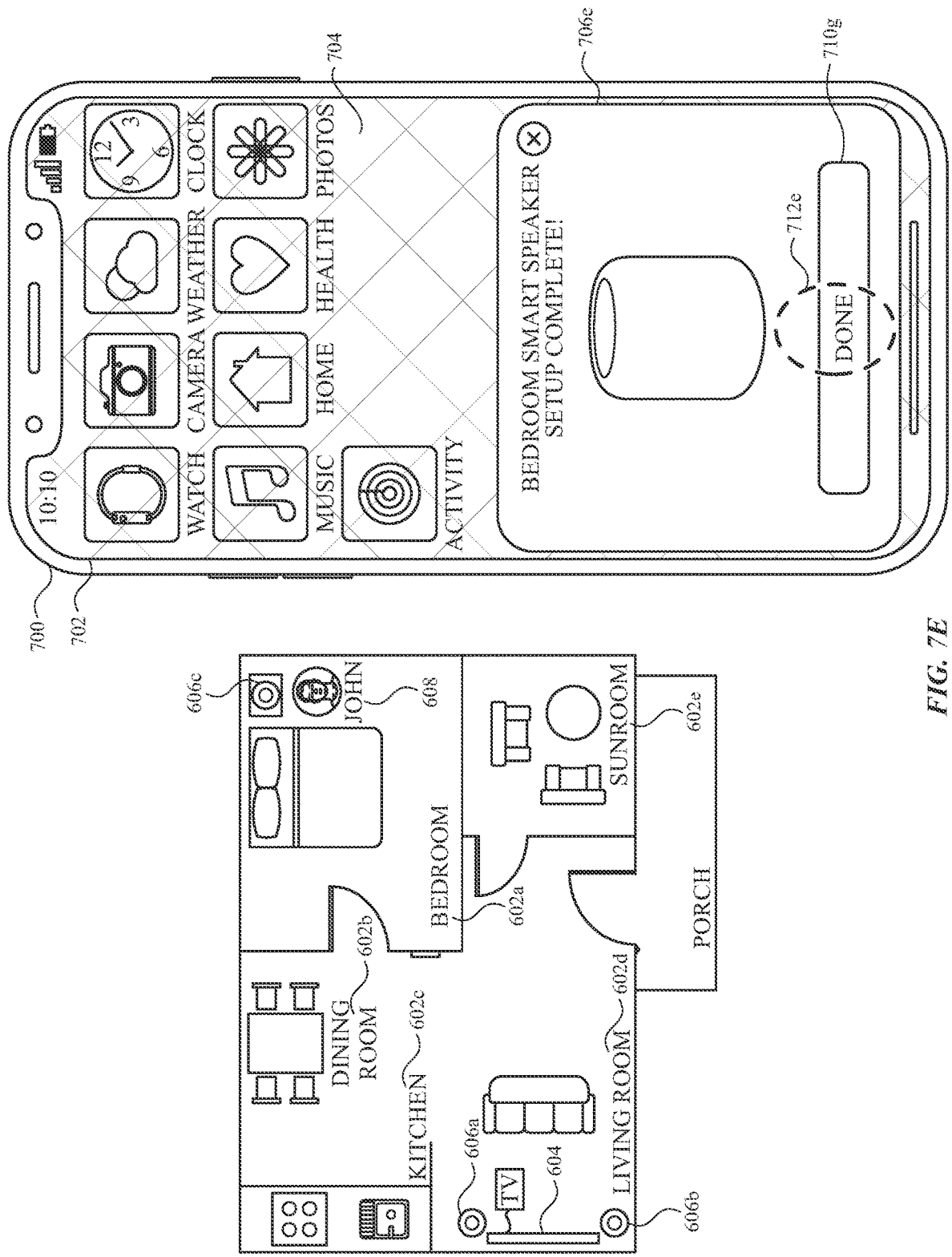

In FIG. 7E, in response to input 712d, device 700 displays device setup interface 706e for completing the configuration process for smart speaker 606c. In response to input 712d, device 700 also configures smart speaker 606c to be available for use with a music playback function. In some embodiments, device 700 displays device setup interface 706e without regard to whether smart speaker 606c satisfies the set of selection criteria. For example, device setup interface 706e is displayed even if smart speaker 606c is not identified as being a type of device that has a primary function of being a media playback device (e.g., based on a hardware configuration of smart speaker 606c). Device setup interface 706e includes a complete affordance 710g. Device 700 detects input 712e (e.g., a tap) on complete affordance 710g and, in response, completes the configuration process for smart speaker 606c. Smart speaker 606c is now configured for use, including being configured to be available for use with the voice assistant function and being configured to be available for use with a music playback function.

Figure 7F:
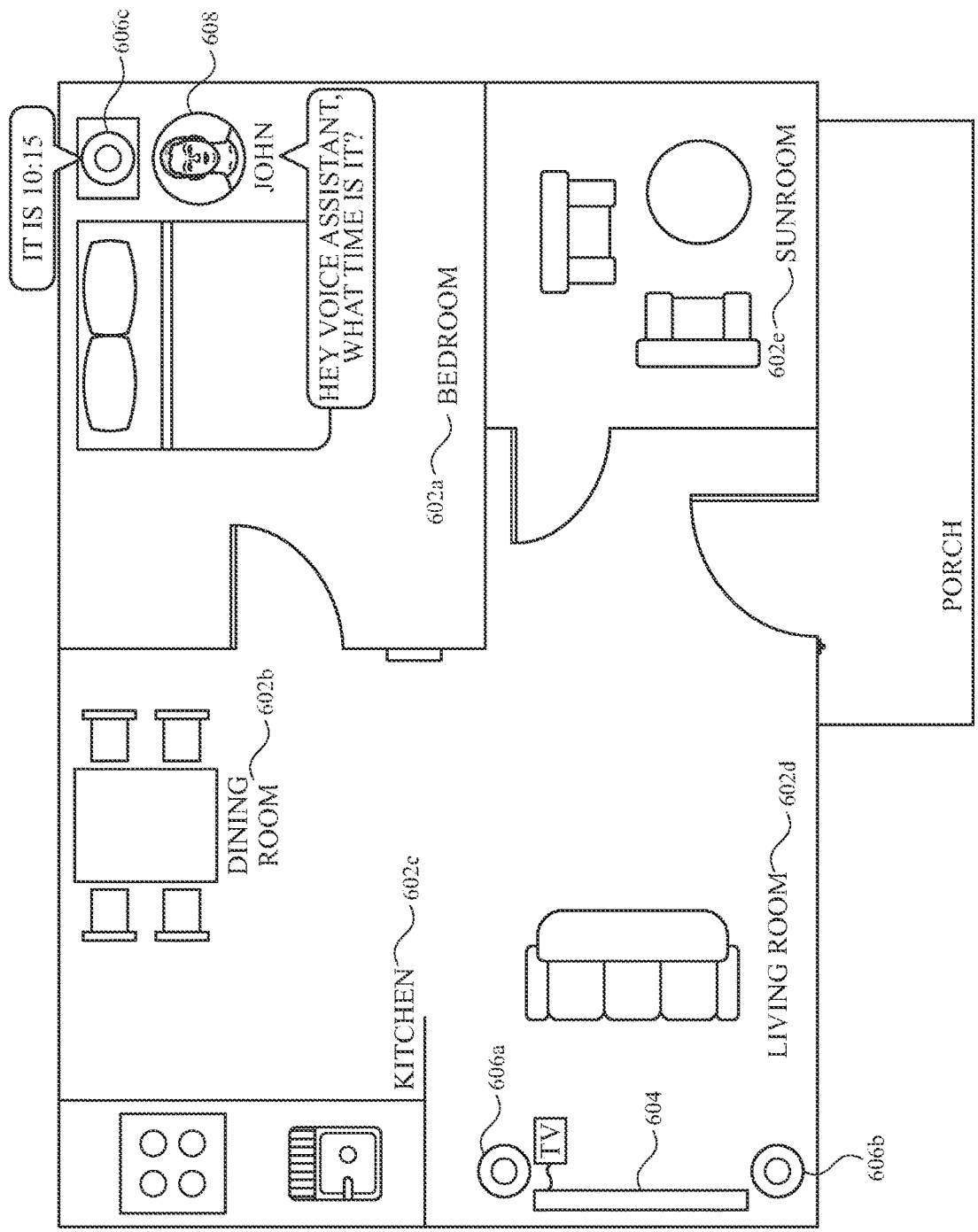

In FIG. 7F, user 608 has uttered the phrase "hey Voice Assistant, what time is it?", which is a recognizable request for devices that are available for use with the voice assistant function. Since smart speaker 606c is configured to be available for use with the voice assistant function, smart speaker 606c, in response to detecting the recognizable request phrase, outputs, via one or more speakers, an audio response with the current time, e.g., the audio response "it is 10:15".

Figure 7G:
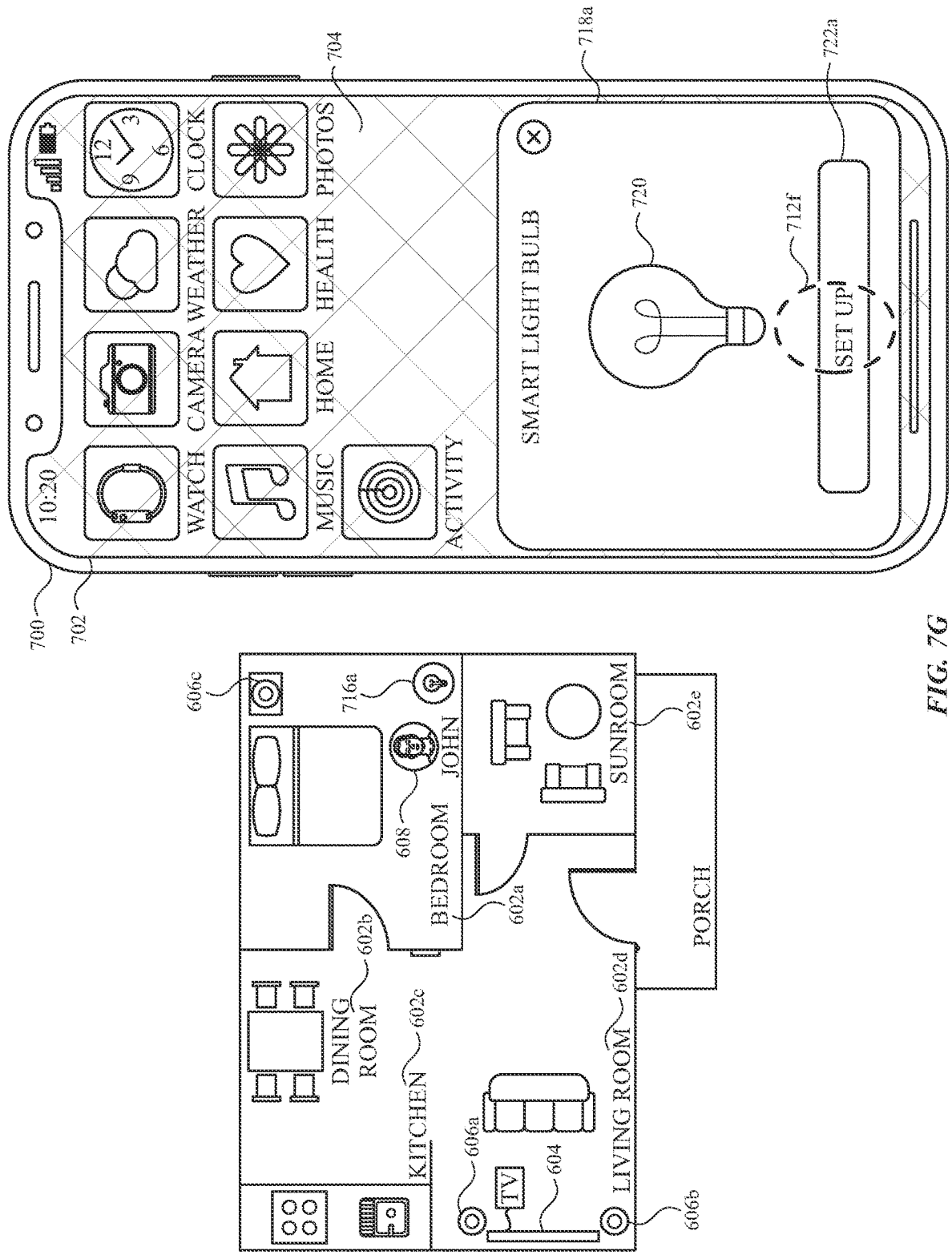

In FIG. 7G, user 608 has physically placed smart light bulb 716a in bedroom 602a and has initiated a process to configure smart light bulb 716a using device 700 so that smart light bulb 716a can be controllable by device 700. In some embodiments, smart light bulb 716a includes one or more features of devices 100, 300, 500. For example, smart light bulb 716a includes a single speaker capable of limited media playback functionality (e.g., audio output across a limited range of frequencies with limited power (e.g., less than the range of frequencies and power for smart speaker 606c)). In some embodiments, the configuration process is initiated based on device 700 automatically detecting smart light bulb 716a (e.g., via a wireless signal (e.g., an NFC signal, a Bluetooth signal, a WiFi signal). In some embodiments, the process is initiated by the user entering a code (e.g., via a virtual keyboard or captured via a camera (e.g., a barcode or QR code)) or other identifier of smart light bulb 716a. The configuration process includes displaying, as seen in FIG. 7G, device setup interface 718a that includes a representation 720 of smart light bulb 716a and a set up affordance 722a. Device 700 detects input 712f (e.g., a tap) on set up affordance 722a.

Figure 7H:
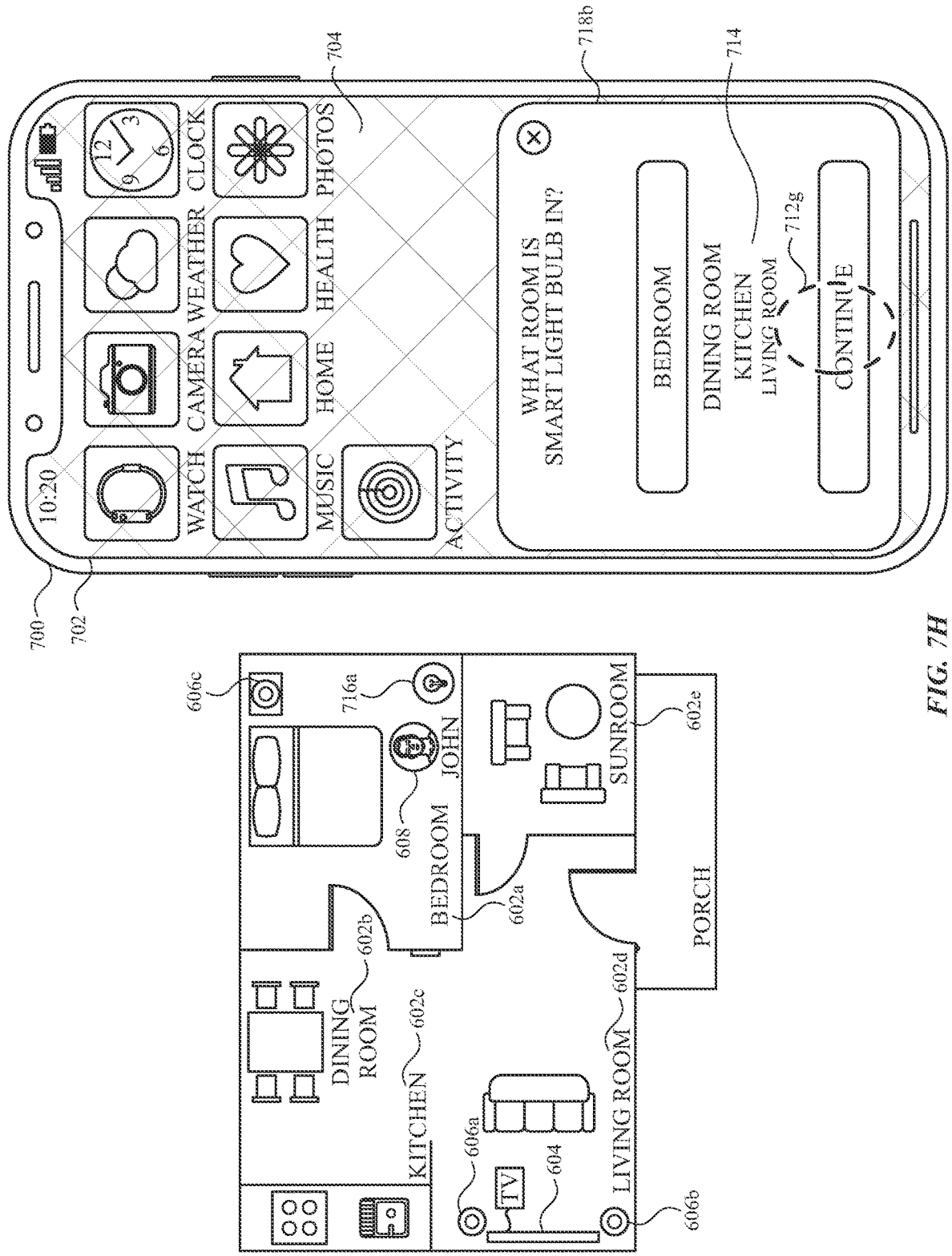

In FIG. 7H, in response to input 712f, device 700 displays device setup interface 718b for identifying a room (e.g., location) in home 600 to associate with smart light bulb 716a. Device setup interface 718b includes list of rooms 714 and a continue affordance 722b. In some implementations, the list of rooms is scrollable (e.g., via swipe gestures). In FIG. 7H, the bedroom is already selected in list of rooms 714. Device 700 detects input 712g (e.g., a tap) on continue affordance 722b.

Figure 7I:
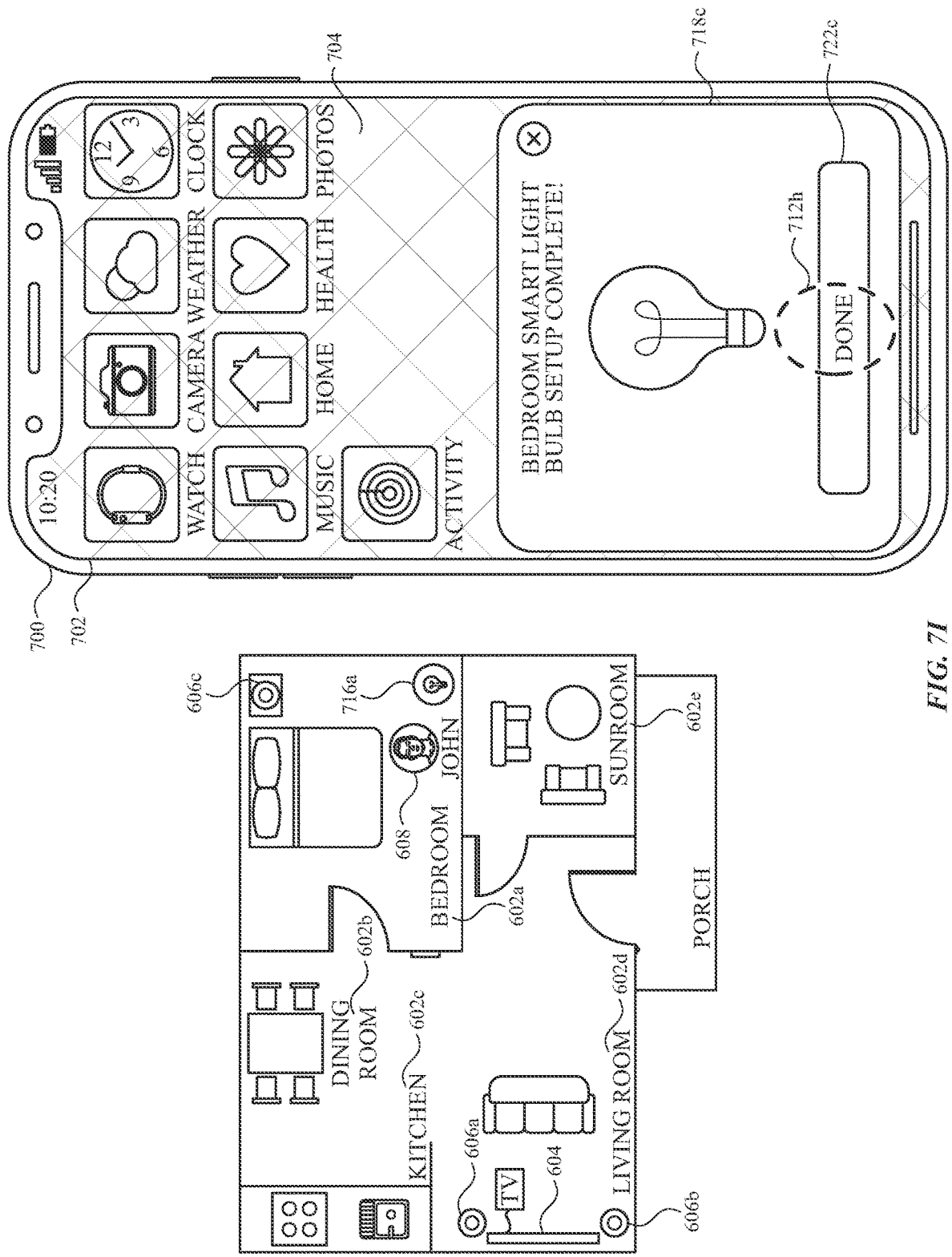

In FIG. 7I, in response to input 712g, device 700 displays device setup interface 718c for completing the configuration process for smart light bulb 716a. In contrast to the configuration process for smart speaker 606c, a user interface for selecting whether to configure smart light bulb 716a to be available for use with a voice assistant function is not displayed nor is a user interface for selecting whether to configure smart light bulb 716a to be available for use with a music playback function (e.g., setup interface 706d) displayed. Device 700 does not display such interfaces because smart light bulb 716a does not satisfy the set of selection criteria. In some embodiments, smart light bulb 716a does not satisfy the set of selection criteria because smart light bulb 716a is not identified as being a type of device that has a primary function of being a media playback device (e.g., based on a hardware configuration of smart light bulb 716a that includes limited media playback functionality (e.g., a speaker with audio output across a limited range of frequencies with limited power)). In some embodiments, smart light bulb 716a does not satisfy the set of selection criteria because a determination is made (e.g., by device 700) that a more capable media playback device (e.g., specifically smart speaker 606c) is also associated with the location (e.g., bedroom 602a) of smart light bulb 716a.

Device setup interface 718c includes a complete affordance 722c. Device 700 detects input 712h (e.g., a tap) on complete affordance 722c and, in response, completes the configuration process for smart light bulb 716a. Smart light bulb 716a is now configured for use, but is not configured to be available for use with the voice assistant function and is not configured to be available for use with the music playback function.

Figure 7J:
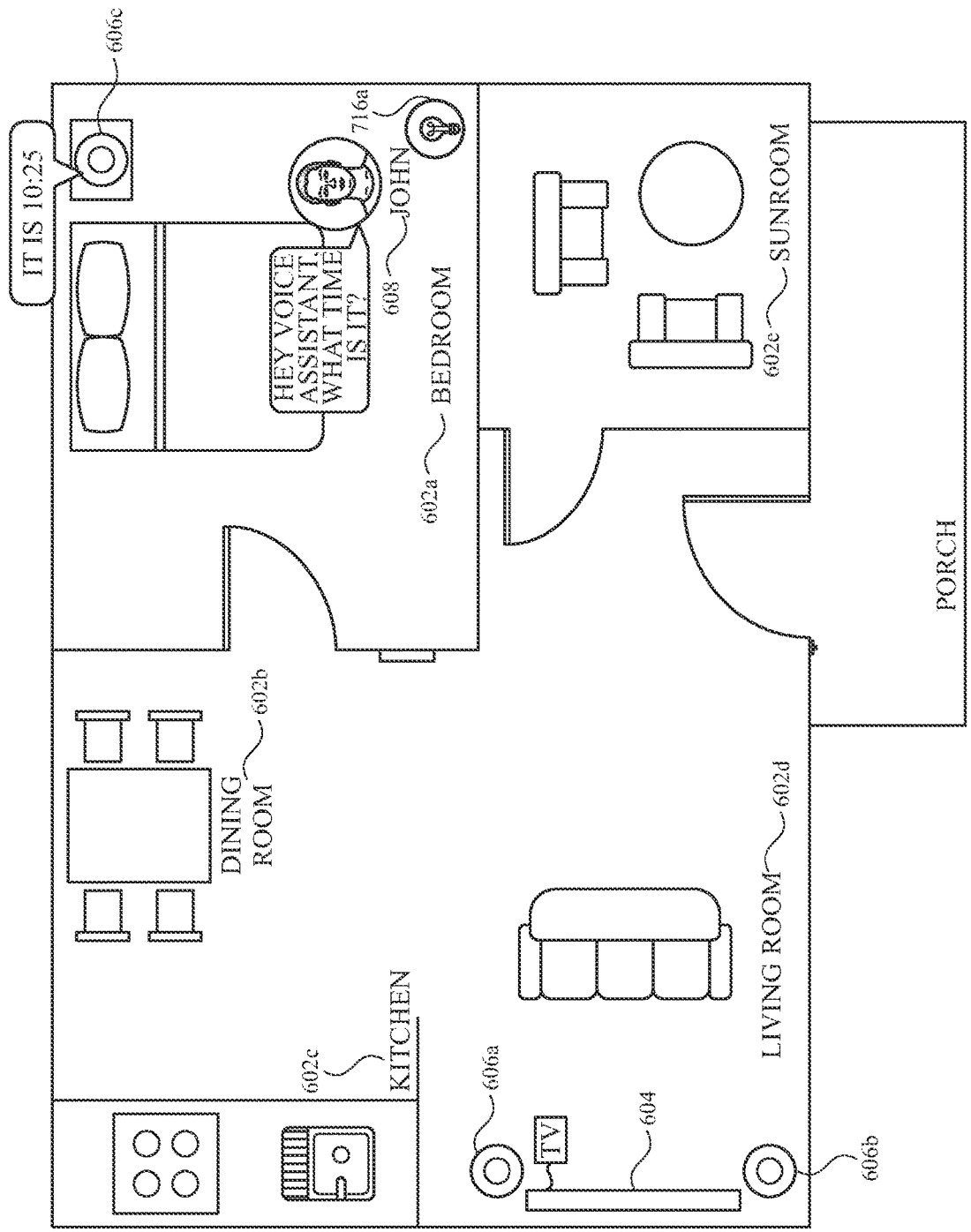

In FIG. 7J, user 608 has uttered the phrase "hey Voice Assistant, what time is it?", which is a recognizable request for devices that are available for use with the voice assistant function. Since smart speaker 606c is configured to be available for use with the voice assistant function, smart speaker 606c, in response to detecting the recognizable request phrase, outputs, via one or more speakers, an audio response with the current time, e.g., the audio response "it is 10:25". In contrast, smart light bulb 716a, which is not configured to be available for use with the voice assistant function, does not respond.

Figure 7K:
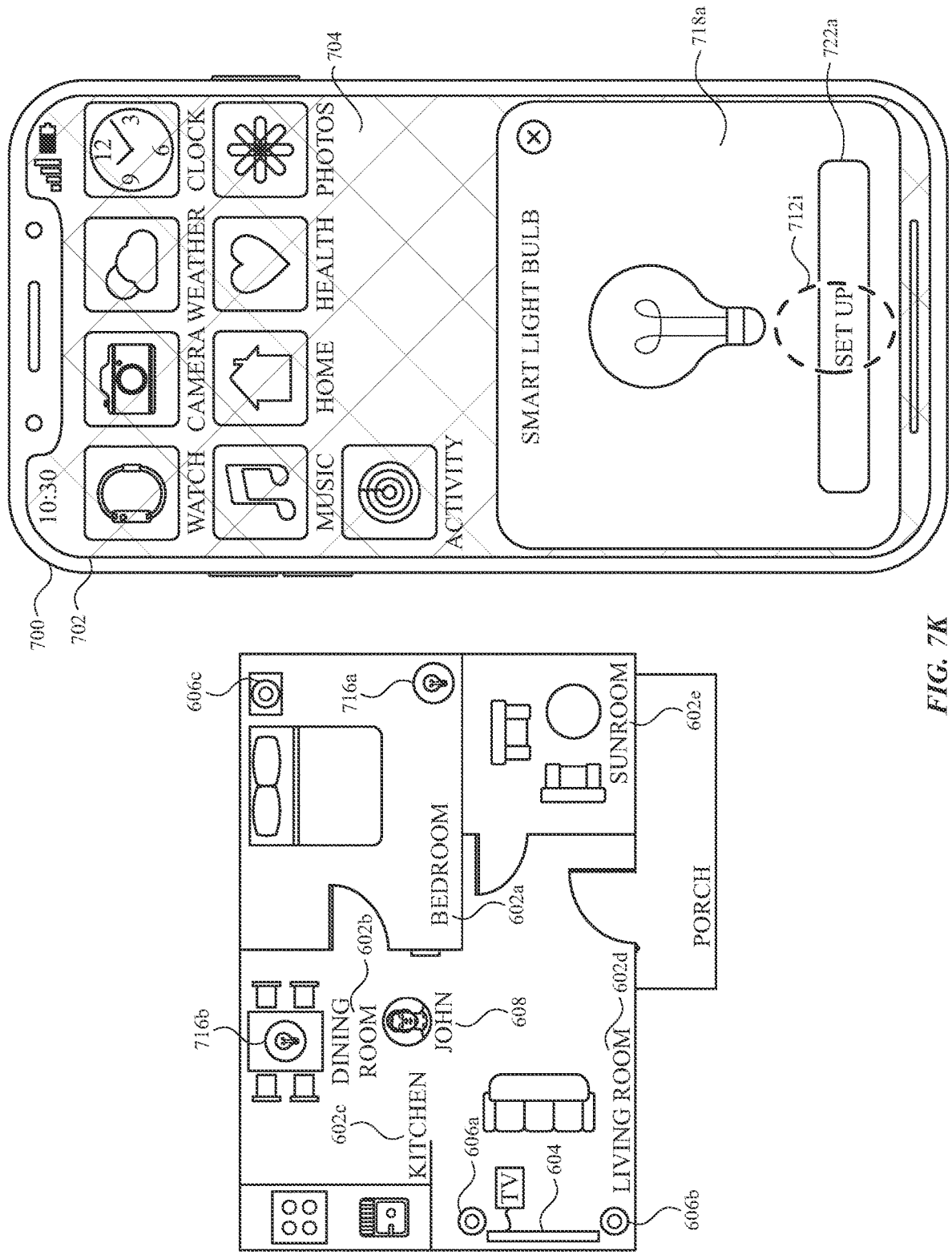

In FIG. 7K, user 608 has moved to dining room 602b. User 608 has physically placed smart light bulb 716b in dining room 602b and has initiated a process to configure smart light bulb 716b using device 700 to be controllable by device 700. Smart light bulb 716b is identical to smart light bulb 716a from a hardware perspective, including having a single speaker capable of limited media playback functionality (e.g., audio output across a limited range of frequencies with limited power). In some embodiments, the configuration process is initiated based on device 700 automatically detecting smart light bulb 716b (e.g., via a wireless signal (e.g., an NFC signal, a Bluetooth signal, a WiFi signal). In some embodiments, the process is initiated by the user entering a code (e.g., via a virtual keyboard or captured via a camera (e.g., a barcode or QR code)) or other identifier of smart light bulb 716b. The configuration process includes displaying, as seen in FIG. 7K, device setup interface 718a, as described above. Device 700 detects input 712i (e.g., a tap) on set up affordance 722a.

Figure 7L:
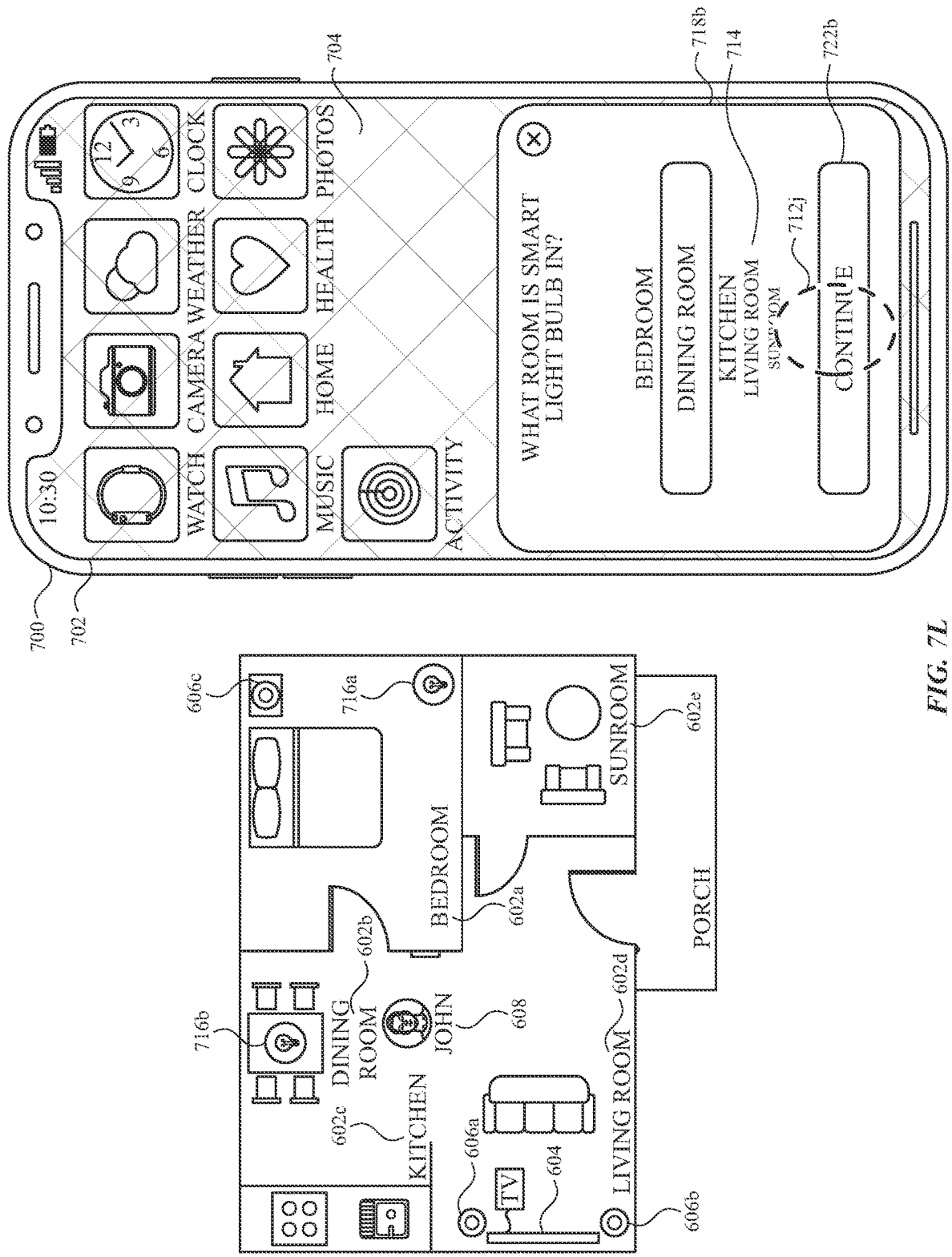

In FIG. 7L, in response to input 712i, device 700 displays device setup interface 718b for identifying a room (e.g., location) in home 600 to associate with smart light bulb 716b. Device setup interface 718b includes list of rooms 714 and a continue affordance 722b. In FIG. 7L, the dining room is already selected in list of rooms 714. Device 700 detects input 712j (e.g., a tap) on continue affordance 722b.

Figure 7M:
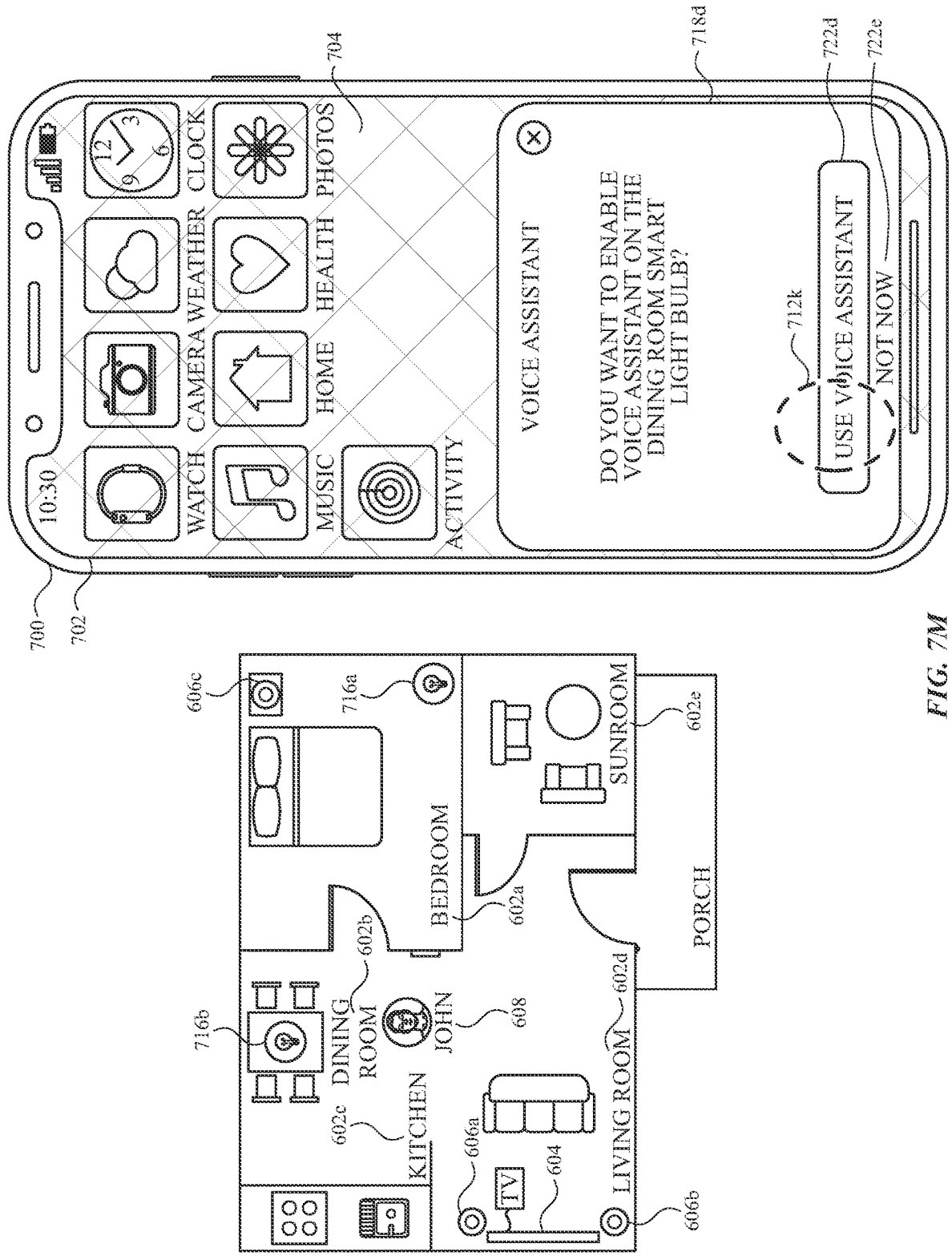

In FIG. 7M, in response to input 712j, device 700 displays device setup interface 718d (e.g., an interface similar to device setup interface 706c) for selecting whether to configure smart light bulb 716b to be available for use with a voice assistant function (e.g., a media playback function based on a voice-activated voice assistant). In contrast to the configuration process of smart light bulb 716a described above, device 700 displays device setup interface 718d because smart light bulb 716b satisfies the set of selection criteria based on smart light bulb 716b's device type (e.g., a device having a speaker capable of media playback) and based on the absence of a more capable media playback device in dining room 602b. Device setup interface 718d includes a use voice assistant affordance 722d and not now affordance 722e that, when selected, configures smart light bulb 716b to not be available for use with the voice assistant function. Device 700 detects input 712k (e.g., a tap) on use voice assistant affordance 722d.

Figure 7N:
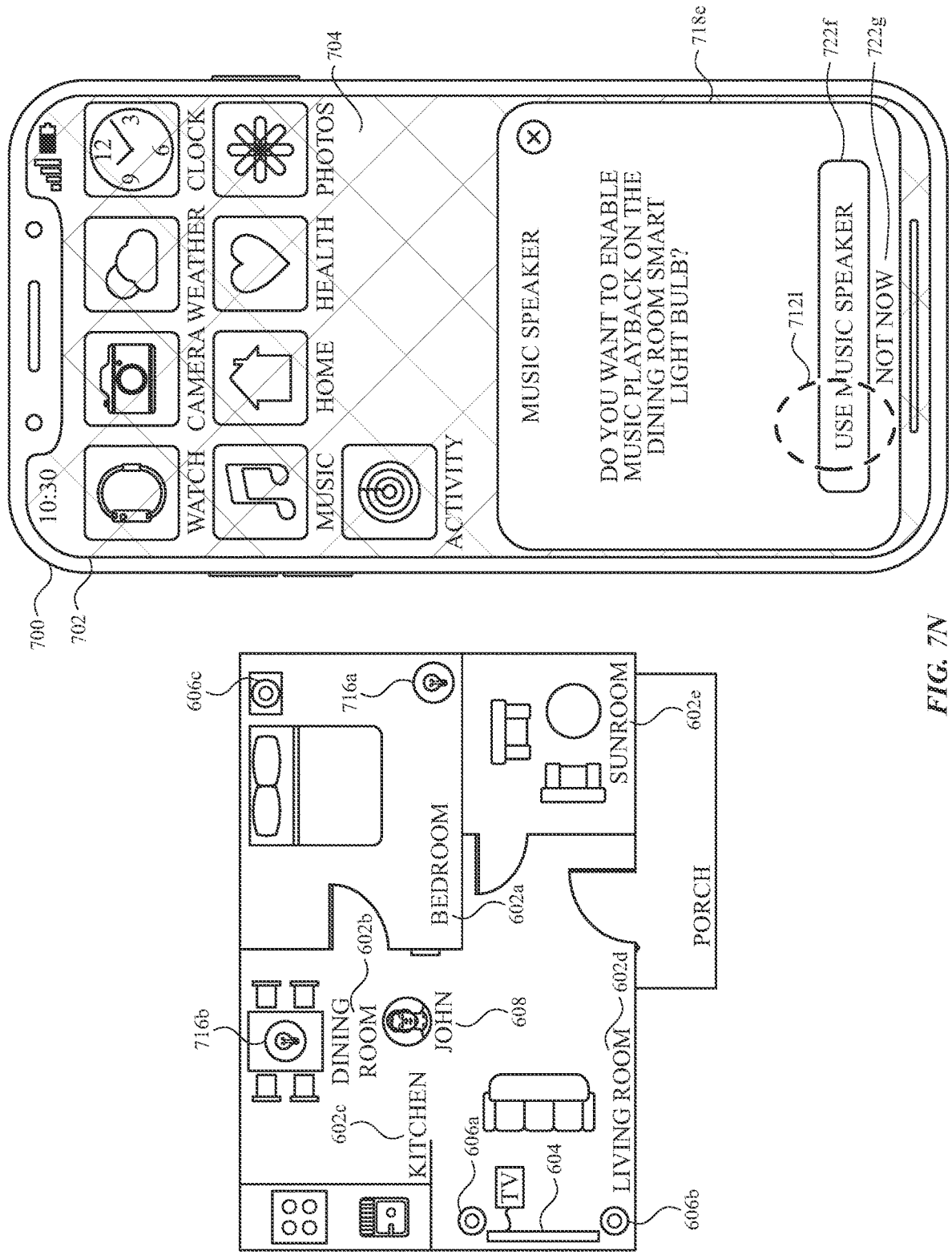

In FIG. 7N, in response to input 712k, device 700 displays device setup interface 718e (e.g., an interface similar to device setup interface 706d) for selecting whether to configure smart light bulb 716b to be available for use with the music playback function (e.g., a specific music playback function for untargeted music playback). In response to input 712j, device 700 also configures smart light bulb 716b to be available for use with the voice assistant function. In contrast to the configuration process of smart light bulb 716a described above, device 700 displays device setup interface 718e because smart light bulb 716b satisfies the set of selection criteria based on smart light bulb 716b's device type (e.g., a device having a speaker capable of media playback) and based on the absence of a more capable media playback device in dining room 602b. Device setup interface 718e includes a use music speaker affordance 722f and not now affordance 722g that, when selected, configures smart light bulb 716b to not be available for use with the music playback function. Device 700 detects input 712l (e.g., a tap) on use music speaker affordance 722f.

Figure 7O:
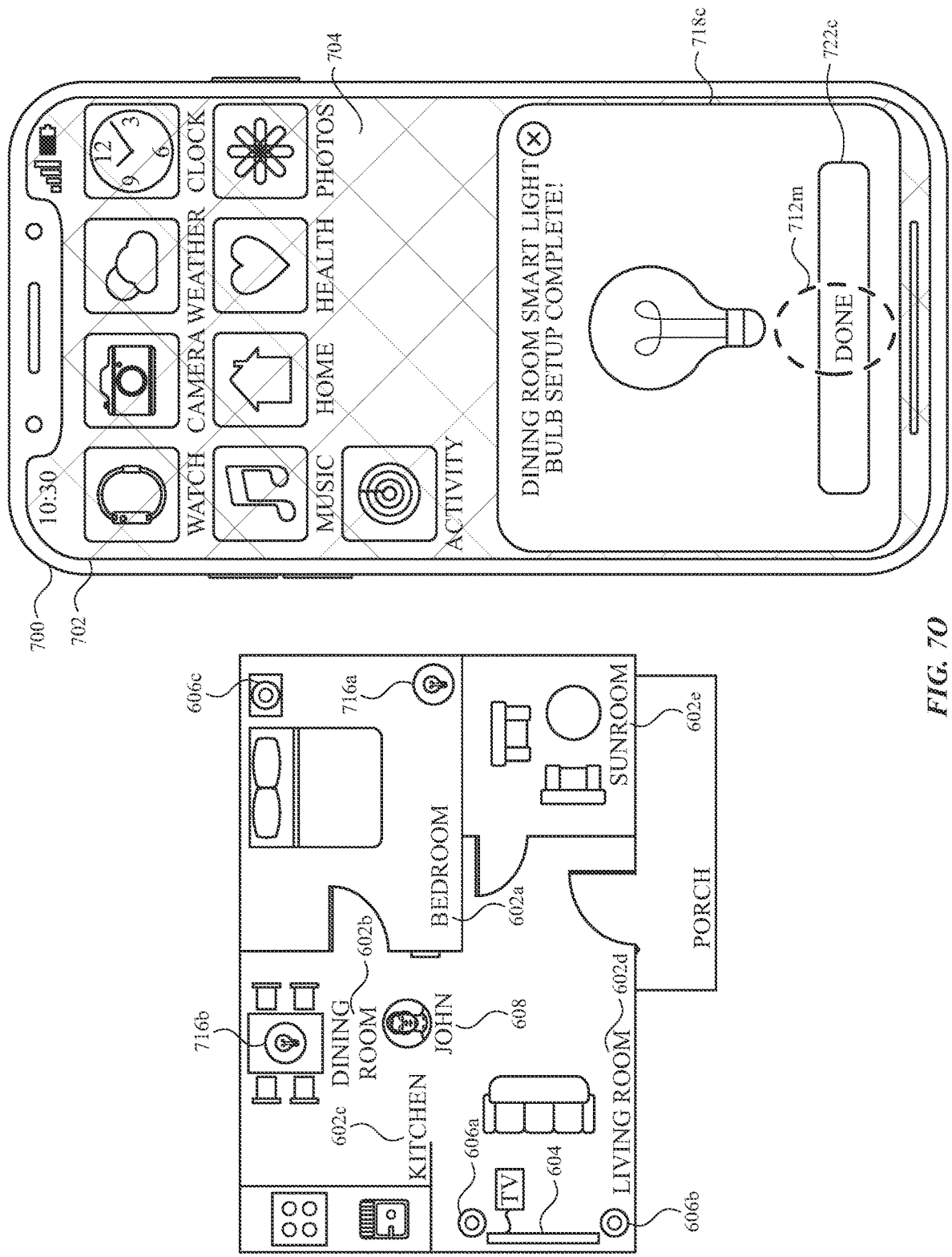

In FIG. 7O, in response to input 712l, device 700 displays device setup interface 718c for completing the configuration process for smart light bulb 716b. Device setup interface 718c includes a complete affordance 722c. Device 700 detects input 712m (e.g., a tap) on complete affordance 722c and, in response, completes the configuration process for smart light bulb 716b. Smart light bulb 716b is now configured for use, including being configured to be available for use with the voice assistant function and being configured to be available for use with a music playback function.

Figure 7P:
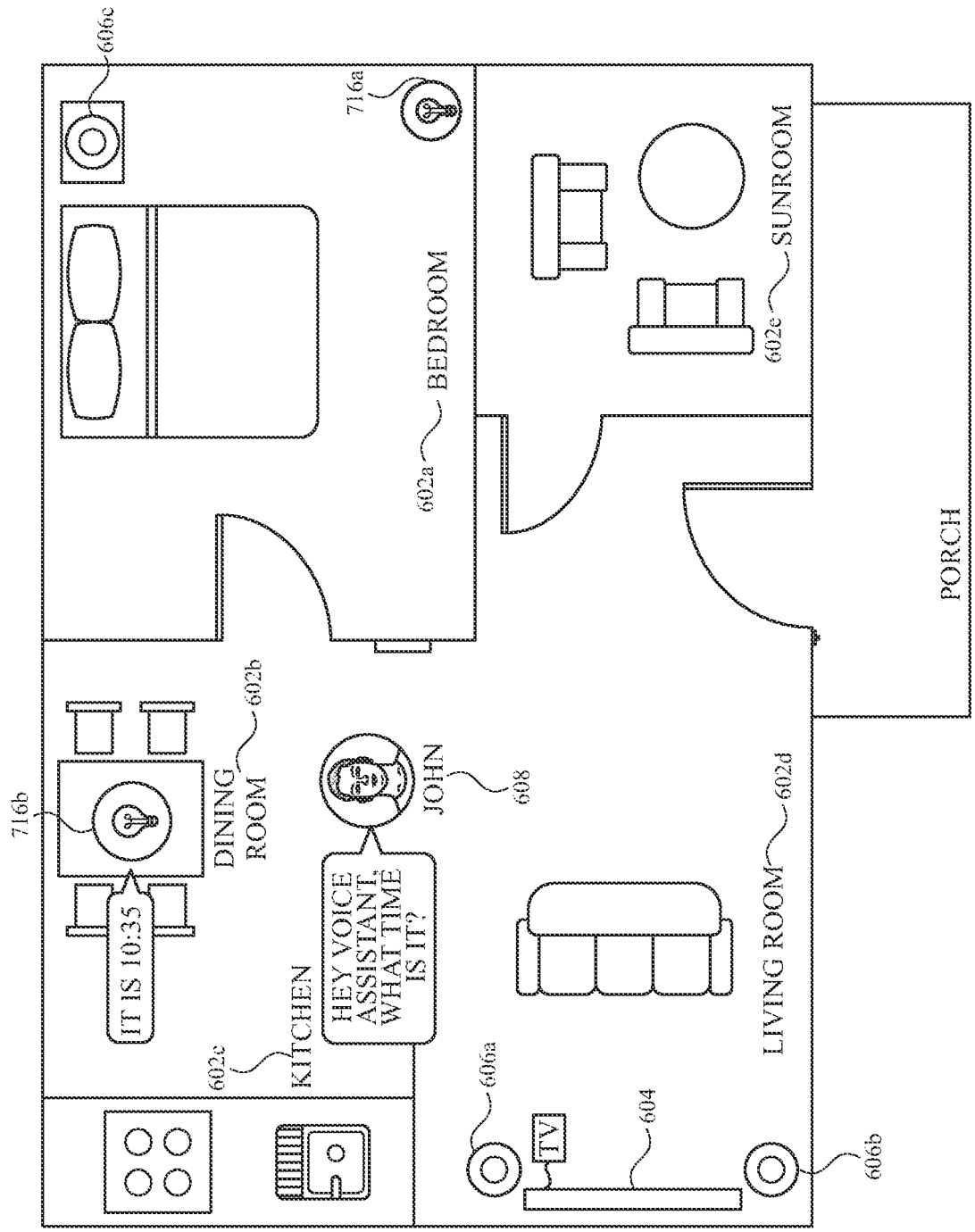

In FIG. 7P, user 608, while in dining room 602b, has uttered the phrase "hey Voice Assistant, what time is it?", which is a recognizable request for devices that are available for use with the voice assistant function. Since smart light bulb 716b is configured to be available for use with the voice assistant function, smart light bulb 716b, in response to detecting the recognizable request phrase, outputs, via its single speaker capable of limited media playback functionality, an audio response with the current time, e.g., the audio response "it is 10:35".

Figure 7Q:
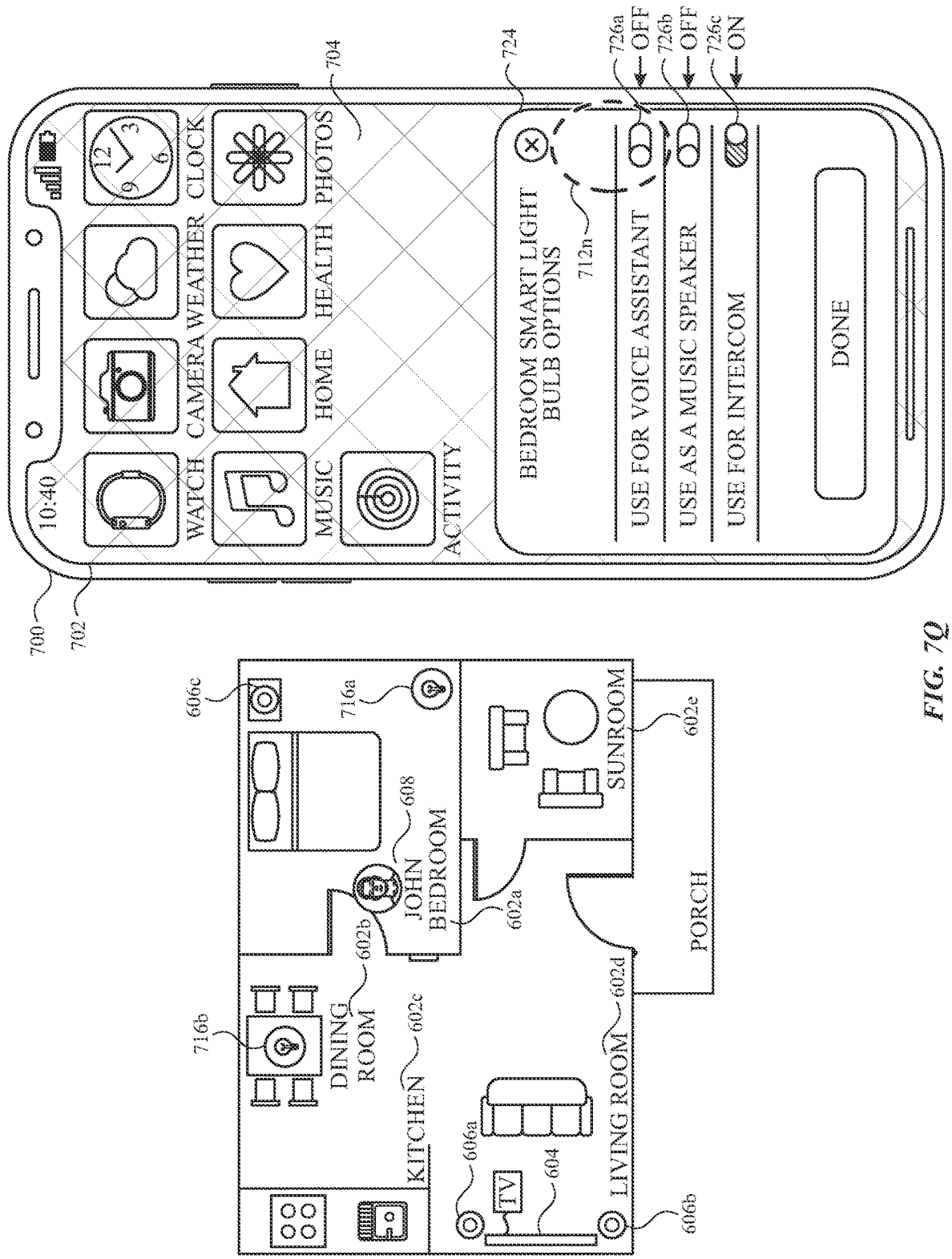
Figure 7R:
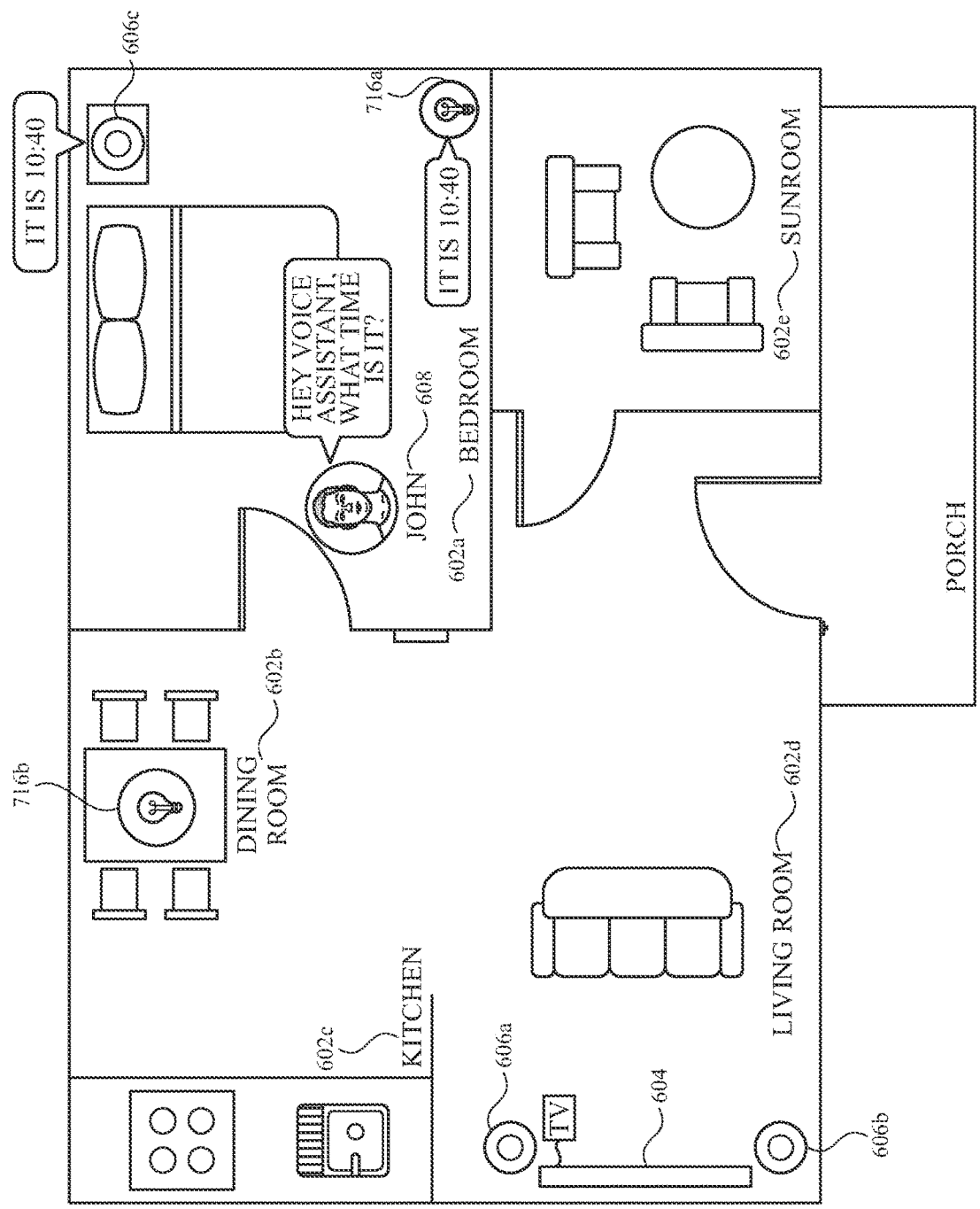

In FIG. 7Q, user 608 has moved back to bedroom 602a. User 608 has also initiated a process to modify the media playback configuration of smart light bulb 716a using device 700. As part of that process, device 700 displays device setting user interface 724 that includes a set of options for independently controlling the availability of smart light bulb 716a for various media playback functions. Specifically, device setting user interface 724 includes selectable option 726a for selecting whether smart light bulb 716a is available for use with the voice assistant function (toggled "off" in FIG. 7Q); selectable option 726b for selecting whether smart light bulb 716a is available for use with the music playback function (toggled "off" in FIG. 7Q); and selectable option 726c for selecting whether smart light bulb 716a is available for use with an intercom function that allows for broadcasting an audio message to a set of electronic devices associated with home 600 (toggled "on" in FIG. 7Q). In some embodiments, the intercom function is configured (e.g., during an initial configuration process), by default, to be available for use on any device that meets a minimum hardware criteria (e.g., has a speaker of any type). Device 700 detects input 712n on selectable option 726a and, in response, configures smart light bulb 716a to be available for use with the voice assistant function.

In FIG. 7R, user 608 has uttered the phrase "hey Voice Assistant, what time is it?", which is a recognizable request for devices that are available for use with the voice assistant function. Since smart speaker 606c and smart light bulb 716a are both configured to be available for use with the voice assistant function, smart speaker 606c and smart light bulb 716a, in response to detecting the recognizable request phrase, both output the audio response "it is 10:40".

FIG. 8 is a flow diagram illustrating a method for managing dynamically-available media playback a computer system in accordance with some embodiments. Method 800 is performed at a computer system (e.g., a smartphone, a tablet computer, a personal computer (e.g., device 100, 300, 500, 700)) that is in communication with a display generation component (e.g., a display controller, a an internal or external touch-sensitive display system) and a first external electronic device (e.g., a computer system, an internet-connected speaker, an internet-connected thermostat, an internet connected outlet) that satisfies a set of media playback hardware criteria (e.g., a set of criteria that includes a criterion that is met when the first external electronic device includes an audio output device (e.g., a speaker, a device capable of media playback)). Some operations in method 800 are, optionally, combined, the orders of some operations are, optionally, changed, and some operations are, optionally, omitted.

In some embodiments, the electronic device (e.g., 700) is a computer system. The computer system is optionally in communication (e.g., wired communication, wireless communication) with a display generation component and with one or more input devices. The display generation component is configured to provide visual output, such as display via a CRT display, display via an LED display, or display via image projection. In some embodiments, the display generation component is integrated with the computer system. In some embodiments, the display generation component is separate from the computer system. The one or more input devices are configured to receive input, such as a touch-sensitive surface receiving user input. In some embodiments, the one or more input devices are integrated with the computer system. In some embodiments, the one or more input devices are separate from the computer system. Thus, the computer system can transmit, via a wired or wireless connection, data (e.g., image data or video data) to an integrated or external display generation component to visually produce the content (e.g., using a display device) and can receive, a wired or wireless connection, input from the one or more input devices.

As described below, method 800 provides an intuitive way for managing dynamically-available media playback. The method reduces the cognitive burden on a user for managing dynamically-available media playback, thereby creating a more efficient human-machine interface. For battery-operated computing devices, enabling a user to manage dynamically-available media playback faster and more efficiently conserves power and increases the time between battery charges.

While (e.g., during a setup process; at the beginning, middle, or end of such a process) configuring the first external electronic device (e.g., 606*c*; 716*a*; 716*b*) for use with a device management application (e.g., a smart device management application; an application for managing and controlling devices configured to operate with one or more compatible software frameworks; a device management aggregator program for managing devices from multiple manufacturers) (802) and in accordance with a determination that the first external electronic device satisfies a set of selection criteria, the computer system (e.g., 700) displays (804), via the display generation component, a user-interactive graphical user interface object (e.g., an affordance; 710*c*; 710*e*; 722*d*; 722*f*) that, when selected, configures (e.g., enables) the first external electronic device to be available for (e.g., at least for) a first media playback function (e.g., playback of music; playback of messages; playback of audiobooks) (e.g., available after completion of the configuration process) (e.g., a voice assistant function as shown in FIGS. 7F, 7J, and/or 7R). In some embodiments, the first external electronic device is available to perform the first media playback function in response to requests for the function received at the computer system or at another computer system in communication with the computer system. Conditionally displaying, based on whether a set of selection criteria are satisfied, a user-interactive graphical user interface object that configures the first external electronic device to be available for a first media playback function provides the user with relevant media-related control options and functionality, when the relevant conditions are met, without requiring the user to provide further inputs. Performing an operation when a set of conditions has been met without requiring further user input enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

While (e.g., during a setup process; at the beginning, middle, or end of such a process) configuring the first external electronic device (e.g., 606*c*; 716*a*; 716*b*) for use with a device management application (e.g., a smart device management application; an application for managing and controlling devices configured to operate with one or more compatible software frameworks; a device management aggregator program for managing devices from multiple manufacturers) (802) and in accordance with a determination that the external electronic device does not satisfy the set of selection criteria, the computer system (e.g., 700) forgoes displaying (806), during the configuring of the first external electronic device for use with the device management application, the user-interactive graphical user interface object (e.g., an affordance; 710*c*; 710*e*; 722*d*; 722*f*). In some embodiments, after completing the process to configure the first external electronic device for use with a device management application, the first external electronic device is configured to not be available for the first media playback function.

In some embodiments, the set of selection criteria includes a first criterion that is based on a device type (e.g., whether the device has a primary media playback function (e.g., smart speaker 606*c* or the device does not (e.g., smart light bulb 716*a*; 716*b*)) of the first external electronic device (e.g., 606*c*; 716*a*; 716*b*). In some embodiments, the first criterion is satisfied when the first external electronic device is of a first type (e.g., a device type with a primary function of media playback; a device type that has hardware that satisfies a second set of media playback hardware criteria). In some embodiments, the first criterion is not satisfied when the first external electronic device is of a second type (e.g., a device type that has a primary function other than media playback). Conditionally displaying, based on the device type of the first external electronic device, a user-interactive graphical user interface object that configures the first external electronic device to be available for a first media playback function provides the user with relevant media-related control options and functionality, based on the type of device, without requiring the user to provide further inputs when configuring different types of devices. Performing an operation when a set of conditions has been met without requiring further user input enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the first external electronic device (e.g., 606*c*; 716*a*; 716*b*) is associated with a location (e.g., a room; a house; an area; e.g., 602*a*; 602*b*); and the set of selection criteria includes a second criterion that is based on (e.g., is satisfied or not satisfied based on) a second external electronic device (e.g., smart speaker 606*c* as shown in FIG. 7G) that is associated with the first location (e.g., based on one or more characteristics and/or capabilities of the second external electronic device). In some embodiments, the second criterion is not satisfied when the first external electronic device is associated with a location (e.g., a room; a house; an area) that is also associated with a second external electronic device of a third type (e.g., a device that satisfies a second set of media playback hardware criteria (e.g., a set of criteria that includes a criterion that is met when the second external electronic device includes an audio output device (e.g., a speaker, a device capable of media playback) of sufficient capability). In some embodiments, the first external electronic device does not satisfy the second criterion when a device with more capable audio playback capabilities is also at the same location as the first external electronic device. In some embodiments, the second criterion is satisfied when the first external device is determined to be the most capable (e.g., based on hardware) media playback device associated with the location. Conditionally displaying, based on the availability of other devices at a location, a user-interactive graphical user interface object that configures the first external electronic device to be available for a first media playback function provides the user with relevant media-related control options and functionality, based on the availability of other devices at a location, without requiring the user to provide further inputs when configuring devices at different locations. Performing an operation when a set of conditions has been met without requiring further user input enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, after configuring the first external electronic device (e.g., 606c; 716a; 716b) for use with a device management application and while the first external electronic device is not configured to be available for the first media playback function, the computer system (e.g., 700) receives (808) a first set of one or more inputs (e.g., one or more inputs on a device configuration application that configures one or more aspects of the first external electronic device) (e.g., 712m). In response to the first set of one or more inputs, the computer system (e.g., 700) configures (810) the first external electronic device to be available for the first media playback function (e.g., as shown in FIG. 7Q). Providing the user with the ability to manually configure the first external electronic device to be available for the first media playback function provides the user with additional control options and functionality, thereby enhancing user-device interactions. Providing additional control options and enhancing user-device interactions enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, configuring the first external electronic device (e.g., 606c; 716a; 716b) for use with the device management application includes configuring (e.g., regardless of whether the first electronic device satisfies the set of selection criteria) the first external electronic device to be available for a second media playback function (e.g., an alarm output function; a device-to-device intercom function (e.g., the function associated with 726c)), different from the first media playback function. Configuring the first external electronic device to be available for a second media playback function, regardless of whether the first electronic device satisfies the set of selection criteria, ensures that certain media playback functions are available on the device, without requiring further user input. Performing an operation without requiring further user input enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, a user (e.g., 608) can selectable and independently enable or disable the availability of the first external electronic device for the first media playback function and/or the second media playback function (e.g., as shown in FIG. 7Q).

In some embodiments, the first media playback function is selected from the group consisting of: audio media (e.g., music; audio books) playback, phone call handling, audibly reading out a message and/or a text (e.g., text-to-speech), outputting an audio digital assistant response; and a combination thereof.

In some embodiments, while displaying the user-interactive graphical user interface object (e.g., 710c; 710e; 722d; 722f), the computer system (e.g., 700) receives a second set of one or more inputs that includes an input corresponding to the user-interactive graphical user interface object. In response to receiving the second set of one or more inputs, the computer system configures (814) the first external electronic device (e.g., 606c; 716a; 716b) to be available for the first media playback function.

Note that details of the processes described above with respect to method 800 (e.g., FIG. 8) are also applicable in an analogous manner to the methods described below (e.g., methods 1000 and 1200). For example, method 1000 optionally includes one or more of the characteristics of the various methods described above with reference to method 800. For example, method 1000 can be carried out in conjunction with electronic device(s) initially configured according to method 800. For brevity, these details are not repeated below.

FIGS. 9A-9H illustrate exemplary diagrams and user interfaces for managing dynamically-available media playback, in accordance with some embodiments and with reference to the diagram of FIG. 6. The user interfaces in these figures are used to illustrate the processes described below, including the processes in FIG. 10.

Figure 9A:
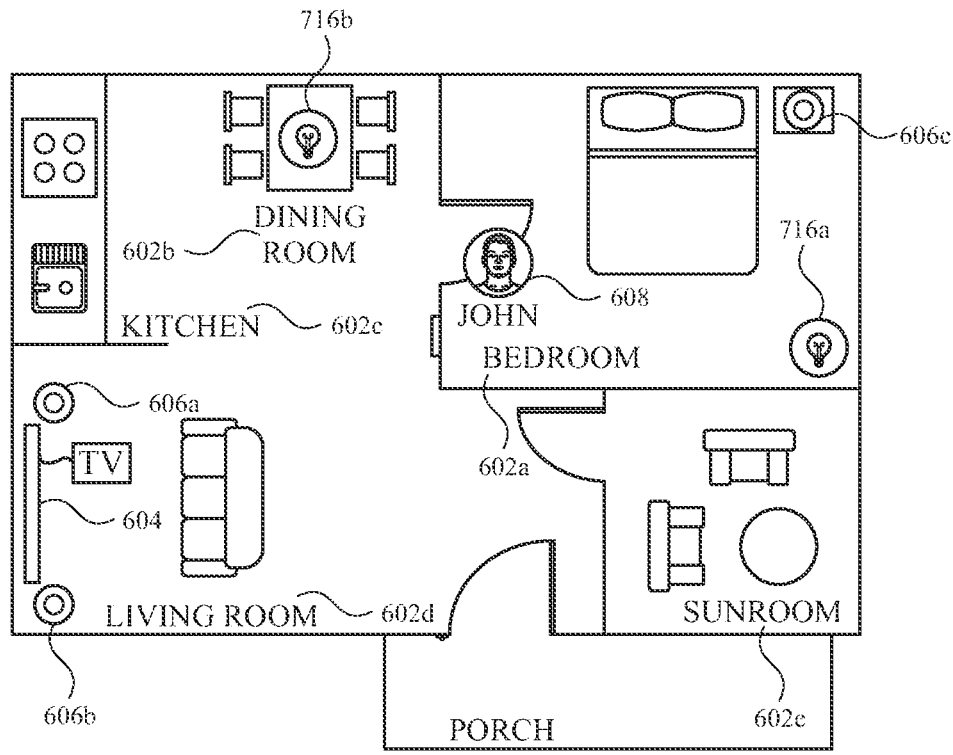
FIGS. 9A-9H illustrate exemplary diagrams and user interfaces for managing dynamically-available media playback in accordance with some embodiments.

FIG. 9A depicts the state of home 600 at a point in time (10:40 AM) immediately after the state depicted in FIG. 7R. User 608 is in bedroom 602a. Smart speakers 606a, 606b, and 606c are configured to be available for use with the music playback function (e.g., a specific music playback function for untargeted music playback; the music playback function enabled in FIGS. 7D and 7N), as is smart light bulb 716b. Smart light bulb 716a, in bedroom 602a, is not configured to be available for use with the music playback function.

Figure 9B:
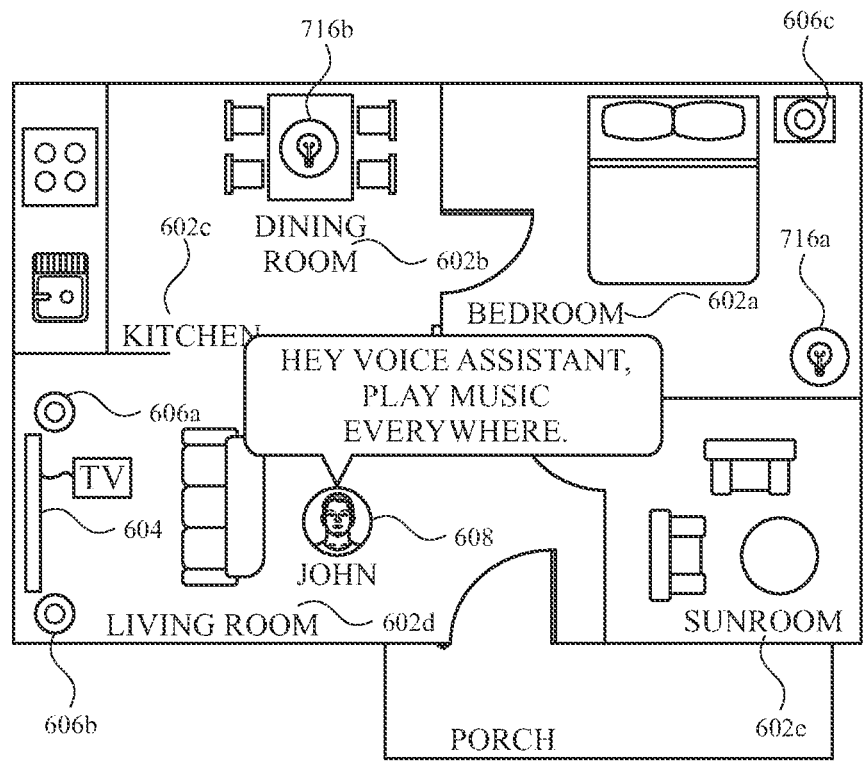

In FIG. 9B, user 608 has moved to living room 602d. User 608 has uttered the phrase "hey Voice Assistant, play music everywhere", which is a recognizable request for device(s) that are available for use with the voice assistant function. More specifically, the phrase is recognized as a request to perform a music media playback function at a plurality of devices (e.g., all devices in home 600 that are configured to be available for use with the music playback function) without designating any specific device. In the embodiment of FIGS. 9A-9H, a single coordinating electronic device, smart speaker 606a (also known as a hub device), that is configured to be available for use with the voice assistant function detects the uttered phrase and coordinates the media playback operation (e.g., retrieves media from a server and identifies compatible devices).

Figure 9C:
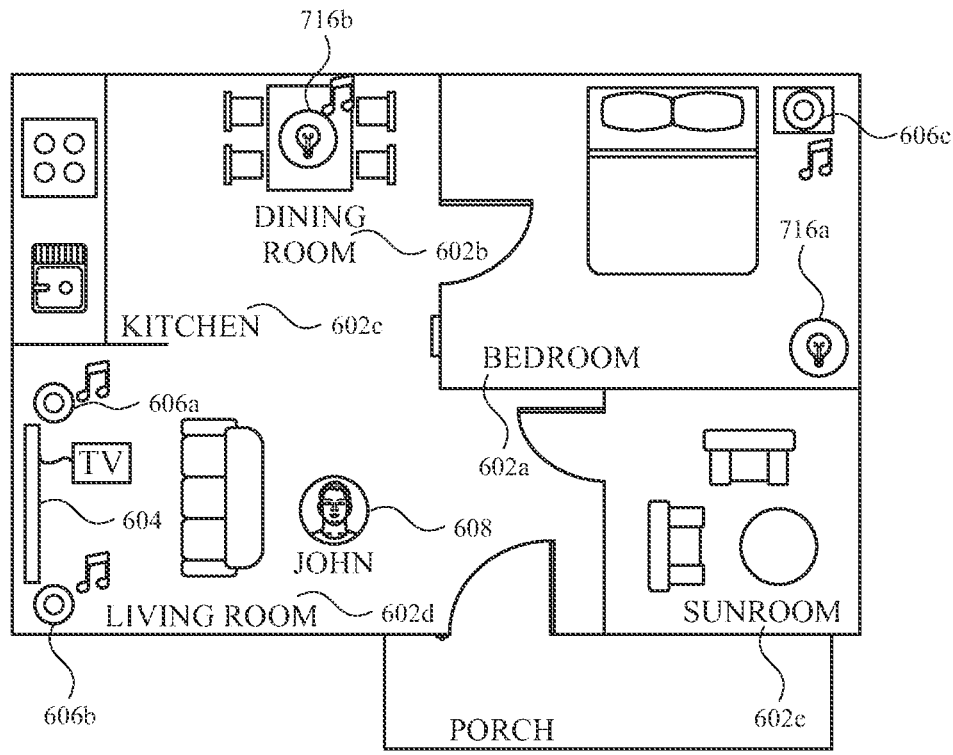

In FIG. 9C, in response to detecting the uttered phrase of FIG. 9B, smart speaker 606a causes all electronic devices in home 600 that meet a first set of criteria (e.g., by being configured to be available for use with the music playback function) to play music in response to the uttered phrase. Specifically, smart speaker 606a, acting as the coordinating device, causes smart speakers 606a, 606b, and 606c and smart light bulb 716b to play music. Smart speaker 606a does not cause smart light bulb 716a in bedroom 602a to play music, as smart light bulb 716a does not satisfy the first set of criteria as it is not configured to be available for use with the music playback function.

Figure 9D:
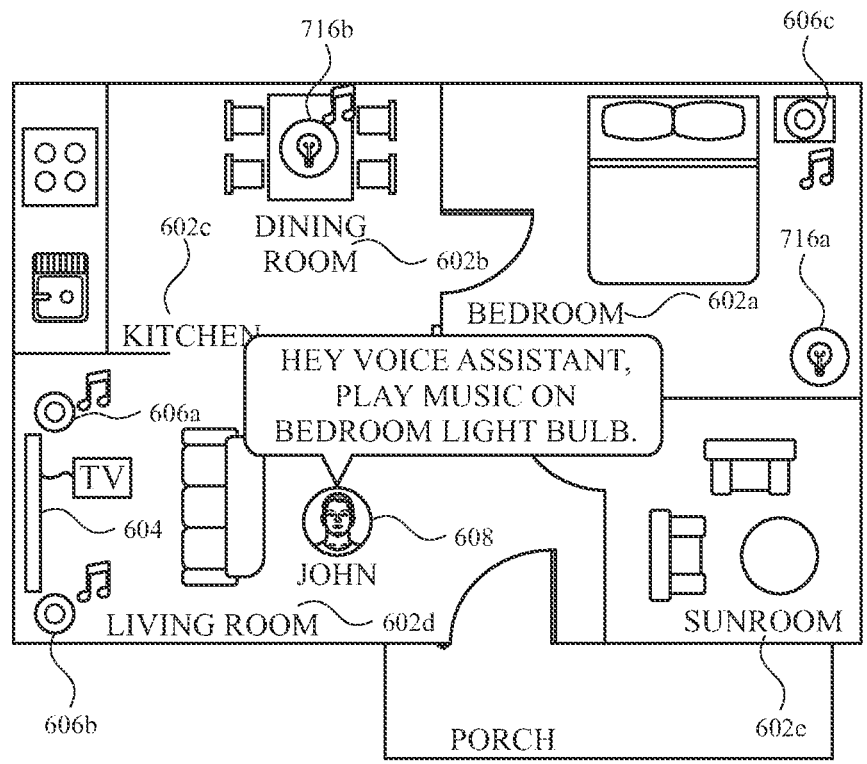

In FIG. 9D, music playback has ceased on all devices in home 600. User 608 has uttered the phrase "hey Voice Assistant, play music on bedroom light bulb", which is a recognizable request for device(s) that are available for use with the voice assistant function. More specifically, the phrase is recognized as a request to perform a music media playback function on smart light bulb 716a, only.

Figure 9F:
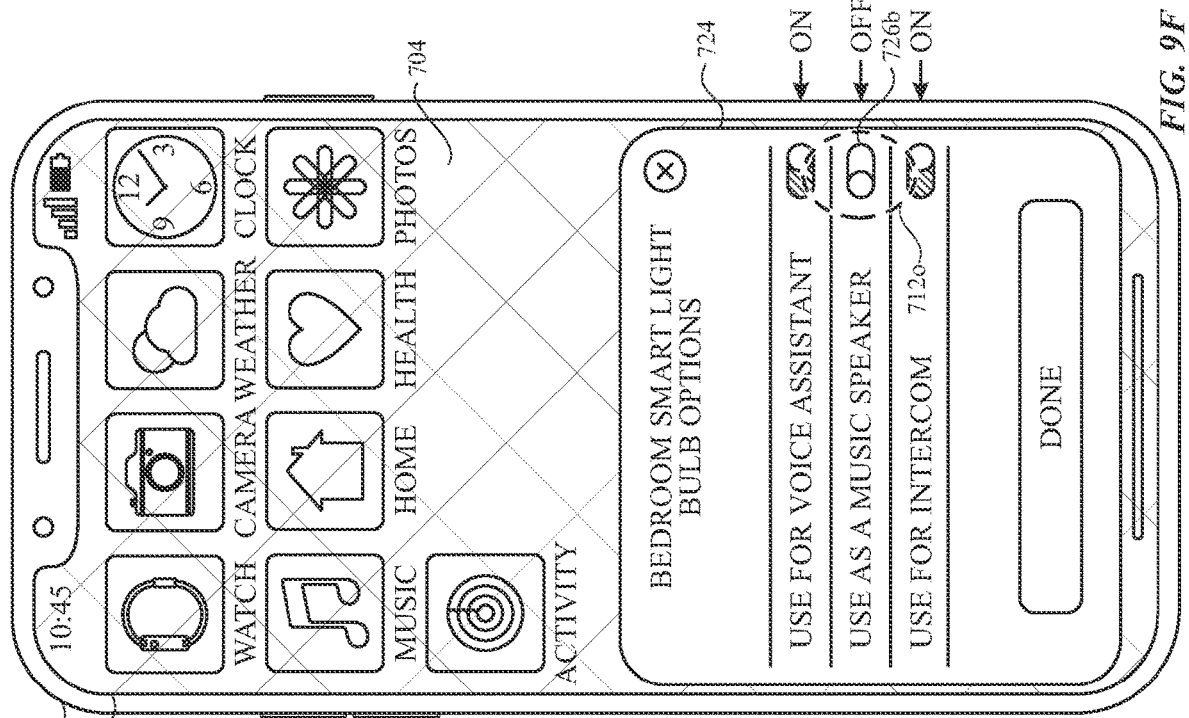
Figure 9E:
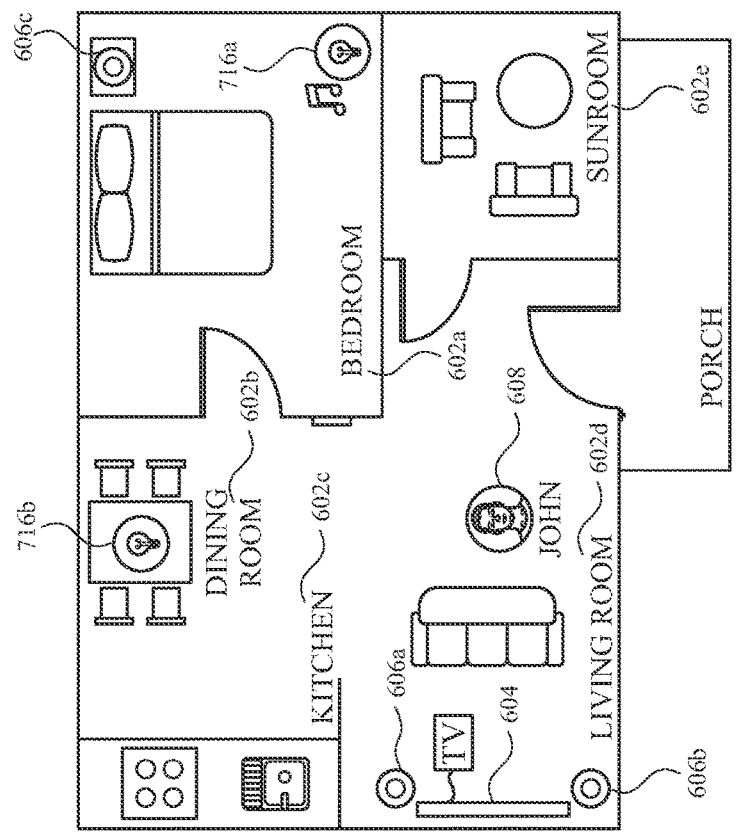

In FIG. 9E, in response to detecting the uttered phrase of FIG. 9D, smart speaker 606a (e.g., the coordinating device) causes smart light bulb 716a to play music in response to the uttered phrase. Smart speaker 606a causes smart light bulb 716a to play music even though smart light bulb 716a is not configured to be available for use with the music playback function because the music playback function is specifically a function to playback on a plurality of devices (e.g., all devices in home 600 that are configured to be available for use with the music playback function) without designating any specific device, which is not the function requested in FIG. 9D.

In FIG. 9F, user 608 has initiated a process to modify the media playback configuration of smart light bulb 716a using device 700. As part of that process, device 700 displays device setting user interface 724, the same interface discussed with reference to FIG. 7Q. Device setting user interface 724 includes selectable option 726b for selecting whether smart light bulb 716a is available for use with the voice assistant function (toggled "off" in FIG. 9F). Device 700 detects input 712n on selectable option 726b and, in response, configures smart light bulb 716a to be available for use with the music playback function.

Figure 9G:
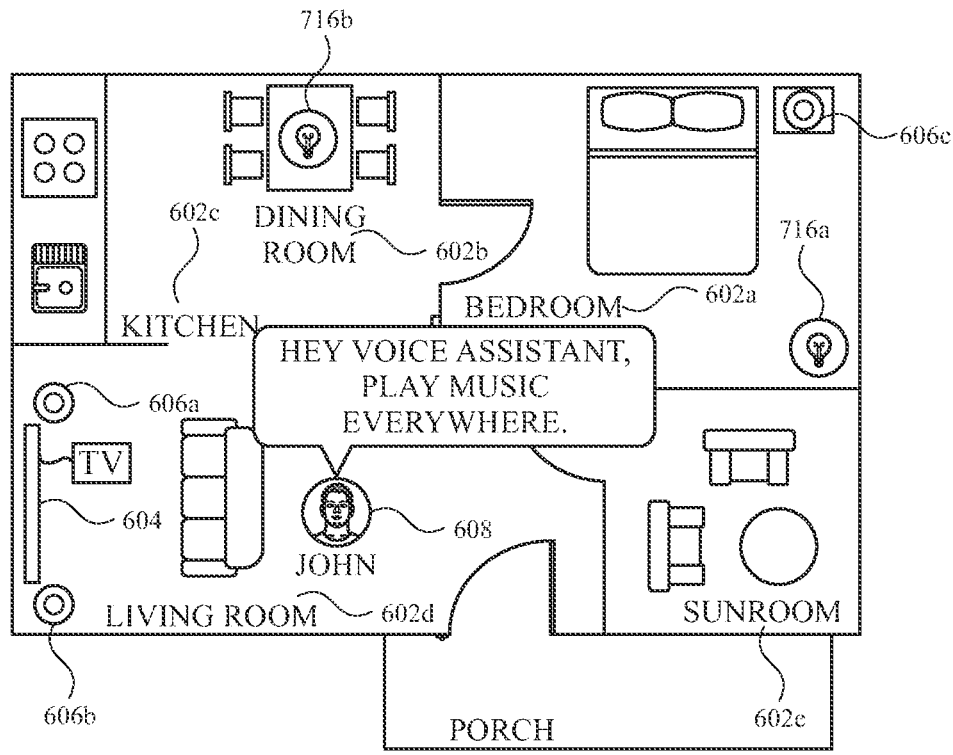
Figure 9H:
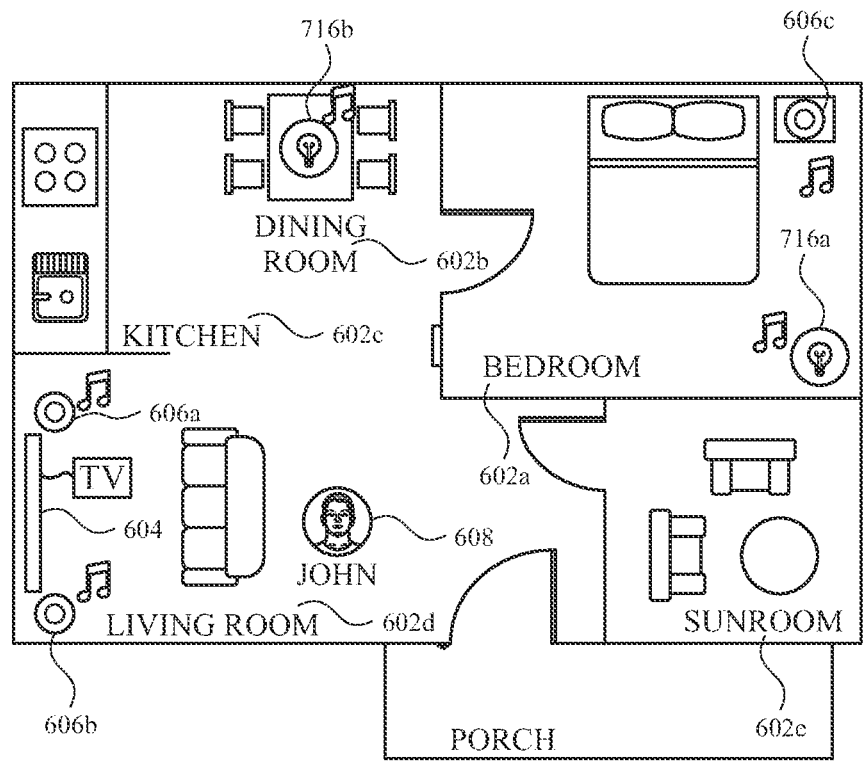

In FIG. 9G, user 608 has, once again, uttered the phrase "hey Voice Assistant, play music everywhere". In FIG. 9H, in response to detecting the uttered phrase of FIG. 9B, smart speaker 606a causes all electronic devices in home 600 that meet a first set of criteria (e.g., by being configured to be available for use with the music playback function) to play music in response to the uttered phrase. Specifically, smart speaker 606a, acting as the coordinating device, causes smart speakers 606a, 606b, and 606c and smart light bulbs 716b and 716a to play music. In contrast to FIGS. 9B and 9C, smart speaker 606a determines that smart light bulb 716a now satisfies the first set of criteria (e.g., is configured to be available for use with the music playback function) and, consequently causes it to play music in response to the uttered phrase.

FIG. 10 is a flow diagram illustrating a method for managing dynamically-available media playback a computer system in accordance with some embodiments. Method 1000 is performed at a computer system (e.g., a smart device/smart home hub device/system (e.g., a personal computer (e.g., device 100, 300, 500), a tablet computer, a smart speaker with device-management capabilities (e.g., 580), a digital media player with device-management capabilities) that manages function(s) of one or more external connected devices) (e.g., device 606a) that is in communication with a plurality of external electronic devices (e.g., computer systems, internet-connected speakers, an internet-connected thermostats, internet connected outlets; devices that have hardware capable of performing media (e.g., audio media) playback function(s)), including a first external electronic device (e.g., a computer system, an internet-connected speaker, an internet-connected thermostat, an internet connected outlet; a device that has hardware capable of performing media (e.g., audio media) playback function(s)) (e.g., 606a, 606b, 606c, 716a, 716b). Some operations in method 800 are, optionally, combined, the orders of some operations are, optionally, changed, and some operations are, optionally, omitted.

In some embodiments, the electronic device (e.g., 606a) is a computer system. The computer system is optionally in communication (e.g., wired communication, wireless communication) with a display generation component and with one or more input devices. The display generation component is configured to provide visual output, such as display via a CRT display, display via an LED display, or display via image projection. In some embodiments, the display generation component is integrated with the computer system. In some embodiments, the display generation component is separate from the computer system. The one or more input devices are configured to receive input, such as a touch-sensitive surface receiving user input. In some embodiments, the one or more input devices are integrated with the computer system. In some embodiments, the one or more input devices are separate from the computer system. Thus, the computer system can transmit, via a wired or wireless connection, data (e.g., image data or video data) to an integrated or external display generation component to visually produce the content (e.g., using a display device) and can receive, a wired or wireless connection, input from the one or more input devices.

As described below, method 1000 provides an intuitive way for managing dynamically-available media playback. The method reduces the cognitive burden on a user for managing dynamically-available media playback, thereby creating a more efficient human-machine interface. For battery-operated computing devices, enabling a user to manage dynamically-available media playback faster and more efficiently conserves power and increases the time between battery charges.

The computer system (e.g., 606a) receives (1002) a first request (e.g., a spoken request (e.g., a natural language utterance); a text request; a request received directly at the computer system from a user; a request received from a user at an external device that is transmitted to the computer system) (e.g., the request in FIG. 9B; the request in FIG. 9D) to perform a first media playback operation (e.g., a request to play music; a request to read out a message; a request to play a podcast or an audiobook) using one or more of the plurality of external electronic devices (e.g., 606b, 606c, 716a, 716b).

In response to the first request (1004) and in accordance with a determination that the first request is a request to perform the first media playback operation at two or more of the plurality of devices (e.g., 606b, 606c, 716a, 716b) and a determination that the first request does not designate a specific device (e.g., the request does not include a specific, singular device identifier) to perform the first media playback operation (e.g., the request is "play music everywhere" or "play music on my devices") (e.g., the request in FIG. 9B) (1006) and in accordance with a determination that the first external electronic device satisfies a first set of criteria (e.g., the device is configured to be available for use with the music playback function) (1008), the computer system (e.g., 606a) causes (1004) (e.g., instructing; transmitting an instruction to cause) the first external electronic device (e.g., 716b) to perform the first media playback operation. Conditionally causing, based on the nature of a request and whether the first external electronic device satisfies a first set of criteria, the first external electronic device to perform the first media playback operation causes the operation to be performed by the specific device without requiring further user input. Performing an operation when a set of conditions has been met without requiring further user input enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In response to the first request (1004) and in accordance with a determination that the first request is a request to perform the first media playback operation at two or more of the plurality of devices (e.g., 606*b*, 606*c*, 716*a*, 716*b*) and a determination that the first request does not designate a specific device (e.g., the request does not include a specific, singular device identifier) to perform the first media playback operation (e.g., the request is "play music everywhere" or "play music on my devices") (e.g., the request in FIG. 9B) (1006) and in accordance with a determination that the first external electronic device does not satisfy the first set of criteria (1010), the computer system (e.g., 606*a*) forgoes causing the first external electronic device (e.g., 716*a*) to perform the first media playback operation (e.g., while causing two or more other external electronic devices of the plurality of external electronic devices to perform the first media playback operation).

In response to the first request (1004) and in accordance with a determination that the first request designates (e.g., specifically designates by providing a unique identifier) at least the first external electronic device (e.g., 716*a*) to perform the first media playback operation (e.g., the request is "play music on [the first external electronic device]") (e.g., the request in FIG. 9D) (1012), the computer system causes (1012) the first external electronic device (e.g., 716*a*) to perform the first media playback operation (e.g., regardless of (e.g., independent of) whether the first electronic device satisfies or does not satisfy the first set of criteria).

In some embodiments, the first external electronic device (e.g., 716*a*) does not satisfy the first set of criteria when the first external electronic device is associated with a first location (e.g., a room; a house; an area) (e.g., bedroom 602*a*) that is also associated with a second external electronic device (e.g., 606*c*) of a first type (e.g., a device that satisfies a second set of media playback hardware criteria (e.g., a set of criteria that includes a criterion that is met when the second external electronic device includes an audio output device (e.g., a speaker, a device capable of media playback) of sufficient capability)) (e.g., a device with a primary function as a media playback device (e.g., a smart speaker)). In some embodiments, the first external electronic device does not satisfy the set of selection criteria when a device with more capable audio playback capabilities is also at the same location. Conditionally causing, based on the nature of a request and whether another electronic device of a first type is associated with a location of the first electronic device, the first external electronic device to perform the first media playback operation causes the operation to be performed by the specific device without requiring further user input. Performing an operation when a set of conditions has been met without requiring further user input enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the first set of criteria includes a first criterion that is not satisfied when the first external electronic device (e.g., 716*a*) is a device of a second type (e.g., a device with limited media playback capabilities and/or hardware; a device that has a primary function other than media playback (e.g., a thermostat with a speaker; a light with a speaker)). Conditionally causing, based on the device type of the first electronic device, the first external electronic device to perform the first media playback operation causes the operation to be performed by the specific device without requiring further user input. Performing an operation when a set of conditions has been met without requiring further user input enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the first criterion is a user-selectable criterion (e.g., a criterion that can be enabled or disabled by the user) that can be disabled (e.g., modifying the first set of criteria to not include the first criterion) via user selection (e.g., selection (e.g., input on 726*b*) via a settings application (e.g., 724)). In some embodiments, when the criterion is disabled for the external electronic device, the first external electronic device satisfies the first set of criteria even if the first external electronic device is a device of the second type. Providing the user with the ability select the first external electronic device to perform the first media playback operation provides the user with additional control options and functionality, thereby enhancing user-device interactions. Providing additional control options and enhancing user-device interactions enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the plurality of external electronic devices (e.g., 606*b*, 606*c*, 716*a*, 716*b*) includes a third external electronic device (e.g., 716*b*), and the method further includes, in response to the first request and in accordance with a determination that the first request is a request to perform the first media playback operation at two or more of the plurality of devices and a determination that the first request does not designate a specific device to perform the first media playback operation (e.g., the request of FIG. 9B), the computer system causing (1014) the third external electronic device to perform the first media playback operation. In some embodiments, the third external electronic device satisfied the first set of criteria. In some embodiments, the third external electronic device primarily functions as a media playback device.

In some embodiments, the first external electronic device (e.g., 716*a*) does not satisfy the first set of criteria; the first external electronic device is a device of a third type (e.g., a device with limited media playback capabilities and/or hardware; a device that has a primary function other than media playback (e.g., a thermostat with a speaker; a light with a speaker); and the third external electronic device (e.g., 606*b*) is a device of a fourth type (e.g., a device that primarily functions as a media playback device), different than the third type. Configuring different device types to respond differently to request to perform the first media playback operation causes the operation to be performed by different devices without requiring further user input. Performing an operation when a set of conditions has been met without requiring further user input enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, a device of the third type (e.g., 716a) and a device of the fourth type (e.g., 606b) have different hardware configurations (e.g., hardware capabilities (e.g., hardware capabilities that affect media playback (e.g., different speakers)). Configuring different device types that have different hardware configures to respond differently to request to perform the first media playback operation causes the operation to be performed by different devices without requiring further user input. Performing an operation when a set of conditions has been met without requiring further user input enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the first request is a request to perform the first media playback operation at two or more of the plurality of devices and the first request does not designate a specific device to perform the first media playback operation (e.g., the request in FIG. 9B); the first external electronic device (e.g., 606b) satisfies the first set of criteria; and the first external electronic device is caused to perform the first media playback operation.

In some embodiments, the first set of criteria is satisfied when the first external electronic device (e.g., 606b) is a device of a fifth type (e.g., a device that primarily functions as a media playback device; a device having a required hardware configuration) (e.g., a smart speaker). Conditionally causing, based on the nature of a request and whether the first external electronic device is of a certain device type, the first external electronic device to perform the first media playback operation causes the operation to be performed by the specific device without requiring further user input. Performing an operation when a set of conditions has been met without requiring further user input enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the first external electronic device (e.g., 606c) is associated with a second location (e.g., a room; a house; an area) (e.g., bedroom 602a); and the first set of criteria is satisfied when the first external electronic device is a device of the fifth type (e.g., a smart speaker) regardless of whether the second location is associated with one or more other external electronic devices (e.g., 716a) of the plurality of external electronic devices. Conditionally causing, based on the nature of a request and the device type and regardless of whether the location of the first electronic device is associated with another device, the first external electronic device to perform the first media playback operation causes the operation to be performed by the specific device without requiring further user input. Performing an operation when a set of conditions has been met without requiring further user input enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

Note that details of the processes described above with respect to method 1000 (e.g., FIG. 10) are also applicable in an analogous manner to the methods described above (e.g., method 800) and below (e.g., method 1200). For example, method 800 optionally includes one or more of the characteristics of the various methods described above with reference to method 1000. For example, method 800 can be initially used to configure devices that are then used as part of method 1000. For brevity, these details are not repeated below.

FIGS. 11A-11I illustrate exemplary scenarios and user interfaces for adapting visual outputs based on device capabilities and a state of the device, in accordance with some embodiments. The exemplary scenarios and user interfaces in these figures are used to illustrate the processes described below, including the processes in FIG. 12.

Figure 11A:
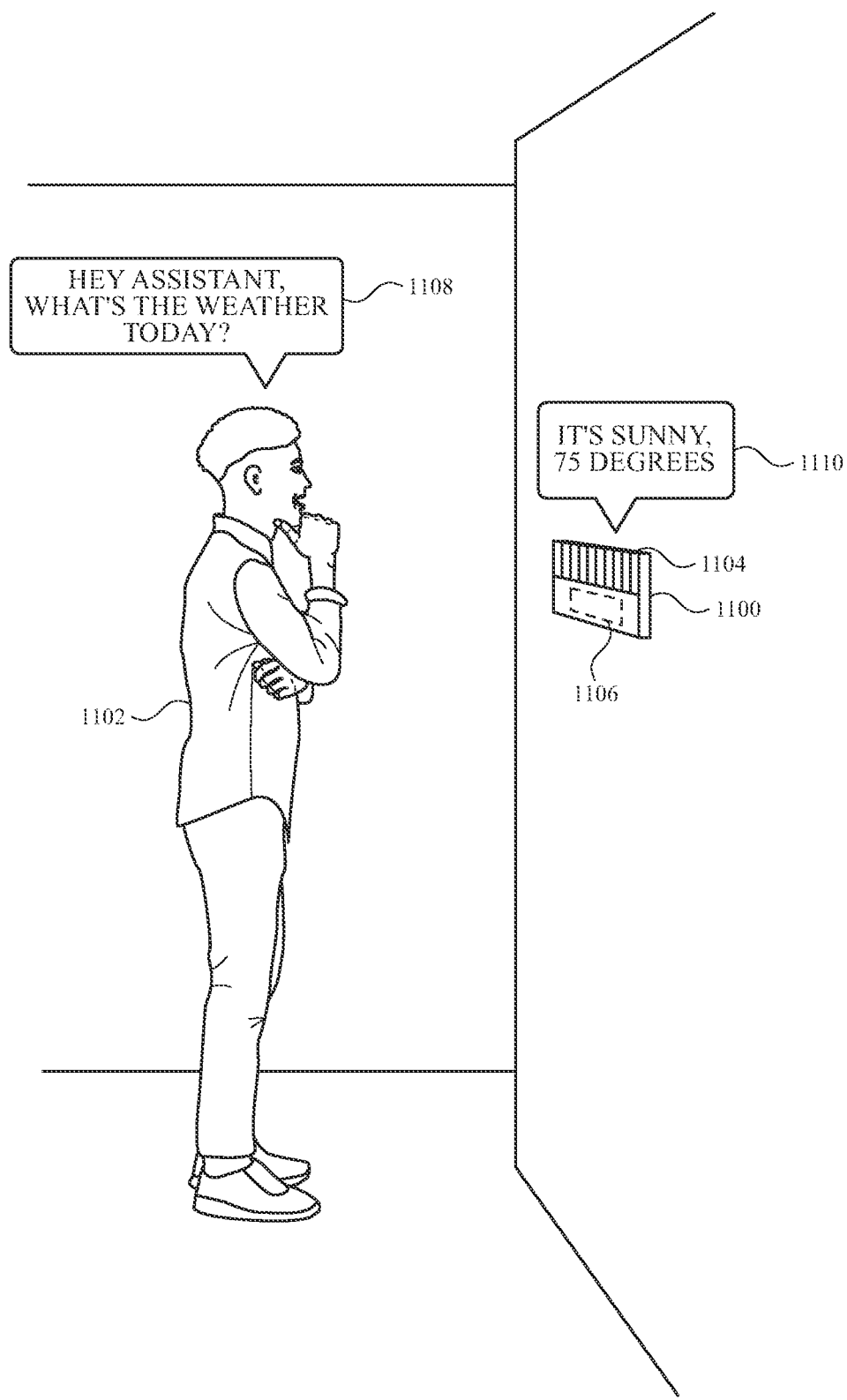

In FIG. 11A, user 1102 is interacting with device 1100, which includes an integrated microphone 1104 and a visual output device 1106. In some embodiments, device 1100 is a smart intercom, a smart speaker, or a smart thermostat having one or more features of devices 100, 300, 500, and/or 580. In some embodiments, device 1100 is configured according to process 800 (e.g., using device 700). In FIGS. 11A-11I, visual output device 1106 is not a specific device, rather FIGS. 11A-11I are used to illustrate how a device can adapt visual outputs based on the device's specific visual output capabilities. Thus, visual output device 1106 is show with a dashed outline to indicate that it can, alternatively, be an output device with different capabilities, as described in more detail below.

In FIG. 11A, user 1102 has uttered phrase 1108 ("hey assistant, what's the weather today"), which is recognized by a digital assistant of device 1100 as a request for weather information for the current location. In response, device 1100 outputs the audio response 1110 ("it's sunny, 75 degrees"). During the interaction, both when phrase 1108 was uttered and when audio response 1108 was provided, visual output device 1106 provides a visual output that is described in more detail in FIGS. 11B-11D and 11I.

Figure 11B:
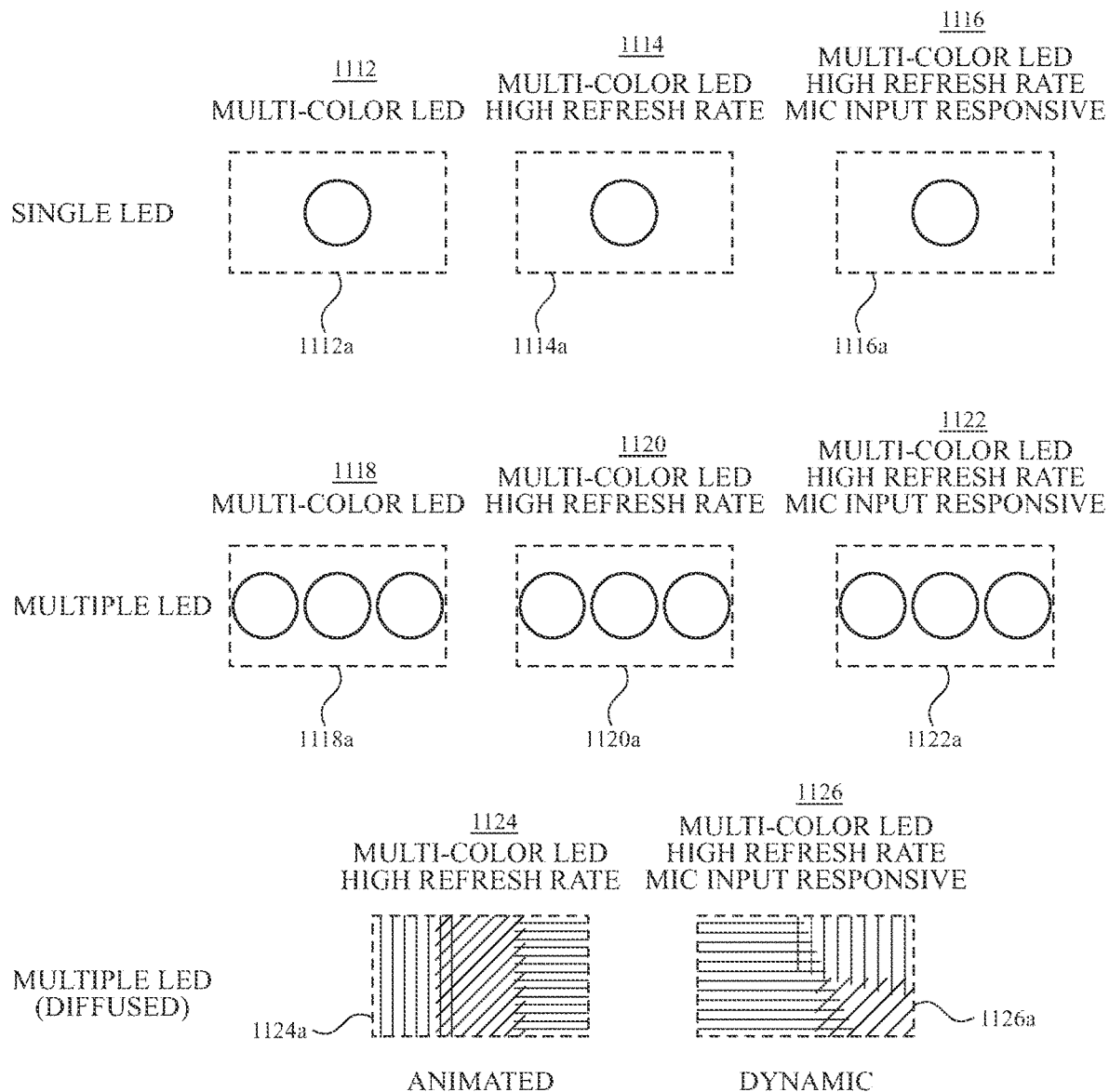

FIG. 11B shows the visual output of device 1100, based on a number of different possible visual output hardware configurations, to first part 1108a ("hey assistant") of phrase 1108, which is received while device 1100 is operating in a digital assistant listening state. Note that device 1100 would have only one of the possible, alternative visual output hardware configurations and that the multiple configurations depicted in FIG. 11B-11I are for illustration purposes only.

In the top row of FIG. 11B, LED configurations 1112, 1114, and 1116 are shown, with their matching visual outputs 1112a, 1114a, and 1116a, respectively, to first part 1108a. As seen in that top row, LED configuration 1112 is a single LED (e.g., a visual output device made up of a single, multicolored LED) that has a refresh rate below a threshold level (e.g., 10 Hz, 15 Hz, 30 Hz, 60 Hz) and that is not dynamically responsive to microphone inputs or audio outputs. LED configuration is providing output 1112a, which is the single LED being on and emitting white light, as indicated by the white circle. In FIGS. 11A-11I, a white circle indicates an LED in an on state, outputting a white light, a black circle indicates an LED in an off state, and various forms of hatching indicate an LED in an on state, with different colors of non-white light. LED configuration 1114 is a single, multicolor LED with a refresh rate that is higher than a threshold value (e.g., 10 Hz, 15 Hz, 30 Hz, 60 Hz) and that is not dynamically responsive to microphone inputs or audio outputs. LED configuration 1114 provides output 1114a, which is also an on state, with white light. In FIG. 11B, LED configuration 1116 is a single, multicolored LED that has a refresh rate that is higher than the threshold value and is also capable of dynamically responding to microphone inputs (e.g., a visual characteristic of the LED (e.g., color, on/off state, brightness) can vary based on audio detected via microphone 1104) and audio outputs. LED configuration 1116 provides visual output 1114a, which is also an on state, with white light. Thus, in the top row of FIG. 11B, all three of the differing single LED configurations provide the same output during an initial phase of a digital assistant listening state.

In the middle row of FIG. 11B, LED configurations 1118, 1120, and 1122 are shown, with their matching visual outputs 1118a, 1120a, and 1122a, respectively, to first part 1108a. As seen in that middle row, LED configuration 1118 includes multiple LEDs (e.g., a visual output device made up of multiple, multicolored LEDs) that have refresh rates below a threshold level (e.g., 10 Hz, 15 Hz, 30 Hz, 60 Hz) and that are not dynamically responsive to microphone inputs or audio outputs. LED configuration 1118 is providing output 1118a, which is the multiple LEDs being on and outputting white light, as indicated by the white circles. LED configuration 1120 includes multiple LEDs with refresh rates that are higher than a threshold value (e.g., 10 Hz, 15 Hz, 30 Hz, 60 Hz) and that are not dynamically responsive to microphone inputs or audio outputs. LED configuration 1120 provides output 1120a, which is the multiple LEDs being on, emitting white light. In FIG. 11B, LED configuration 1122 includes multiple LEDs having refresh rates that are higher than the threshold value and that are also capable of dynamically responding to microphone inputs (e.g., a visual characteristic of the LEDs (e.g., color, on/off state, brightness) can vary based on audio detected via microphone 1104) and audio outputs. LED configuration 1122 provides visual output 1114a, which is the multiple LEDs being on and outputting white light, as indicated by the white circles. Thus, in the middle row of FIG. 11B, all three of the differing multiple LED configurations provide the same output during an initial phase of a digital assistant listening state.

In the bottom row of FIG. 11B, LED configurations 1124 and 1126 are shown, with their matching visual outputs 1124a and 1126a, respectively, to first part 1108a. As seen in that bottom row, LED configuration 1124 includes multiple, multicolored LEDs with refresh rates that are higher than a threshold value (e.g., 10 Hz, 15 Hz, 30 Hz, 60 Hz) and that pass their emissions through a diffusing element (e.g., a translucent plastic screen), but that are not dynamically responsive to microphone inputs or audio outputs. LED configuration 1124 provides output 1124a, which is the multiple LEDs providing a first pattern of multi-colored lights. In FIG. 11B, LED configuration 1126 includes multiple, multicolored LEDs with refresh rates that are higher than a threshold value (e.g., 10 Hz, 15 Hz, 30 Hz, 60 Hz) and that pass their emissions through a diffusing element (e.g., a translucent plastic screen) and that are also capable of dynamically responding to microphone inputs (e.g., a visual characteristic of the LEDs (e.g., color, on/off state, bright-ness) can vary based on audio detected via microphone 1104) and audio outputs. LED configuration 1126 is providing output 1126a, which is the multiple LEDs providing a second pattern of multi-colored lights that is dynamically based on the microphone input ("hey assistant"). Thus, in the bottom row of FIG. 11B, the two differing diffused, multiple LED configurations are providing different multicolored and diffused outputs during an initial phase of a digital assistant listening state.

Figure 11C:
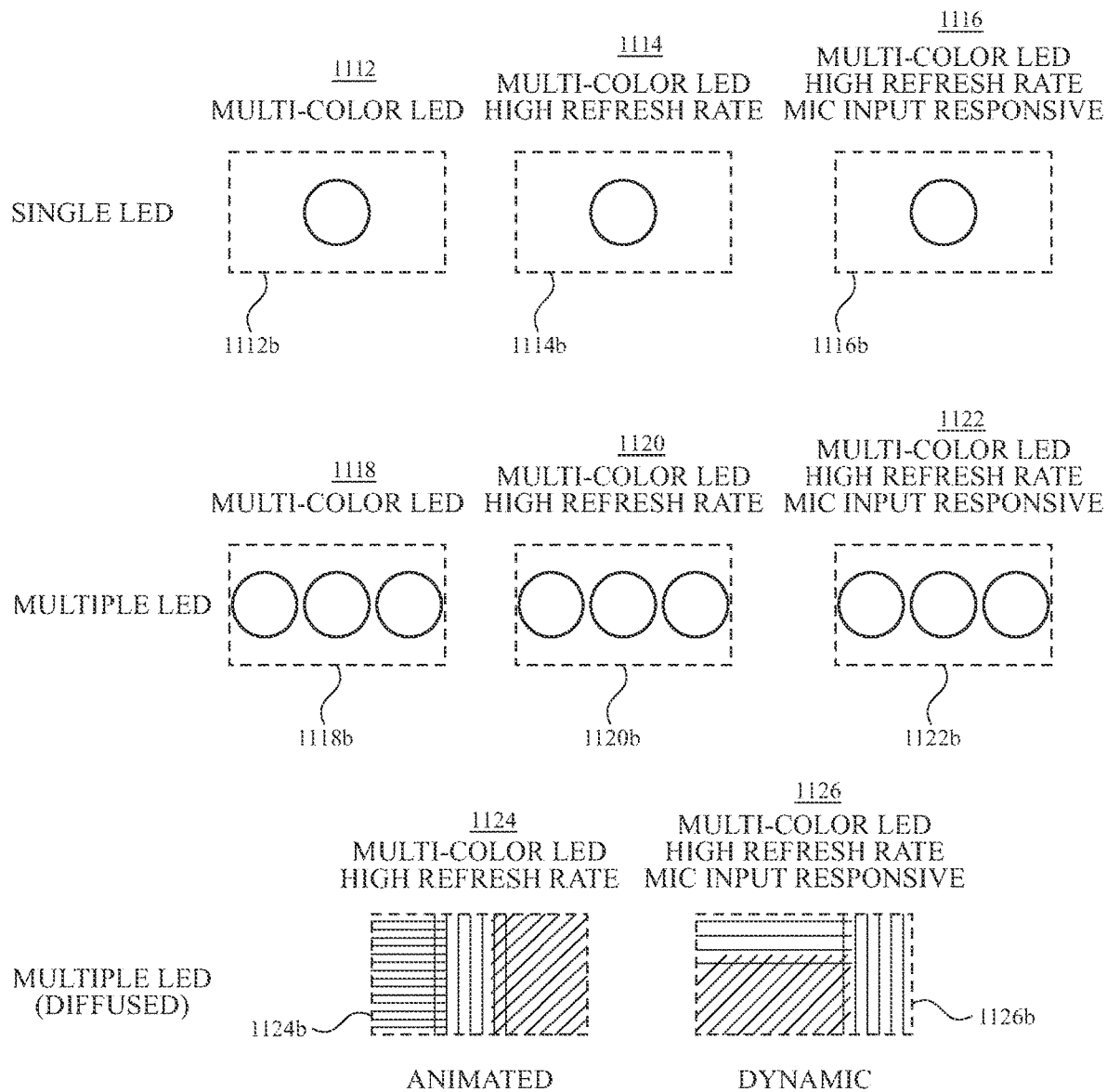
Figure 12:
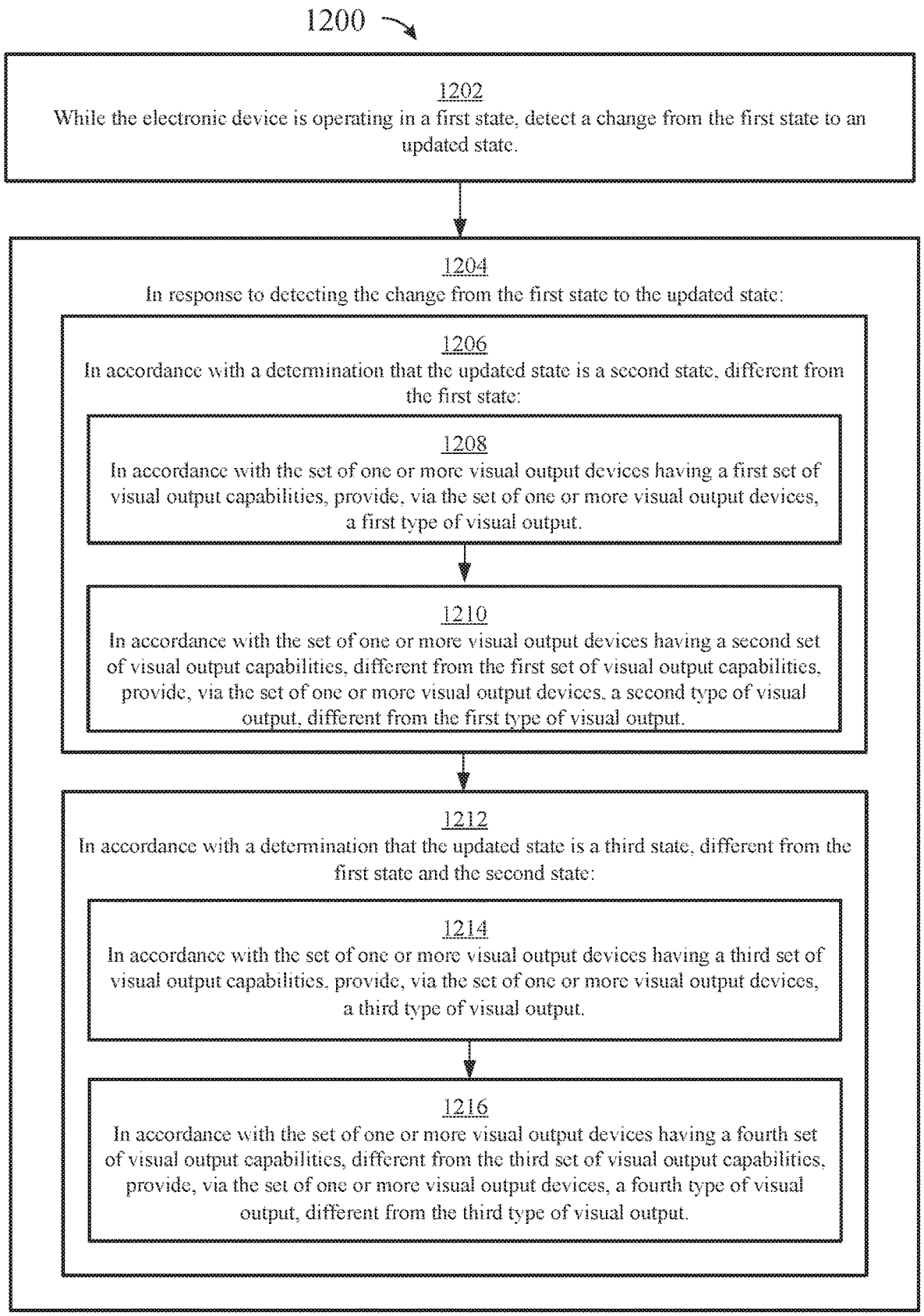
FIG. 12 is a flowchart illustrating an exemplary method for adapting visual outputs based on device capabilities, in accordance with some embodiments.

FIG. 11C, which is a later point in time than seen in FIG. 11B, shows the visual output of device 1100, based on the different possible visual output hardware configurations, to second part 1108b ("what is the weather") of phrase 1108, which is received while device 1100 continues to operate in the digital assistant listening state.

In the top row of FIG. 11C, LED configurations 1112, 1114, and 1116 are shown, with their matching visual outputs 1112b, 1114b, and 1116b, respectively, to second part 1108b. As seen in that top row, LED configuration 1112 provides output 1112b, which is the single LED being on and emitting white light. Configuration 1114 is providing output 1114b, which is also a single LED being on and emitting white light. Similarly, configuration 1116 is providing output 1116b, which, likewise, is a single LED being on and emitting white light. Thus, in the top row of FIG. 11C, all three of the differing single LED configurations provide the same output during a second phase of a digital assistant listening state.

In the middle row of FIG. 11C, LED configurations 1118, 1120, and 1122 are shown, with their matching visual outputs 1118b, 1120b, and 1122b, respectively, to second part 1108b. As seen in that middle row, LED configuration 1118 provides output 1118b, which is multiple LEDs being on and emitting white light. Configuration 1120 is providing output 1120b, which is also multiple LEDs being on and emitting white light. Similarly, configuration 1122 is providing output 1122b, which, likewise, multiple LEDs being on and emitting white light. Thus, in the middle row of FIG. 11C, all three of the differing multiple LED configurations provide the same output during a second phase of a digital assistant listening state.

In the bottom row of FIG. 11C, LED configurations 1124 and 1126 are shown, with their matching visual outputs 1124b and 1126b, respectively, to second part 1108b. As seen in that bottom row, LED configuration 1124 provides output 1124b, a third pattern of multi-colored lights that, together with output 1124a of FIG. 11B, form a predetermined, animated pattern of light output that LED configuration 1124 provides when in a digital assistant listening state. LED configuration 1126 provides output 1126b, a fourth pattern of multi-colored lights that is dynamically based on the microphone input ("what is the weather"). Because that input is different than the microphone input in FIG. 11B ("hey assistant", the fourth pattern of multi-colored lights is different than the second pattern of multi-colored lights of output 1126a. Thus, in the bottom row of FIG. 11C, the two differing diffused, multiple LED configurations are providing different multicolored outputs during a second phase of a digital assistant listening state.

Figure 11D:
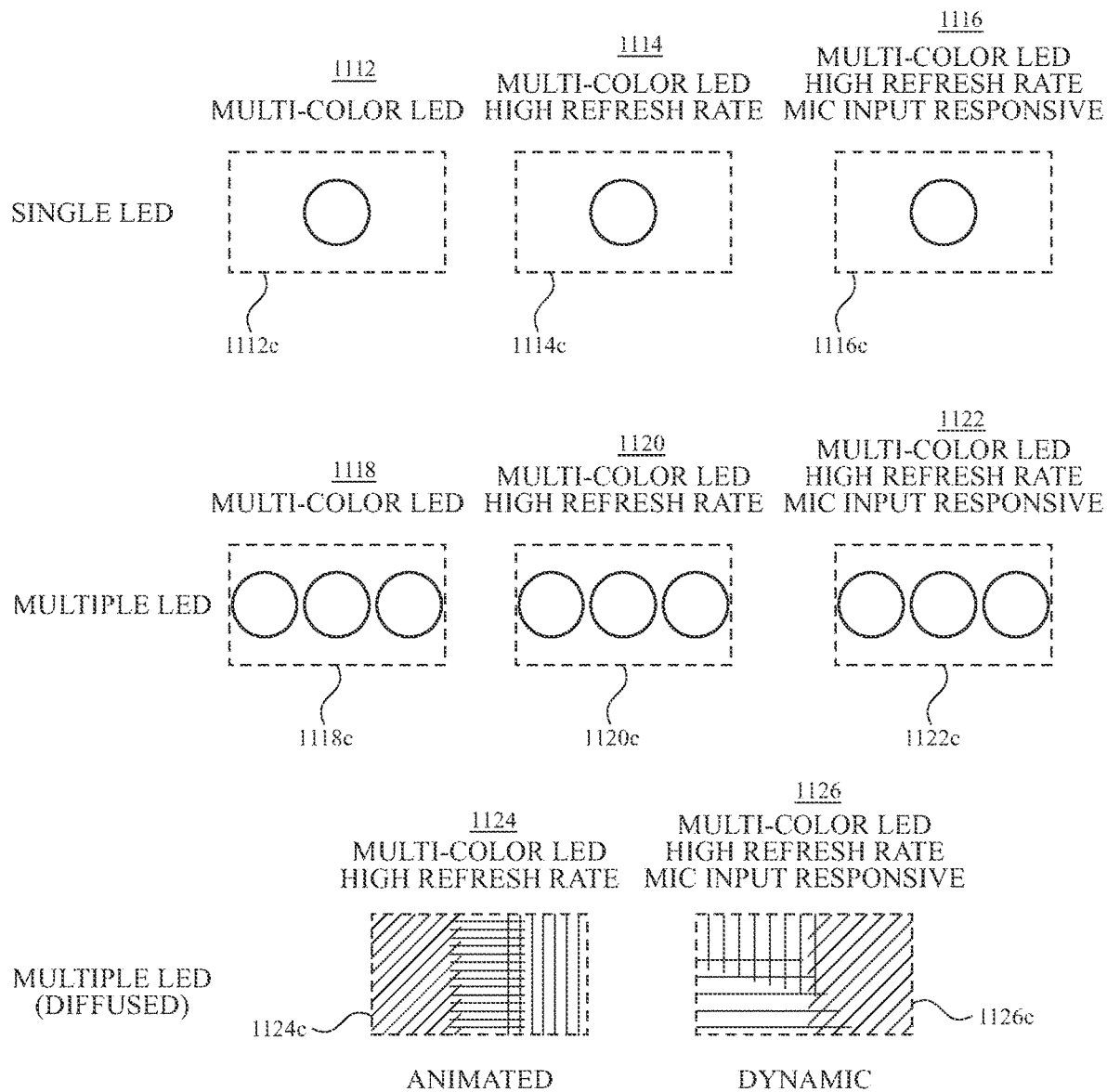

FIG. 11D, which is a later point in time than seen in FIG. 11C, shows the visual output of device 1100, based on the different possible visual output hardware configurations, while device 1100 provides audio output 1110c ("it's sunny, 75 degrees"), which is provided while device 1100 operates in a digital assistant responding state.

In the top row of FIG. 11D, LED configurations 1112, 1114, and 1116 are shown, with their matching visual outputs 1112c, 1114c, and 1116c, respectively, while device 1100 is providing audio output 1110. As seen in that top row, LED configuration 1112 provides output 1112c, which is the single LED being on and emitting white light. Configuration 1114 is providing output 1114c, which is also a single LED being on and emitting white light. Similarly, configuration 1116 is providing output 1116c, which, likewise, is a single LED being on and emitting white light. Thus, in the top row of FIG. 11C, all three of the differing single LED configurations provide the same visual output while device 1100 provides audio output 1110 while operating in a digital assistant responding state.

In the middle row of FIG. 11D, LED configurations 1118, 1120, and 1122 are shown, with their matching visual output responses 1118c, 1120c, and 1122c, respectively, while device 1100 is providing audio output 1110. As seen in that middle row, LED configuration 1118 provides output 1118c, which is multiple LEDs being on and emitting white light. Configuration 1120 is providing output 1120c, which is also multiple LEDs being on and emitting white light. Similarly, configuration 1122 is providing output 1122c, which, likewise, multiple LEDs being on and emitting white light. Thus, in the middle row of FIG. 11D, all three of the differing multiple LED configurations provide the same visual output while device 1100 provides audio output 1110 while operating in a digital assistant responding state.

In the bottom row of FIG. 11D, LED configurations 1124 and 1126 are shown, with their matching visual output responses 1124c and 1126c, respectively, while device 1100 is providing audio output 1110. As seen in that bottom row, LED configuration 1124 provides output 1124c, a fifth pattern of multi-colored lights that is part of a predetermined, animated pattern of light output that LED configuration 1124 provides when in a digital assistant responding state. LED configuration 1126 provides output 1126c, a sixth pattern of multi-colored lights that is dynamically based on the audio output ("it's sunny, 75 degrees"). Thus, in the bottom row of FIG. 11D, the two differing diffused, multiple LED configurations are providing different multicolored outputs during a digital assistant responding state.

Taken together, FIGS. 11A-11D show that device 1100 can output different visual outputs during different operating states of the device (e.g., a digital assistant listening state, a digital assistant responding state), depending on different possible visual output hardware configurations.

Figure 11E:
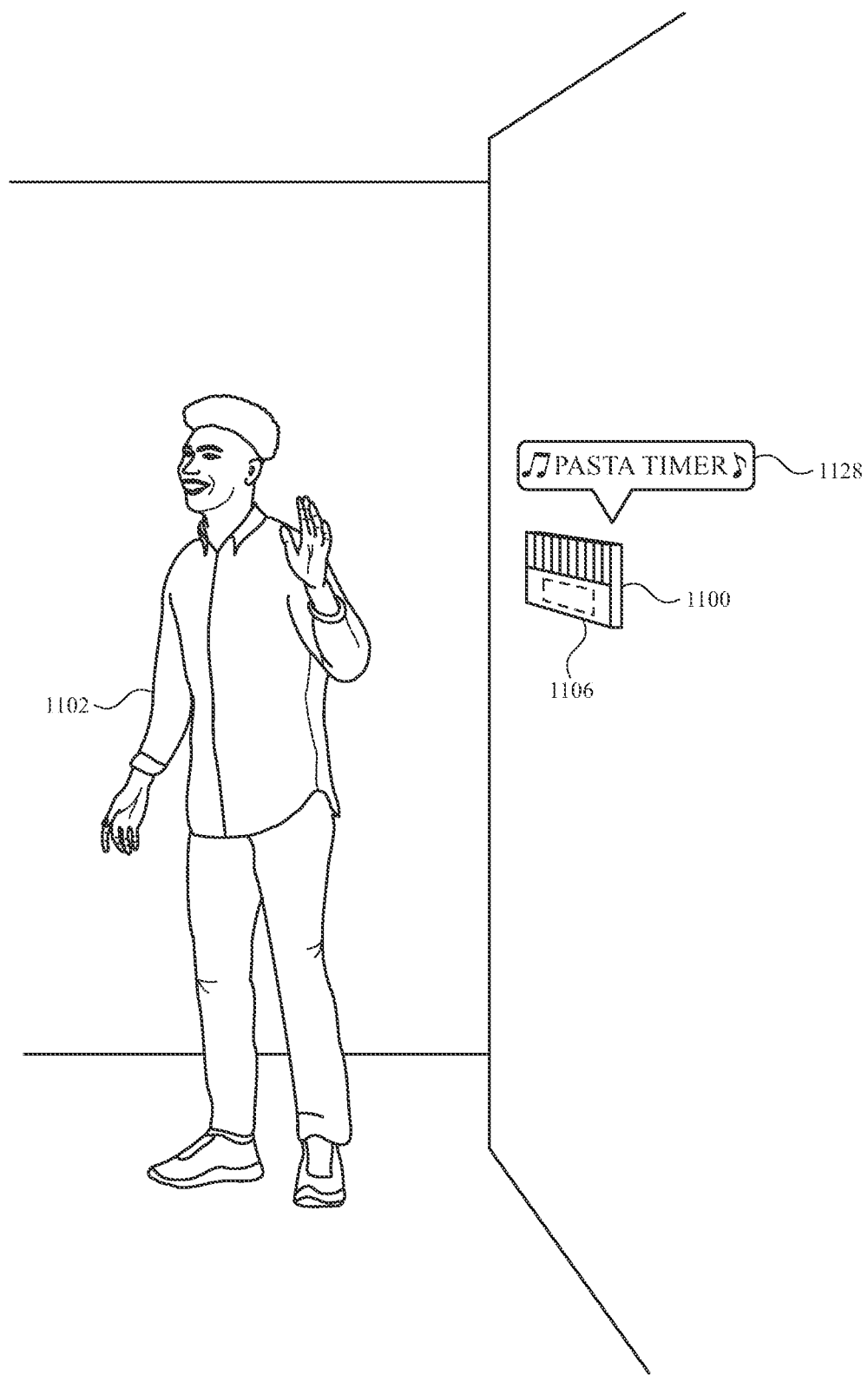

FIG. 11E depicts a different scenario with user 1102 and device 1100. In FIG. 11E, device 1100 has detected that timer previously set by user 1100 and named "pasta timer" has expired. In response to expiration of the timer, device 1100 outputs audio output 1128 (the phrase "pasta timer" with leading and trailing music). As in the scenario depicted in FIG. 11A, visual output device 1106 provides a visual output that is adapted based on the device's specific visual output capabilities.

Figure 11F:
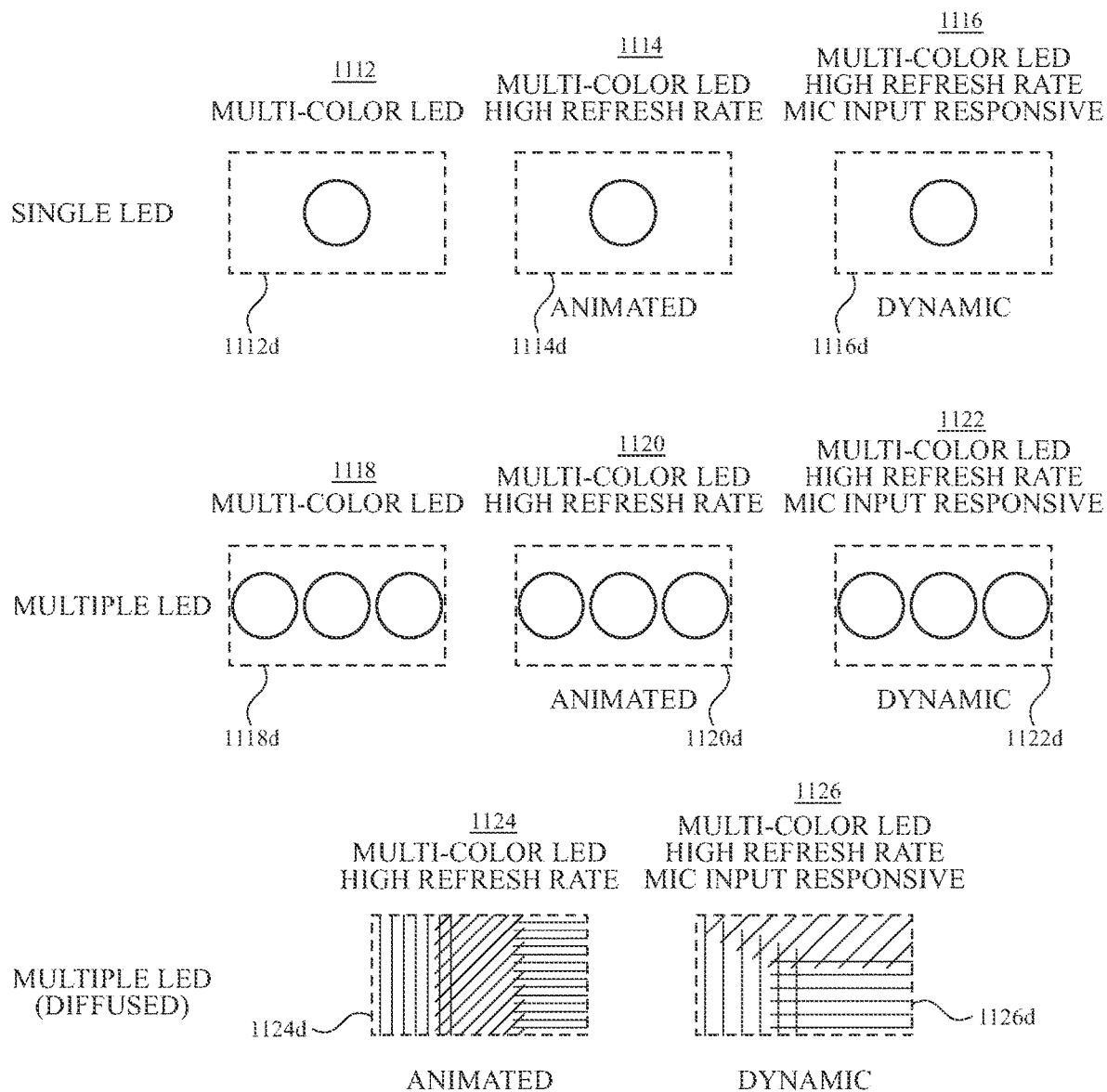

FIG. 11F shows the visual output of device 1100, based on a number of different possible visual output hardware configurations, to first output part 1128a (".", a first musical tone) of audio output 1128, which is outputted while device 1100 is operating in a digital assistant timer state.

In the top row of FIG. 11F, LED configurations 1112, 1114, and 1116 are shown, with their matching visual outputs 1112d, 1114d, and 1116d, respectively, while device 1100 provides first output part 1128a. As seen in that top row, LED configuration 1112 provides output 1112d, which is the single LED being on and emitting white light. Configuration 1114 is providing output 1114d, which is also a single LED being on and emitting white light. Similarly, configuration 1116 is providing output 1116d, which, likewise, is a single LED being on and emitting white light. Thus, in the top row of FIG. 11F, all three of the differing single LED configurations provide the same visual output during a first phase of an audio output while device 1100 is in a digital assistant timer state.

In the middle row of FIG. 11F, LED configurations 1118, 1120, and 1122 are shown, with their matching visual output responses 1118d, 1120d, and 1122d, respectively, while device 1100 provides first output part 1128a. As seen in that middle row, LED configuration 1118 provides output 1118d, which is multiple LEDs being on and emitting white light. Configuration 1120 is providing output 1120d, which is also multiple LEDs being on and emitting white light. Similarly, configuration 1122 is providing output 1122d, which, likewise, multiple LEDs being on and emitting white light. Thus, in the middle row of FIG. 11F, all three of the differing multiple LED configurations provide the same visual output during a first phase of an audio output while device 1100 is in a digital assistant timer state.

In the bottom row of FIG. 11F, LED configurations 1124 and 1126 are shown, with their matching visual output responses 1124d and 1126d, respectively, while device 1100 provides first output part 1128a. As seen in that bottom row, LED configuration 1124 provides output 1124d, a seventh pattern of multi-colored lights that is part of a predetermined, animated pattern of light output that LED configuration 1124 provides when outputting audio in a digital assistant timer state. LED configuration 1126 provides output 1126d, an eighth pattern of multi-colored lights that is dynamically based on the audio output (".", a first musical tone). Thus, in the bottom row of FIG. 11F, the two differing diffused, multiple LED configurations are providing different multicolored outputs while outputting audio during a digital timer responding state.

Figure 11G:
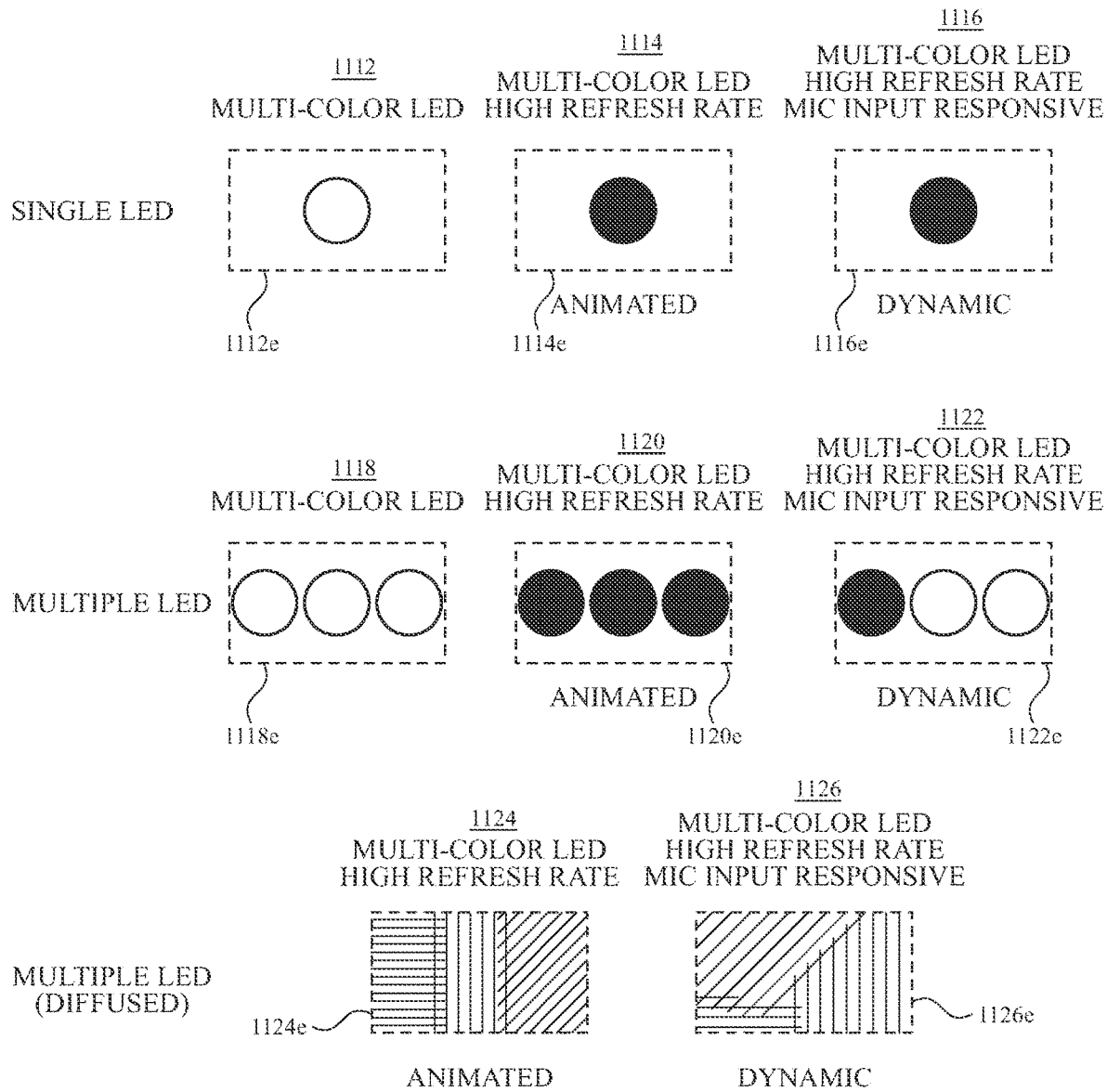

FIG. 11G, which is a later point in time than FIG. 11F, shows the visual output of device 1100, based on a number of different possible visual output hardware configurations, to second output part 1128b ("pasta timer") of audio output 1128, which is outputted while device 1100 is operating in a digital assistant timer state.

In the top row of FIG. 11G, LED configurations 1112, 1114, and 1116 are shown, with their matching visual outputs 1112e, 1114e, and 1116e, respectively, while device 1100 provides second output part 1128b. As seen in that top row, LED configuration 1112 provides output 1112e, which is the single LED being on and emitting white light. Configuration 1114 is providing output 1114e, which is a single LED being off (in contrast to FIG. 11F). Similarly, configuration 1116 is providing output 1116e, which, likewise, is a single LED being off (in contrast to FIG. 11F). Thus, in the top row of FIG. 11F, LED configuration 1112, which is an LED with a refresh rate below a threshold level (e.g., 10 Hz, 15 Hz, 30 Hz, 60 Hz), does not blink on and then off, because of its low refresh rate. In contrast, LED configurations 1114 and 1116, which have refresh rates above a threshold level (e.g., 10 Hz, 15 Hz, 30 Hz, 60 Hz), blink on and then off, while device 1100 is outputting audio and in a digital assistant timer state.

In the middle row of FIG. 11G, LED configurations 1112, 1114, and 1116 are shown, with their matching visual output responses 1112e, 1114e, and 1116e, respectively, while device 1100 provides second output part 1128b. As seen in the middle row, LED configuration 1118 provides output 1118e, which is multiple LEDs being on and emitting white light. Configuration 1120 is providing output 1120e, which is multiple LEDs being off, after being on FIG. 11F. Configuration 1122 is providing output 1122e, which is a mix of LEDs being off and LEDs being on and emitting white light, a pattern that is based on second output part 1128b because the LEDs of LED configuration 1122 can be dynamically responsive to audio output. Thus, in the middle row of FIG. 11G, LED configuration 1118, which includes LEDs with refresh rates below a threshold level (e.g., 10 Hz, 15 Hz, 30 Hz, 60 Hz), do not blink on and then off, because of their low refresh rate. In contrast, LED configurations 1120 and 1122, which have refresh rates above a threshold level (e.g., 10 Hz, 15 Hz, 30 Hz, 60 Hz), blink on and then off, while device 1100 is outputting audio and in a digital assistant timer state. The patterns of blinking are different as between LED configuration 1120 and LED configuration 1122, because LED configuration 1122 can dynamically vary with audio output while LED configuration 1120 does not. Instead, LED configuration 1120 blinks in accordance with a predetermined animation pattern.

In the bottom row of FIG. 11G, LED configurations 1124 and 1126 are shown, with their matching visual output responses 1124e and 1126e, respectively, while device 1100 provides second output part 1128b. As seen in that bottom row, LED configuration 1124 provides output 1124e, a ninth pattern of multi-colored lights that is part of a predetermined, animated pattern of light output that LED configuration 1124 provides when outputting audio in a digital assistant timer state. LED configuration 1126 provides output 1126e, a tenth pattern of multi-colored lights that is dynamically based on the audio output ("pasta timer"). Thus, in the bottom row of FIG. 11G, the two differing diffused, multiple LED configurations are providing different multicolored outputs while outputting audio during a digital timer responding state.

Figure 11H:
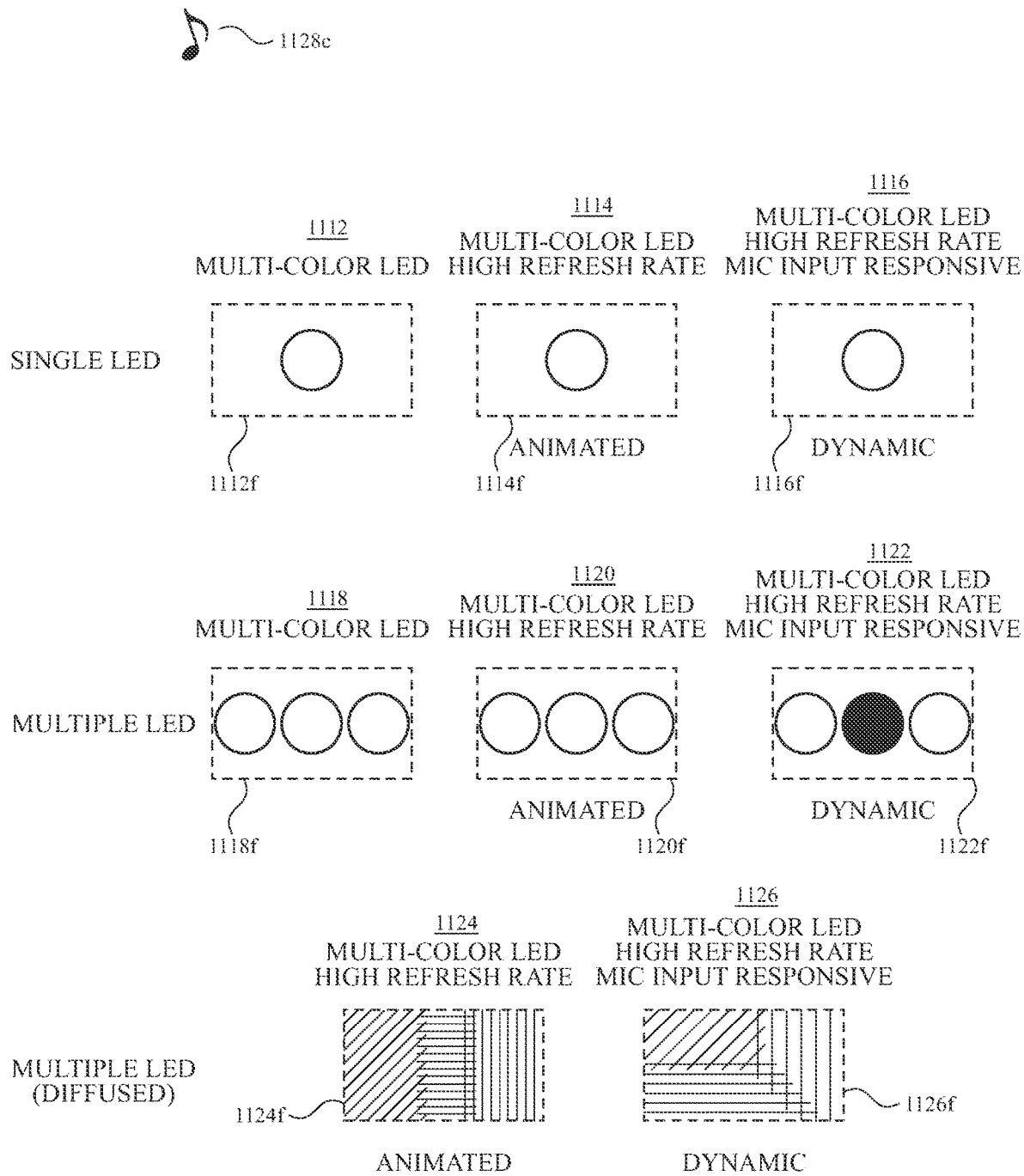

FIG. 11H, which is a later point in time than FIG. 11G, shows the visual output of device 1100, based on a number of different possible visual output hardware configurations, to third output part 1128c ("♪", a trailing musical note) of audio output 1128, which is outputted while device 1100 is operating in a digital assistant timer state.

In the top row of FIG. 11H, LED configurations 1112, 1114, and 1116 are shown, with their matching visual outputs 1112f, 1114f, and 1116f, respectively, while device 1100 provides first output part 1128c. As seen in that top row, LED configuration 1112 provides output 1112f, which is the single LED being on and emitting white light. Configuration 1114 is providing output 1114f, which is also a single LED being on and emitting white light. Similarly, configuration 1116 is providing output 1116f, which, likewise, is a single LED being on and emitting white light. Thus, in the top row of FIG. 11F, all three of the differing single LED configurations provide the same visual output during a third phase of an audio output while device 1100 is in a digital assistant timer state.

In the middle row of FIG. 11H, LED configurations 1118, 1120, and 1122 are shown, with their matching visual output responses 1118f, 1120f, and 1122f, respectively, while device 1100 provides third output part 1128c. As seen in that middle row, LED configuration 1118 provides output 1118f, which is multiple LEDs being on and emitting white light. Configuration 1120 is providing output 1120f, which is also multiple LEDs being on and emitting white light. Configuration 1122 is providing output 1122f, which is a mix of LEDs being off and LEDs being on and emitting white light, a pattern that is based on third output part 1128c because the LEDs of LED configuration 1122 can be dynamically responsive to audio output. Thus, in the middle row of FIG. 11F, two of the three differing multiple LED configurations provide the same visual output during a third phase of an audio output while device 1100 is in a digital assistant timer state, while the third LED configuration, LED configuration 1126, provides a different visual output.

In the bottom row of FIG. 11H, LED configurations 1124 and 1126 are shown, with their matching visual output responses 1124f and 1126f, respectively, while device 1100 provides third output part 1128c. As seen in that bottom row, LED configuration 1124 provides output 1124f, an eleventh pattern of multi-colored lights that is part of a predetermined, animated pattern (e.g., when taken together with the visual output of LED configuration 1124 in FIGS. 11F and 11G) of light output that LED configuration 1124 provides when outputting audio in a digital assistant timer state. LED configuration 1126 provides output 1126f, a twelfth pattern of multi-colored lights that is dynamically based on the audio output ("♪", a trailing musical note). Thus, in the bottom row of FIG. 11H, the two differing diffused, multiple LED configurations are providing different multicolored outputs while outputting audio during a digital timer responding state.

Taken together, FIGS. 11F-11H show that device 1100 can output different visual outputs during a digital assistant timer state, depending on different possible visual output hardware configurations.

FIG. 11I is a table 1128 that illustrates visual outputs for different combinations of visual output hardware and device state, including those shown in FIGS. 11A-11H, as well as other combinations. For example, columns 1130a-1130h correspond to LED configurations 1112, 1114, 1116, 1118, 1120, 1122, 1124, and 1126, respectively. Row 1132a corresponds to the digital assistant listening state shown in FIGS. 11B and 11C. Row 1132b corresponds to the digital assistant responding state shown in FIG. 11D. Row 1132c corresponds to the digital assistant timer state shown in FIGS. 11F-11G. Thus, FIG. 11I provides exemplary visual outputs that can be provided depending on various combinations of device state and device visual output configuration.

FIG. 12 is a flow diagram illustrating a method for adapting visual outputs based on device capabilities, using an electronic device in accordance with some embodiments. Method 1200 is performed at an electronic device (e.g., 100, 300, 500) that includes a set of one or more visual output devices. Some operations in method 1200 are, optionally, combined, the orders of some operations are, optionally, changed, and some operations are, optionally, omitted.

In some embodiments, the electronic device (e.g., 600) is a computer system. The computer system is optionally in communication (e.g., wired communication, wireless communication) with a display generation component (e.g., 1106) and with one or more input devices (e.g., 1104). The display generation component is configured to provide visual output, such as display via a CRT display, display via an LED display, or display via image projection. In some embodiments, the display generation component is integrated with the computer system. In some embodiments, the display generation component is separate from the computer system. The one or more input devices are configured to receive input, such as a touch-sensitive surface receiving user input. In some embodiments, the one or more input devices are integrated with the computer system. In some embodiments, the one or more input devices are separate from the computer system. Thus, the computer system can transmit, via a wired or wireless connection, data (e.g., image data or video data) to an integrated or external display generation component to visually produce the content (e.g., using a display device) and can receive, a wired or wireless connection, input from the one or more input devices.

As described below, method 1200 provides an intuitive way for adapting visual outputs based on device capabilities. The method reduces the cognitive burden on a user for adapting visual outputs based on device capabilities, thereby creating a more efficient human-machine interface. For battery-operated computing devices, enabling a user to adapt visual outputs based on device capabilities faster and more efficiently conserves power and increases the time between battery charges.

In some embodiments, an electronic device (e.g., 600, a computer system (a tablet computer, a personal computer, a smart phone, a smart speaker, a smart thermostat)) includes a set of one or more visual output devices (e.g., 1106) (e.g., a display screen; one or more LEDs (e.g., multi-color LED(s); LED(s) having a refresh rate that exceeds a threshold value (e.g., 10 Hz, 30 Hz, 60 Hz, 100 Hz, 200 Hz); LED(s) that are responsive to audio input received at the electronic device; and/or LEDs that are coupled with an optical diffusion element (e.g., a diffuser; a translucent and/or semi-transparent screen that alters the optical properties of light emitted by the LED(s))). In some embodiments, the electronic device includes one or more input devices (e.g., a hardware button; a touch-sensitive surface; a microphone; and/or a camera). In some embodiments, the electronic device is configured to provide a digital assistant functionality (e.g., a digital assistant that is partially or completely installed on the electronic device; a digital assistant is completely or partially server-based)). While the electronic device is operating in a first state (e.g., a digital assistant idle state) (e.g., an inactive state; a standby state; a state in which the device is performing a first operation (e.g., monitoring for inputs (e.g., listening for audio input)), the electronic device detects (1202) a change from the first state to an updated state (e.g., an active state).

In response to detecting (1204) the change from the first state to the updated state and in accordance with a determination (1206) that the updated state is a second state (e.g., a digital assistant listening state as seen in FIGS. 11B-11C) (a state in which the device performs a second operation (e.g., outputting audio; providing the digital assistant to a user; processing a received request; providing a timer- or alarm-based output; providing a telephone function; providing an intercom function)), different from the first state, and in accordance with the set of one or more visual output devices having a first set of visual output capabilities (e.g., the capabilities of LED configuration 1112) (e.g., capabilities depending on the hardware configuration of the set of one or more visual output devices), the electronic device provides (1208), via the set of one or more visual output devices, a first type of visual output (e.g., 1112a) (e.g., a first pattern of visual outputs (e.g., a constant, single color output; a multi-color output; an animated output (e.g., an output that varies according to a predetermined pattern); a dynamic output responsive to ongoing input (e.g., ongoing audio input))).

In accordance with the set of one or more visual output devices having a second set of visual output capabilities (e.g., the capabilities of LED configuration 1126), different from the first set of visual output capabilities, the electronic device provides (1210), via the set of one or more visual output devices, a second type of visual output (e.g., 1126a) (e.g., a first pattern of visual outputs (e.g., a constant, single color output; a multi-color output; an animated output (e.g., an output that varies according to a predetermined pattern); a dynamic output responsive to ongoing input (e.g., ongoing audio input)), different from the first type of visual output. In some embodiments, the sets of visual output capabilities are nested such that a set of one or more visual output devices that has the second set of visual output capabilities can provide the type(s) of visual output(s) that a set of one or more visual output devices that has the first set of visual output capabilities can provide, as well as additional type(s) of visual output(s) that cannot be provided by the set of one or more visual output devices that has the first set of visual output capabilities. In some embodiments, the first and second set of visual output capabilities are mutually exclusive (e.g., devices having the first set of visual output capabilities are configured to a provide a first type of output that devices having the second set of visual output capabilities cannot provide, and vice versa).

In accordance with a determination (1212) that the updated state is a third state (e.g., a digital assistant timer state as seen in FIGS. 11E-11H) (a state in which the device performs a second operation (e.g., outputting audio; providing the digital assistant to a user; processing a received request; providing a timer- or alarm-based output; providing a telephone function; providing an intercom function)), different from the first state and the second state, and in accordance with the set of one or more visual output devices having a third set of visual output capabilities (e.g., the capabilities of LED configuration 1112) (e.g., capabilities depending on the hardware configuration of the set of one or more visual output devices), the electronic device provides (1214), via the set of one or more visual output devices, a third type of visual output (e.g., 1112d) (e.g., a first pattern of visual outputs (e.g., a constant, single color output; a multi-color output; an animated output (e.g., an output that varies according to a predetermined pattern); a dynamic output responsive to ongoing input (e.g., ongoing audio input)). In some embodiments, the third set of visual output capabilities is the same as the first set of visual output capabilities. In some embodiments, the third set of visual output capabilities is different than first and second sets of visual output capabilities. In some embodiments, the third type of visual output is different from the first and the second types of visual output.

In accordance with the set of one or more visual output devices having a fourth set of visual output capabilities (e.g., the capabilities of LED configuration 1126), different from the third set of visual output capabilities, the electronic device provides (1216), via the set of one or more visual output devices, a fourth type of visual output (e.g., 1126d) (e.g., a first pattern of visual outputs (e.g., a constant, single color output; a multi-color output; an animated output (e.g., an output that varies according to a predetermined pattern); a dynamic output responsive to ongoing input (e.g., ongoing audio input)), different from the third type of visual output. In some embodiments, the fourth type of visual output is different from the first and the second types of visual output. In some embodiments, the sets of visual output capabilities are nested such that a set of one or more visual output devices that has the fourth set of visual output capabilities can provide the type(s) of visual output(s) that a set of one or more visual output devices that has the third set of visual output capabilities can provide, as well as additional type(s) of visual output(s) that cannot be provided by the set of one or more visual output devices that has the third set of visual output capabilities. In some embodiments, the third and fourth set of visual output capabilities are mutually exclusive (e.g., devices having the third set of visual output capabilities are configured to a provide a first type of output that devices having the fourth set of visual output capabilities cannot provide, and vice versa). In some embodiments, the fourth set of visual output capabilities is the same as the second set of visual output capabilities. In some embodiments, the fourth set of visual output capabilities is different than first, second, and third sets of visual output capabilities. Outputting different types of visual output based on a change in state and the visual output capabilities of the set of one or more visual devices provides the user with feedback as to the current state of the electronic device and the output capabilities of the device, which provides improved visual feedback.

In some embodiments, the one or more visual output devices have the first set of visual output capabilities when the one or more visual output devices are capable of providing a first type of visual output (e.g., the capability to provide output 1112a) (e.g., a visual output that is provided at a first refresh rate or that has a first visual characteristic (e.g., first color or light diffusion pattern)). In some embodiments, the one or more visual output devices have the second set of visual output capabilities when the one or more visual output devices are capable of providing a second type of visual output, different than the first type of visual output (e.g., the capability to provide output 1126a) (e.g., a visual output that is provided at a second refresh rate that is higher than the first refresh rate or that has a second visual characteristic (e.g., second color or light diffusion pattern)). In some embodiments, the first set, second, third, and fourth sets of visual output capabilities are sets of hardware visual output capabilities (e.g., whether the one or more visual output devices have the first, second, third, and/or fourth sets of visual output capabilities is based on the hardware capabilities of the one or more visual output devices to output). Outputting different types of visual output based on the types of visual outputs that the set of one or more visual devices provides the user with feedback as to the current state of the electronic device and the output capabilities of the device, which provides improved visual feedback.

In some embodiments, the first set of visual output capabilities include the one or more visual output devices being capable of providing visual output (dynamic visual output that modulates based on received audio) that is responsive (e.g., reactive; variable based on) to audio input that is detected by one or more microphones that are in communication with the electronic device (e.g., 1126a). In some embodiments, the second set of visual output capabilities do not include the one or more visual output devices being capable of providing visual output that is responsive to audio input that is detected by one or more microphones that are in communication with the electronic device (e.g., 1112a) (e.g., the second set of visual output capabilities do not require being capable of providing dynamic visual output that modulates based on received audio). In some embodiments, both the first set of visual output capabilities and the second set of visual output capabilities require that the one or more visual output devices are capable of providing a third type of visual output (e.g., a high refresh, multicolored visual output).

In some embodiments, the second state includes the electronic device being in a first digital assistant activity state (e.g., the state of FIGS. 11B-11C) (e.g., a state in which the digital assistant is processing a request). In some embodiments, the third state includes the electronic device being in a second digital assistant activity state (e.g., the state of FIGS. 11E-11H), different from the first digital assistant activity state (e.g., a state in which the digital assistant is monitoring/listening for a request; state in which the digital assistant is providing an output (e.g., an audio output) in response to a request). Outputting different types of visual output based on the current digital assistant state of the device provides the user with feedback as to the current digital assistant state of the electronic device, which provides improved visual feedback.

In some embodiments, the first digital assistant activity state (in some embodiments, and the second digital assistant activity state) is selected from the group consisting of: an idle digital assistant state, a listening digital assistant state (e.g., FIG. 11B), a request-processing digital assistant state, a responding digital assistant state (e.g., FIG. 11D).

In some embodiments, the second state includes the electronic device being in a first audio playback state (e.g., FIG. 11D) (e.g., a state in which electronic device is outputting a first type of media). In some embodiments, the third state includes the electronic device being in a second audio playback state (e.g., FIG. 11G), different from the first media playback state (e.g., a state in which the electronic device is outputting a second type of media). Outputting different types of visual output based on the current audio playback state of the device provides the user with feedback as to the current audio playback state of the electronic device, which provides improved visual feedback.

In some embodiments, the first audio playback state (in some embodiments, and the second audio playback state) is selected from the group consisting of: a state in which the electronic device is outputting an audio alarm notification, a state in which the electronic device is outputting an audio timer notification (e.g., FIG. 11E), a state in which the electronic device is outputting audio from an inter-device communication (e.g., an intercom communication; a telephone call), and a state in which the electronic device is outputting audio media (e.g., music; audiobook content; podcasts).

In some embodiments, the first type of visual output is a predetermined output (e.g., 1124a) (e.g., an output having predetermined visual properties (e.g., colors, output pattern)). In some embodiments, the second type of visual output is a dynamic visual output (e.g., 1126a) based on one or more dynamic variables (e.g., contextual information (e.g., current ambient audio; a current time); input currently being received by one or more sensors of the electronic device; a visual input that varies between different output instances based on the one or more non-predetermined variables). Outputting visual outputs that are predetermined or dynamic based on a change in state and the visual output capabilities of the set of one or more visual devices provides the user with feedback as to the current state of the electronic device and the output capabilities of the device, which provides improved visual feedback.

In some embodiments, the first type of visual output includes one or more visual characteristics (e.g., as in 1126a) (e.g., color, output pattern) that vary based on audio input (e.g., concurrent audio input) that is detected by one or more microphones that are in communication with the electronic device. In some embodiments, the second type of visual output (e.g., 1124a) does not vary based on audio input that is detected by one or more microphones that are in communication with the electronic device. Outputting visual outputs that have different responses to microphone input based on a change in state and the visual output capabilities of the set of one or more visual devices provides the user with feedback as to the current state of the electronic device and the output capabilities of the device, which provides improved visual feedback.

In some embodiments, the updated state includes the electronic device outputting a first audio output (e.g., 1110c). In some embodiments, the first type of visual output (e.g., 1126c) includes one or more visual characteristics (e.g., color, output pattern) that vary based on the first audio output (e.g., a concurrent audio output). In some embodiments, the second type of visual output (e.g., 1124c) does not vary based on the first audio output. Outputting visual outputs that have different responses to audio output based on a change in state and the visual output capabilities of the set of one or more visual devices provides the user with feedback as to the current state of the electronic device and the output capabilities of the device, which provides improved visual feedback.

In some embodiments, the first type of visual output (e.g., 1126a) includes a first output color pattern. In some embodiments, the second type of visual output includes a second output (e.g., 1124a) color pattern, different from the first output color pattern. Outputting visual outputs that have different color patterns based on a change in state and the visual output capabilities of the set of one or more visual devices provides the user with feedback as to the current state of the electronic device and the output capabilities of the device, which provides improved visual feedback.

Note that details of the processes described above with respect to method 1200 (e.g., FIG. 12) are also applicable in an analogous manner to the methods described herein. For example, methods 800 and 1000 optionally include one or more of the characteristics of the various methods described above with reference to method 1200. For example, a device configured according to method 800 can adapt its visual outputs based on device capabilities and a state of the device. For brevity, these details are not repeated above.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the techniques and their practical applications. Others skilled in the art are thereby enabled to best utilize the techniques and various embodiments with various modifications as are suited to the particular use contemplated.

Although the disclosure and examples have been fully described with reference to the accompanying drawings, it is to be noted that various changes and modifications will become apparent to those skilled in the art. Such changes and modifications are to be understood as being included within the scope of the disclosure and examples as defined by the claims.

As described above, one aspect of the present technology is the gathering and use of data available from various sources to improve managing dynamically-available media playback. The present disclosure contemplates that in some instances, this gathered data may include personal information data that uniquely identifies or can be used to contact or locate a specific person. Such personal information data can include demographic data, location-based data, telephone numbers, email addresses, twitter IDs, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used to deliver targeted music content that is of greater interest to the user. Accordingly, use of such personal information data enables users to have calculated control of the delivered content. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of streaming music services, the present technology can be configured to allow users to select to "opt in" or "opt out" of participation in the collection of personal information data during registration for services or anytime thereafter. In another example, users can select not to provide music-associated data for targeted content delivery services. In yet another example, users can select to limit the length of time music-associated data is maintained or entirely prohibit the development of a baseline music profile. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, music content can be selected and delivered to users by inferring preferences based on non-personal information data or a bare minimum amount of personal information, such as the content being requested by the device associated with a user, other non-personal information available to the music delivery services, or publicly available information.

What is claimed is:

1. A computer system configured to communicate with a plurality of external electronic devices, including a first external electronic device, the computer system comprising:
   one or more processors; and
   memory storing one or more programs configured to be executed by the one or more processors, the one or more programs including instructions for:
      receiving a first request to perform a first media playback operation using one or more of the plurality of external electronic devices; and
      in response to the first request:
         in accordance with a determination that the first request is a request to perform the first media playback operation at a set of two or more of the plurality of external electronic devices and a determination that the first request does not designate a specific device to perform the first media playback operation, wherein the set of two or more of the plurality of external electronic devices includes the first external electronic device:
            in accordance with a determination that the first external electronic device satisfies a first set of criteria, causing the first external electronic device to perform the first media playback operation; and
            in accordance with a determination that the first external electronic device does not satisfy the first set of criteria, forgo causing the first external electronic device to perform the first media playback operation; and
         in accordance with a determination that the first request designates at least the first external electronic device to perform the first media playback operation, causing the first external electronic device to perform the first media playback operation.

2. The computer system of claim 1, wherein the first external electronic device does not satisfy the first set of criteria when the first external electronic device is associated with a first location that is also associated with a second external electronic device of a first type.

3. The computer system of claim 1, wherein the first set of criteria includes a first criterion that is not satisfied when the first external electronic device is a device of a second type.

4. The computer system of claim 3, wherein the first criterion is a user-selectable criterion that can be disabled via user selection.

5. The computer system of claim 1, wherein the set of two or more of the plurality of external electronic devices includes a third external electronic device, the one or more programs including instructions for:
   in response to the first request and in accordance with the determination that the first request is a request to perform the first media playback operation at the set of two or more of the plurality of external electronic devices and the determination that the first request does not designate the specific external electronic device to perform the first media playback operation, causing the third external electronic device to perform the first media playback operation.

6. The computer system of claim 5, wherein:
   the first external electronic device does not satisfy the first set of criteria;
   the first external electronic device is a device of a third type; and
   the third external electronic device is a device of a fourth type, different than the third type.

7. The computer system of claim 6, wherein a device of the third type and a device of the fourth type have different hardware configurations.

8. The computer system of claim 1, wherein:
   the first request is a request to perform the first media playback operation at the set of two or more of the plurality of external electronic devices and the first request does not designate the specific external electronic device to perform the first media playback operation;
   the first external electronic device satisfies the first set of criteria; and
   the first external electronic device is caused to perform the first media playback operation.

9. The computer system of claim 1, wherein the first set of criteria is satisfied when the first external electronic device is a device of a fifth type.

10. The computer system of claim 9, wherein:
    the first external electronic device is associated with a second location; and
    the first set of criteria is satisfied when the first external electronic device is a device of the fifth type regardless of whether the second location is associated with one or more other external electronic devices of the plurality of external electronic devices.

11. A non-transitory computer-readable storage medium storing one or more programs configured to be executed by one or more processors of a computer system configured to communicate with a plurality of external electronic devices, including a first external electronic device, the one or more programs including instructions for:
    receiving a first request to perform a first media playback operation using one or more of the plurality of external electronic devices; and
    in response to the first request:
       in accordance with a determination that the first request is a request to perform the first media playback operation at a set of two or more of the plurality of external electronic devices and a determination that the first request does not designate a specific external electronic device to perform the first media playback operation, wherein the set of two or more of the plurality of external electronic devices includes the first external electronic device:
  in accordance with a determination that the first external electronic device satisfies a first set of criteria, causing the first external electronic device to perform the first media playback operation; and
  in accordance with a determination that the first external electronic device does not satisfy the first set of criteria, forgo causing the first external electronic device to perform the first media playback operation; and
  in accordance with a determination that the first request designates at least the first external electronic device to perform the first media playback operation, causing the first external electronic device to perform the first media playback operation.

12. The non-transitory computer-readable storage medium of claim 11, wherein the first external electronic device does not satisfy the first set of criteria when the first external electronic device is associated with a first location that is also associated with a second external electronic device of a first type.

13. The non-transitory computer-readable storage medium of claim 11, wherein the first set of criteria includes a first criterion that is not satisfied when the first external electronic device is a device of a second type.

14. The non-transitory computer-readable storage medium of claim 13, wherein the first criterion is a user-selectable criterion that can be disabled via user selection.

15. The non-transitory computer-readable storage medium of claim 11, wherein the set of two or more of the plurality of external electronic devices includes a third external electronic device, the one or more programs including instructions for:
  in response to the first request and in accordance with the determination that the first request is a request to perform the first media playback operation at the set of two or more of the plurality of external electronic devices and the determination that the first request does not designate a specific external electronic device to perform the first media playback operation, causing the third external electronic device to perform the first media playback operation.

16. The non-transitory computer-readable storage medium of claim 15, wherein:
  the first external electronic device does not satisfy the first set of criteria;
  the first external electronic device is a device of a third type; and
  the third external electronic device is a device of a fourth type, different than the third type.

17. The non-transitory computer-readable storage medium of claim 16, wherein a device of the third type and a device of the fourth type have different hardware configurations.

18. The non-transitory computer-readable storage medium of claim 11, wherein:
  the first request is a request to perform the first media playback operation at the set of two or more of the plurality of external electronic devices and the first request does not designate the specific external electronic device to perform the first media playback operation;
  the first external electronic device satisfies the first set of criteria; and
  the first external electronic device is caused to perform the first media playback operation.

19. The non-transitory computer-readable storage medium of claim 11, wherein the first set of criteria is satisfied when the first external electronic device is a device of a fifth type.

20. The non-transitory computer-readable storage medium of claim 19, wherein:
  the first external electronic device is associated with a second location; and
  the first set of criteria is satisfied when the first external electronic device is a device of the fifth type regardless of whether the second location is associated with one or more other external electronic devices of the plurality of external electronic devices.

21. A method comprising:
  at a computer system configured to communicate with a plurality of external electronic devices, including a first external electronic device:
    receiving a first request to perform a first media playback operation using one or more of the plurality of external electronic devices; and
    in response to the first request:
      in accordance with a determination that the first request is a request to perform the first media playback operation at a set of two or more of the plurality of external electronic devices and a determination that the first request does not designate a specific device to perform the first media playback operation, wherein the set of two or more of the plurality of external electronic devices includes the first external electronic device:
        in accordance with a determination that the first external electronic device satisfies a first set of criteria, causing the first external electronic device to perform the first media playback operation; and
        in accordance with a determination that the first external electronic device does not satisfy the first set of criteria, forgo causing the first external electronic device to perform the first media playback operation; and
      in accordance with a determination that the first request designates at least the first external electronic device to perform the first media playback operation, causing the first external electronic device to perform the first media playback operation.

22. The method of claim 21, wherein the first external electronic device does not satisfy the first set of criteria when the first external electronic device is associated with a first location that is also associated with a second external electronic device of a first type.

23. The method of claim 21, wherein the first set of criteria includes a first criterion that is not satisfied when the first external electronic device is a device of a second type.

24. The method of claim 23, wherein the first criterion is a user-selectable criterion that can be disabled via user selection.

25. The method of claim 21, wherein the set of two or more of the plurality of external electronic devices includes a third external electronic device, the method further comprising:
  in response to the first request and in accordance with the determination that the first request is a request to perform the first media playback operation at the set of two or more of the plurality of external electronic devices and the determination that the first request does not designate the specific external electronic device to perform the first media playback operation, causing the third external electronic device to perform the first media playback operation.

26. The method of claim 25, wherein:
the first external electronic device does not satisfy the first set of criteria;
the first external electronic device is a device of a third type; and
the third external electronic device is a device of a fourth type, different than the third type.

27. The method of claim 26, wherein a device of the third type and a device of the fourth type have different hardware configurations.

28. The method of claim 21, wherein:
the first request is a request to perform the first media playback operation at the set of two or more of the plurality of external electronic devices and the first request does not designate the specific external electronic device to perform the first media playback operation;
the first external electronic device satisfies the first set of criteria; and
the first external electronic device is caused to perform the first media playback operation.

29. The method of claim 21, wherein the first set of criteria is satisfied when the first external electronic device is a device of a fifth type.

30. The method of claim 21, wherein:
the first external electronic device is associated with a second location; and
the first set of criteria is satisfied when the first external electronic device is a device of the fifth type regardless of whether the second location is associated with one or more other external electronic devices of the plurality of external electronic devices.

* * * * *